(12) United States Patent
Ozawa et al.

(10) Patent No.: US 8,131,912 B2
(45) Date of Patent: Mar. 6, 2012

(54) MEMORY SYSTEM

(75) Inventors: Isao Ozawa, Chigasaki (JP); Takashi Oshima, Chiba (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 746 days.

(21) Appl. No.: 12/239,179

(22) Filed: Sep. 26, 2008

(65) Prior Publication Data

US 2009/0089490 A1 Apr. 2, 2009

(30) Foreign Application Priority Data

Sep. 27, 2007 (JP) ................................. 2007-250962
Mar. 24, 2008 (JP) ................................. 2008-074918

(51) Int. Cl.
 *G06F 12/00* (2006.01)
(52) U.S. Cl. ........................................ 711/103; 711/154
(58) Field of Classification Search .................. 711/103, 711/154
See application file for complete search history.

(56) References Cited

U.S. PATENT DOCUMENTS

| | | | | |
|---|---|---|---|---|
| 5,509,134 A | * | 4/1996 | Fandrich et al. | 711/103 |
| 6,862,652 B1 | * | 3/2005 | Tsuji | 711/103 |
| 7,103,684 B2 | * | 9/2006 | Chen et al. | 710/62 |
| 7,404,026 B2 | * | 7/2008 | Hasan et al. | 710/301 |
| 7,464,240 B2 | * | 12/2008 | Caulkins et al. | 711/165 |
| 7,793,035 B2 | * | 9/2010 | Oshima et al. | 711/103 |
| 7,949,820 B2 | * | 5/2011 | Caulkins | 711/103 |
| 2005/0017979 A1 | | 1/2005 | Sharma et al. | |
| 2006/0107072 A1 | * | 5/2006 | Umezu et al. | 713/193 |
| 2007/0234004 A1 | | 10/2007 | Oshima et al. | |
| 2008/0320209 A1 | * | 12/2008 | Lee et al. | 711/103 |
| 2008/0320214 A1 | * | 12/2008 | Ma et al. | 711/103 |
| 2009/0319859 A1 | * | 12/2009 | Alrod et al. | 714/752 |
| 2010/0037001 A1 | * | 2/2010 | Langlois et al. | 711/103 |
| 2010/0169556 A1 | * | 7/2010 | Nakanishi et al. | 711/103 |
| 2010/0174856 A1 | * | 7/2010 | Diggs et al. | 711/103 |
| 2010/0205359 A1 | * | 8/2010 | Tanaka et al. | 711/103 |
| 2011/0066920 A1 | * | 3/2011 | Yu et al. | 714/758 |

FOREIGN PATENT DOCUMENTS

| | | |
|---|---|---|
| JP | 10-124635 | 5/1998 |
| JP | 2001-27954 | 1/2001 |
| JP | 2005-157684 | 6/2005 |

* cited by examiner

*Primary Examiner* — John Lane
(74) *Attorney, Agent, or Firm* — Oblon, Spivak, McClelland, Maier & Neustadt, L.L.P.

(57) ABSTRACT

A memory system including a nonvolatile memory, a first controller connected to a host equipment, the first controller controlling the entire memory system, a second controller connected to the first controller and also connected to the nonvolatile memory, the second controller controlling an access process to said nonvolatile memory, the second controller receives a command via the first controller and carries out the access process to the nonvolatile memory according to the command, the command being input from the host equipment.

22 Claims, 52 Drawing Sheets

In the case of a header

When not a header

FIG.26

| Pin No. | Signal | | |
|---|---|---|---|
| | Pin name | Type | Function |
| P1 | GND | (O) | GND |
| P2 | R/-B | O(OD) | Ready/busy |
| P3 | -RE | I | Read enable |
| P4 | -CE | I | Card enable |
| P5 | CLE | I | Command latch enable |
| P6 | ALE | I | Address latch enable |
| P7 | -WE | I | Write enable |
| P8 | -WP | I | Write protect |
| P9 | GND | | GND |
| P10 | D0 | I/O | Data 0 |
| P11 | D1 | I/O | Data 1 |
| P12 | D2 | I/O | Data 2 |
| P13 | D3 | I/O | Data 3 |
| P14 | D4 | I/O | Data 4 |
| P15 | D5 | I/O | Data 5 |
| P16 | D6 | I/O | Data 6 |
| P17 | D7 | I/O | Data 7 |
| P18 | Vcc | S | Vcc |

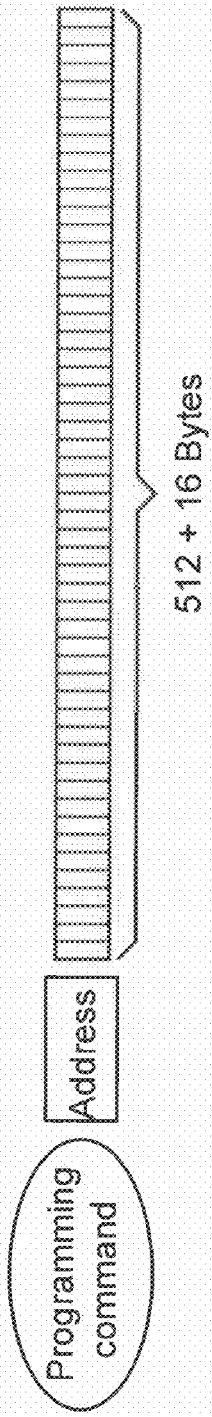
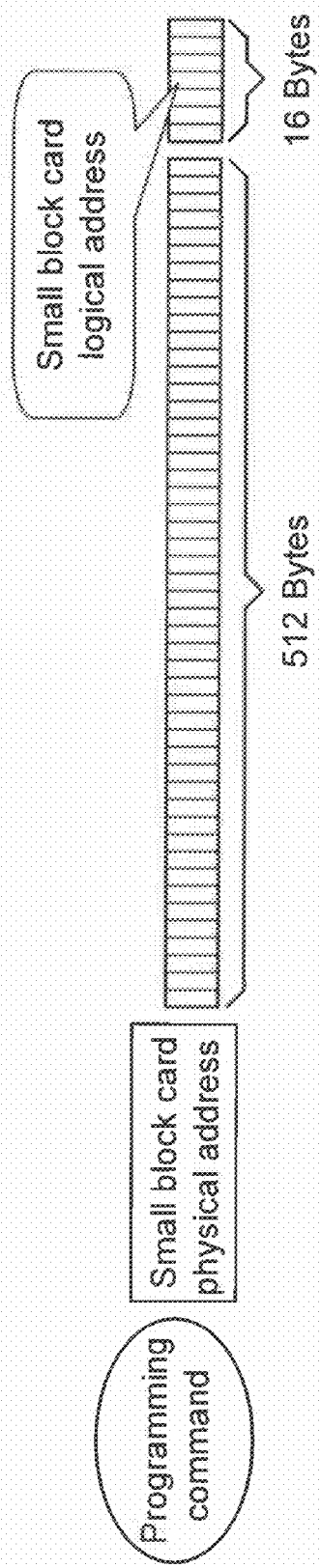
FIG.29A
FIG.29B

Large block card side process

256kB

Host side system block programming operation

16kB

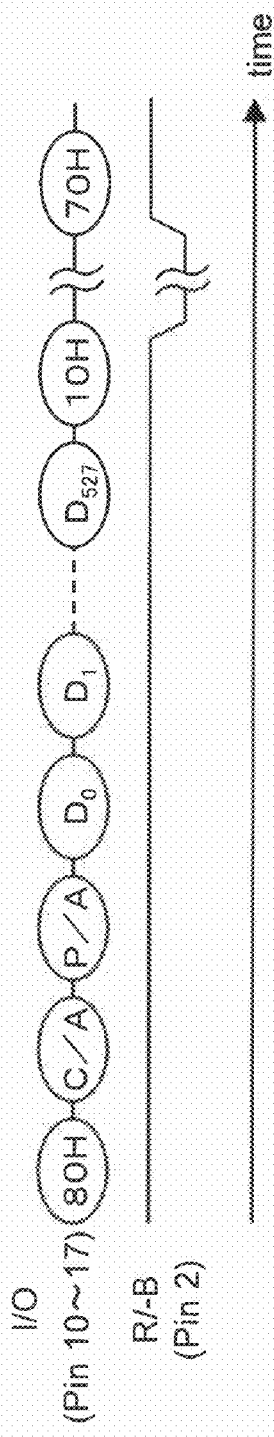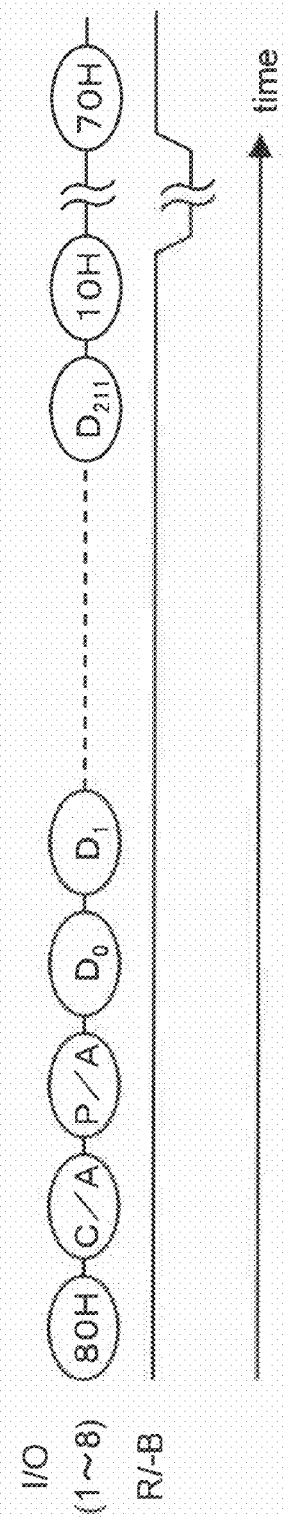

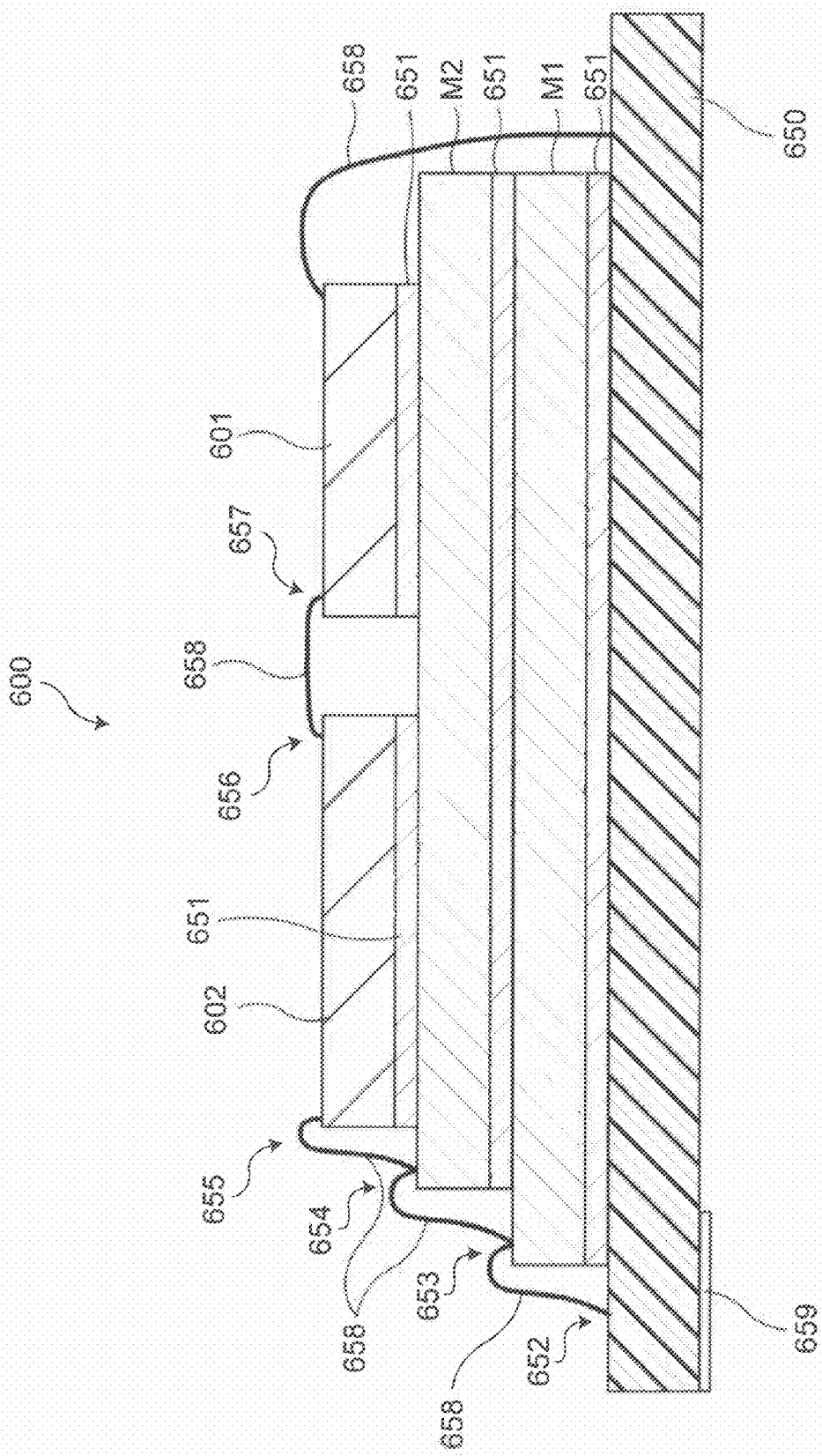

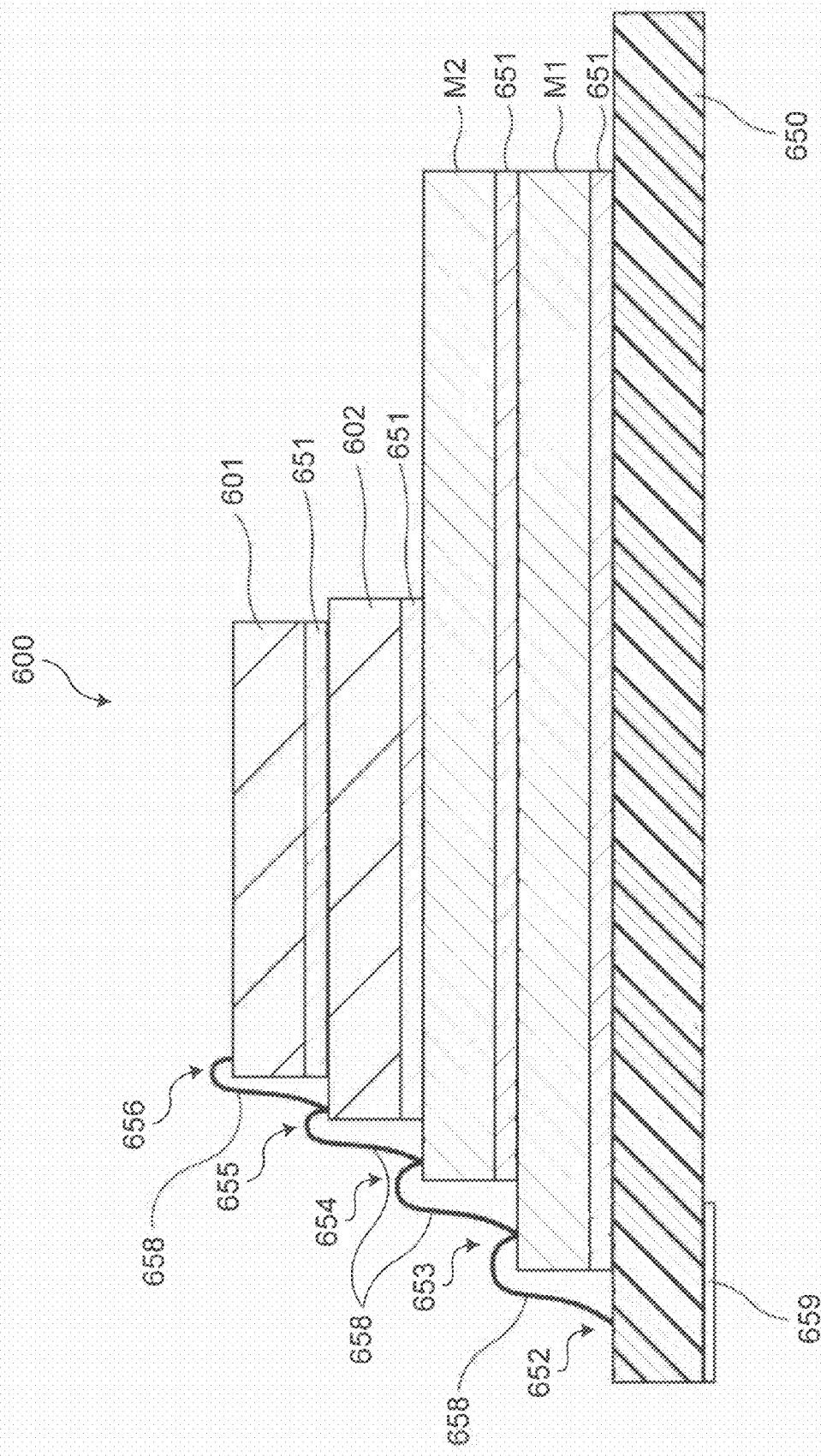

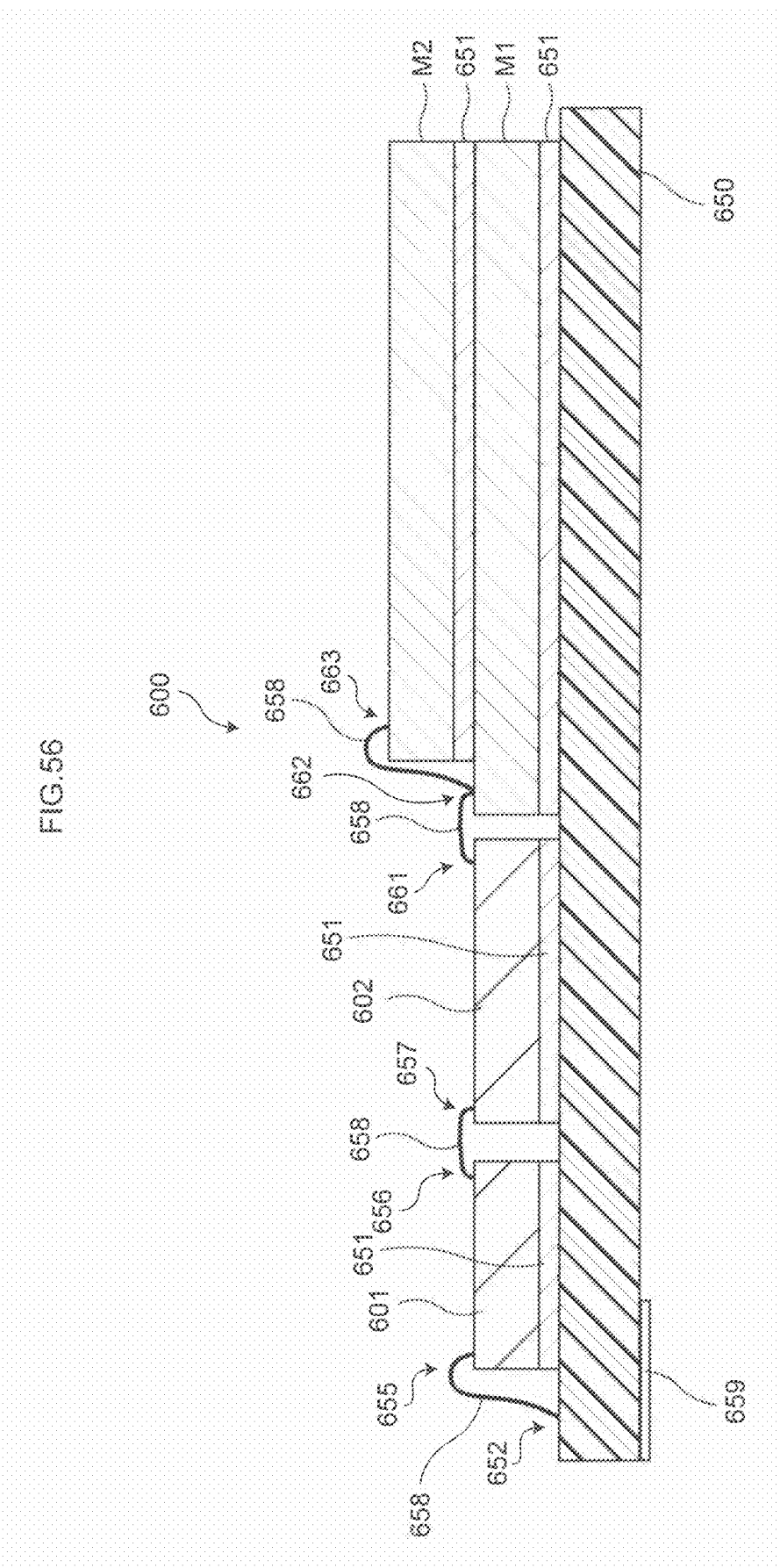

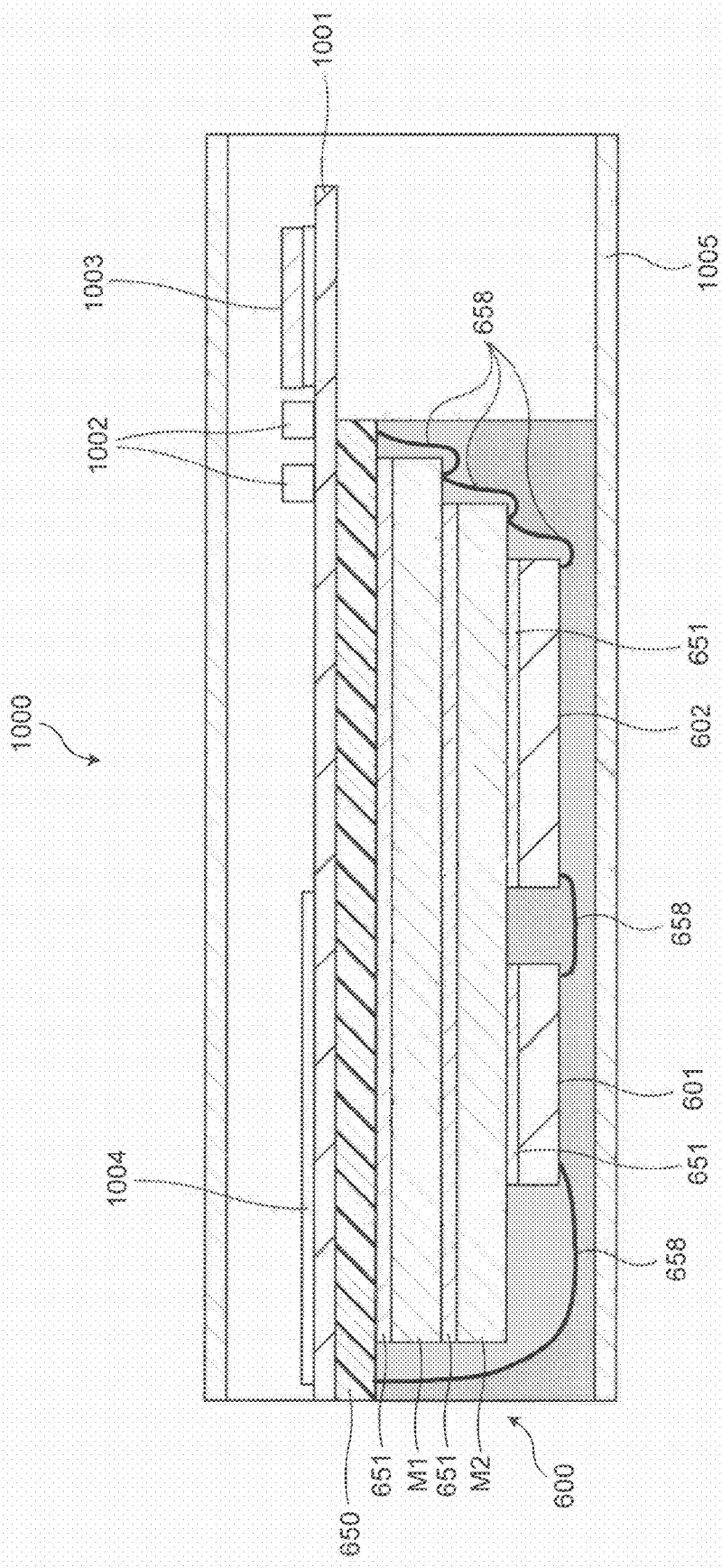

MEMORY SYSTEM

CROSS REFERENCE TO RELATED APPLICATION

This application is based upon and claims the benefit of priority from the prior Japanese Patent Applications No. 2007-250962, filed on Sep. 27, 2007, No. 2008-074918, filed on Mar. 24, 2008, the entire contents of which are incorporated herein by reference.

BACKGROUND OF THE INVENTION

Field of the Invention

This invention is related to a memory system, in particular, a memory system arranged with a nonvolatile memory.

In a nonvolatile memory such as a NAND type flash memory, along with miniaturization of line width which forms the layout of a chip, a change to a necessary error correction symbol is generated in order to maintain page size when programming and reading or erasure block size and each type of command sequence and reliability. As a result, in a memory system arranged with a nonvolatile memory and a controller such as a memory card it is essential to change the controller function with a change in the generation of the nonvolatile memory.

For example, in the memory card described in Laid Open Patent 2005-157684, a controller stores a plurality of device codes of the memory device, device codes which are read from the memory device and the stored device codes are compared, the type of a compatible memory device is determined and a memory device for which a device code is not determined is enabled.

BRIEF SUMMARY OF THE INVENTION

The memory system related to an embodiment of the present invention is arranged with a nonvolatile memory; a first controller connected to a host equipment, said first controller controlling the entire memory system; and a second controller connected to said first controller and also connected to said nonvolatile memory, said second controller controlling an access process to said nonvolatile memory, said second controller receives a command via said first controller and carries out said access process to said nonvolatile memory according to said command, said command being input from said host equipment.

The memory system related to an embodiment of the present invention is arranged with a plurality of nonvolatile memories; a first controller connected to a host equipment, said first controller controlling the entire memory system; and a second controller connected to said first controller and also connected to said plurality of nonvolatile memories, said second controller controlling an access process to said plurality of nonvolatile memories, said second controller receives a command via said first controller and carries out said access process to said plurality of nonvolatile memories according to said command, said command being input from said host equipment.

BRIEF DESCRIPTION OF THE DRAWINGS

FIG. 26 is a diagram which shows an example signal which is allocated to each external connection pin of a memory card related to a second embodiment.

FIG. 29A is a diagram which shows a command format which is sent from a host equipment side related to a second embodiment.

FIG. 29B is a diagram which shows a command format which is processed within a memory card related to a second embodiment.

FIG. 32 is a timing chart which shows an example of a signal which is input/output to an I/O pin and an R/B pin when a host equipment programs a memory card related to a second embodiment.

FIG. 33 is a timing chart which shows an example of a signal which is input/output to an I/O pin and an R/B pin when a controller B programs a nonvolatile memory within a memory card related to a second embodiment.

FIG. 54 is a cross sectional diagram which shows a construction when a memory card is packaged related to a seventh embodiment.

FIG. 55 is a cross sectional diagram which shows a different construction when a memory card is packaged related to a seventh embodiment.

FIG. 56 is a cross sectional diagram which shows a different construction when a memory card is packaged related to a seventh embodiment.

FIG. 57 is a cross sectional diagram which shows an outline construction of a USB memory which is applied with a memory card related to an eighth embodiment.

DETAILED DESCRIPTION OF THE INVENTION

Figure 1:
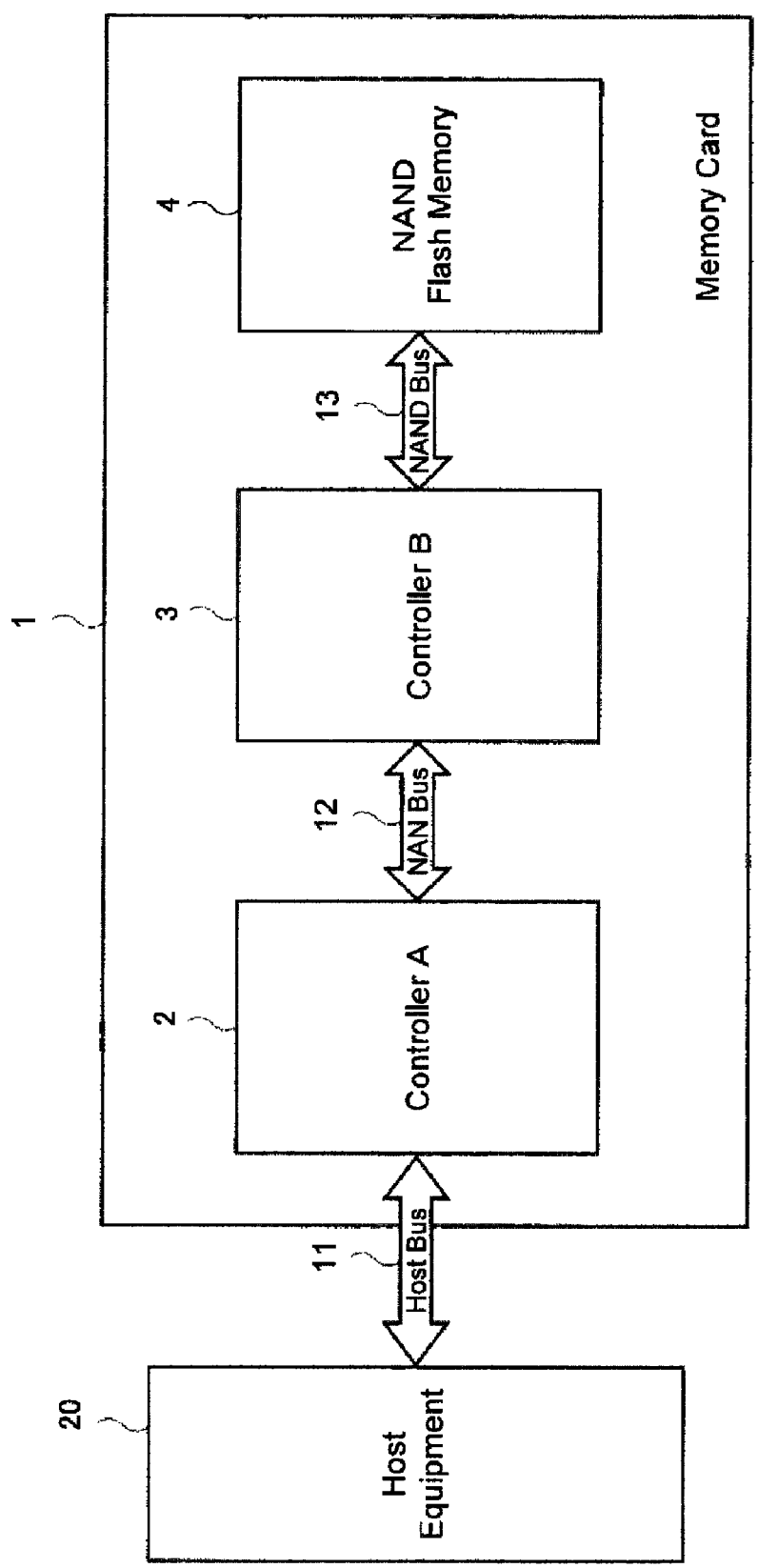
FIG. 1 is a diagram which shows an outline construction of a memory card related to a first embodiment.

The embodiments of the present invention will be explained below while referring to the drawings. The memory system related to the embodiments will be explained using a NAND type flash memory as an example. Furthermore, in the embodiments, the same construction elements have the same symbols and thus to prevent repeating explanations, a number of explanations will be omitted.

First Embodiment

FIG. 1 is a diagram which shows an outline construction of a memory card related to the first embodiment. As is shown in FIG. 1, the memory card 1 includes a controller A2, a controller B3 and a NAND flash memory 4. The controller A2 is connected to a host equipment 20 via a host bus 11 and the controller B3 via a NAND bus 12. The controller B3 is connected to the controller A2 via the NAND bus 12 and the NAND flash memory 4 via a NAND bus 13. The NAND flash memory 4 is connected to the controller B3 via the NAND bus 13. Furthermore, the NAND flash memory 4 may be a two level memory which stores one bit of data in one memory cell or it may be a multi-level memory which stores more than one bit of data (for example 2 bits) in one memory cell. Here, the NAND type flash memory is explained as an example of a nonvolatile memory, however, the nonvolatile memory is not limited to a NAND type flash memory, for example, a NOR type flash memory may also be used.

The terms [logical block address] and [physical block address] used in the explanations below, refer to a logical address and a physical address which are allocated to a block itself within the NAND flash memory 4. In addition, while [logical address] and [physical address] usually mean a logical address and physical address of a block itself, it is possible that they are sometimes equivalent to a smaller resolution unit than a block unit.

The host equipment 20 is arranged with hardware and software for accessing the memory card 1 to which it is connected. The host equipment 20 manages the physical state (which logical sector address data is included in which physical block address, or which block is in an erased state) of the memory card 1 and is constructed so that it directly controls the NAND flash memory 4 within the memory card 1.

In addition, assuming that the host equipment 20 uses a NAND flash memory (but not limited to the NAND flash memory 4) in which an erasure block size at the time of erasure is fixed at 16 kBytes, the host equipment 20 allocates logical and physical addresses in units of 16 kBytes. In other words, the host equipment 20 in many cases performs a sequential program access or read access (issues such a command) with regards to a logical address of 16 kBytes.

Figure 2:
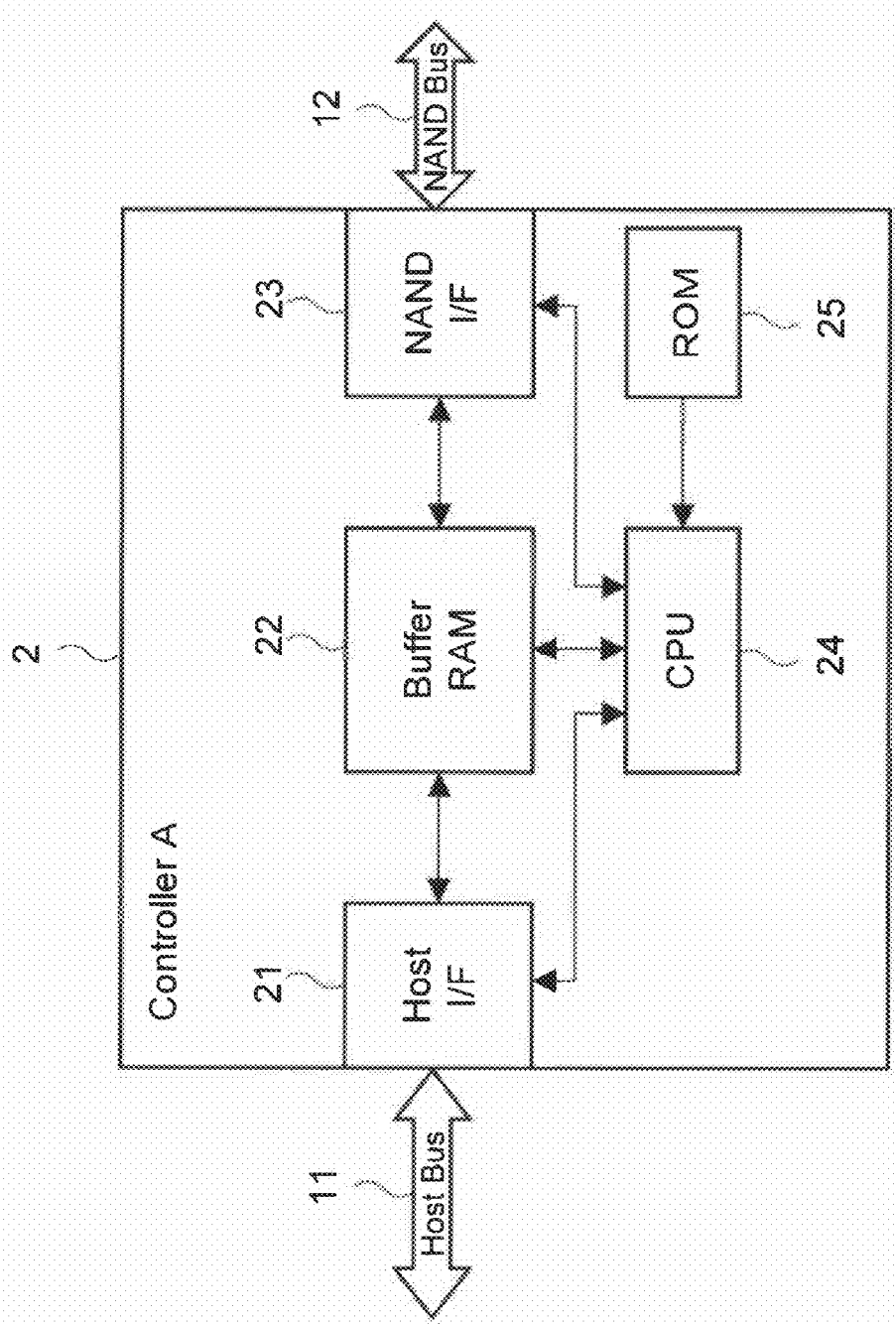
FIG. 2 is a diagram which shows an outline construction of a controller A related to a first embodiment.

The memory card 1 operates by receiving a power supply when connected to the host equipment 20 and performs processes according to an access from the host equipment 20. The controller A2, as shown in FIG. 2, includes a host interface 21 (below referred to as host I/F), a buffer RAM 22, a NAND interface 23 (below referred to as NAND_I/F), a CPU 24 (Central Processing Unit) and a ROM 25 (Read Only Memory).

The host I/F 21 is connected to the host bus 11 and performs an interface process between the host equipment 20 and the buffer RAM 22 and the CPU 24. The NAND_I/F 23 is connected to the NAND bus 12 and performs an interface process between the controller B3 and the buffer RAM 22 and the CPU 24.

When the buffer RAM 22 programs data which is input from the host equipment 20 to the NAND flash memory 4, a fixed amount of data (for example, one page) is temporarily stored and when the buffer RAM 22 outputs data which is read from the NAND flash memory 4 to the host equipment 20, a fixed amount of data is temporarily stored. In addition, the buffer RAM 22 is used as an operation region of the CPU 24 and stores control programs etc.

The CPU 24 controls the all the operations of the memory card 1. When the memory card 1 receives a power supply, for example, the CPU 24 loads firmware (control programs) which is stored in the ROM 25, into the buffer RAM 22 and carries out a predetermined process. In this process, the CPU 24 receives a program command, a read command and an erase command from the host equipment 20 and carries out an access process between the controller B3 to those regions within the NAND flash memory 4 and controls a data transfer process via the buffer RAM 22.

The ROM 25 is a memory which stores control programs for example, which are used by the CPU 24. Furthermore, the controller A2 is connected to the controller B3 via the NAND bus 13 and the CPU 24 carries out various processes with the controller B3 as if it were the NAND flash memory 4. That is, when the CPU 24 receives a program command, a read command and an erase command from the host equipment 20, the CPU 24 carries out a process which transfers these commands to the controller B3.

Figure 3:
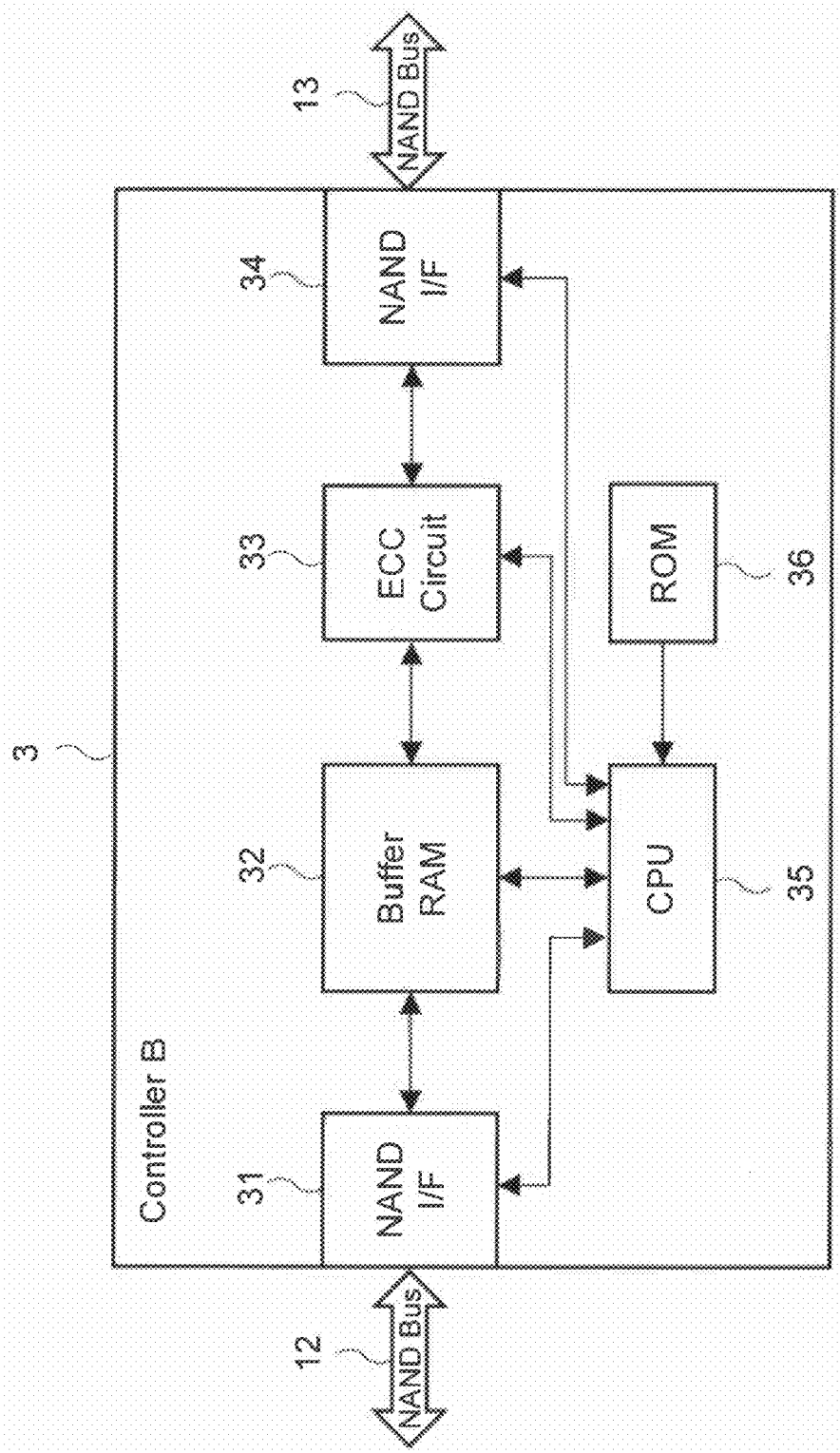
FIG. 3 is a diagram which shows an outline construction of a controller B related to a first embodiment.

The controller B3, as shown in FIG. 3, includes a NAND_I/F 31, a buffer RAM 32, an ECC circuit 33 (Error Correcting Code), a NAND_I/F 34, a CPU 35 and a ROM 36.

The NAND_I/F 31 is connected to the NAND bus 12 and performs an interface process between the controller A2 and the RAM 32 and the CPU 35. The NAND_I/F 34 is connected to the NAND bus 13 and performs an interface process between the NAND flash memory 4 and the ECC circuit 33 and the CPU 35.

When data which is input from the controller A2 is programmed to the NAND flash memory 4 the buffer RAM 32 temporarily stores a fixed amount of data (for example, 1 page), and when data which is read from the NAND flash memory 4 is output to the controller A2 the buffer RAM 32 temporarily stores a fixed amount of data. In addition, the buffer RAM 32 is used as an operation region of the CPU 35 and stores control programs and various tables for example.

The ECC circuit 33 carries out an error correction process of programming data based on ECC data which is added to this programming data which is programmed to the NAND flash memory 4. The ECC circuit 33 also carries out a process which adds ECC data to read data which is read from the NAND flash memory 4.

The CPU 35 controls an access process to the NAND flash memory 4. When the memory card 1 receives a power supply, for example, the CPU 35 loads firmware which is stored in the ROM 36 into the buffer RAM 32 and performs a predetermined process. In this predetermined process the CPU 35 creates various tables on the buffer RAM 32, receives a program command, read command and an erase command from the controller A2, carries out an access process to these regions within the NAND flash memory 4 and performs a data transfer process via the buffer RAM 32.

The ROM 36 is a memory which stores control programs, for example, which are used by the CPU 35. Furthermore, the controller B3 is connected with the controller A2 via the NAND bus 12 and the CPU 35 carries out processes to the controller A2 as if it were the NAND flash memory 4. That is, when the CPU 35 receives a program command, a read command and an erase command from the controller A2, the CPU 35 carries out an access process to these regions with the NAND flash memory 4.

Figure 4:
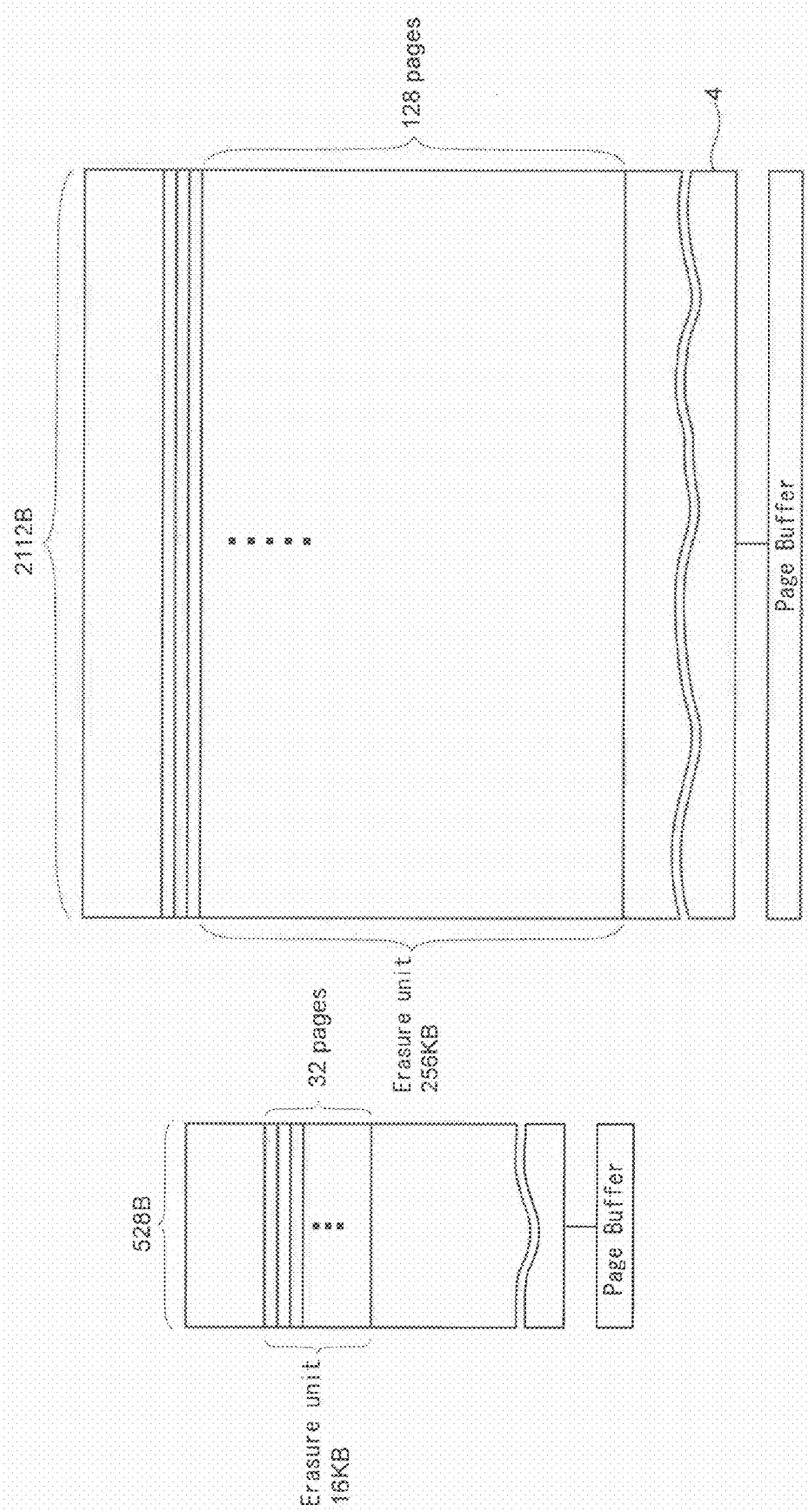
FIG. 4 is a diagram which shows the difference in data placement between a flash memory presumed as a host equipment related to a first embodiment and a NAND flash memory which is actually used.

FIG. 4 shows the difference in data placement between a flash memory assumed by the host equipment 20 and a flash memory which is actually used, that is, the NAND flash memory 4 in the memory card 1. In the flash memory assumed by the host equipment 20, each page includes 528 Bytes (a 512 Bytes data storage section and a 16 Bytes redundant section) and one erasure unit is made up of 32 pages, that is, 16 kBytes+0.5 kBytes (here k=1024). Below, a card mounted with this type of flash memory is sometimes called [small block card].

However, in the NAND flash memory 4 which is actually used, each page includes 2112 Bytes (a 512 Bytes data storage section×4+24 Bytes management data storage section), and one erasure unit is made up of 128 pages, that is, 256 kBytes+8 kBytes. Below, a card mounted with this kind of NAND flash memory is sometimes called [large block card]. Furthermore, in the explanation below, an erasure unit of a small block card is called 16 kBytes and an erasure unit of a large block card is called 256 kBytes.

In addition, the flash memory which is assumed by the host equipment 20 and the NAND flash memory 4 which is actually used each include a page buffer for performing data input and output to the flash memory. The storage capacity of the page buffer included in the flash memory assumed by the host equipment 20 is 528 Bytes (512 Bytes+16 Bytes). And the storage capacity of the page buffer included in the NAND flash memory 4 which is actually used is 2112 Bytes (2048 Bytes+64 Bytes). Data is programmed etc in one page units which are equivalent to that memory's storage capacity.

In the example in FIG. 4 a case is shown where the erasure size of the NAND flash memory 4 which is actually used is sixteen times greater than the erasure size of the flash memory assumed by the host equipment 20. The first embodiment is not limited to this however, as long as it is an approximate integral multiple a different multiplication may also be used.

In order to actually turn the large block card into an effective product it is preferred that the storage capacity of the NAND flash memory 4 shown in FIG. 4 by 1 Gbits or more. In the case where the storage capacity of the NAND flash memory 4 is, for example, 1 Gbits, the number of 256 kBytes blocks (erasure unit) becomes 512.

In addition, an example in the case where an erasure unit is 256 kBytes is shown in FIG. 4. However, it is practically effective if an erasure unit is constructed as a 128 kBytes block. In this case, the number of 128 kBytes blocks becomes 1024.

Figure 5:
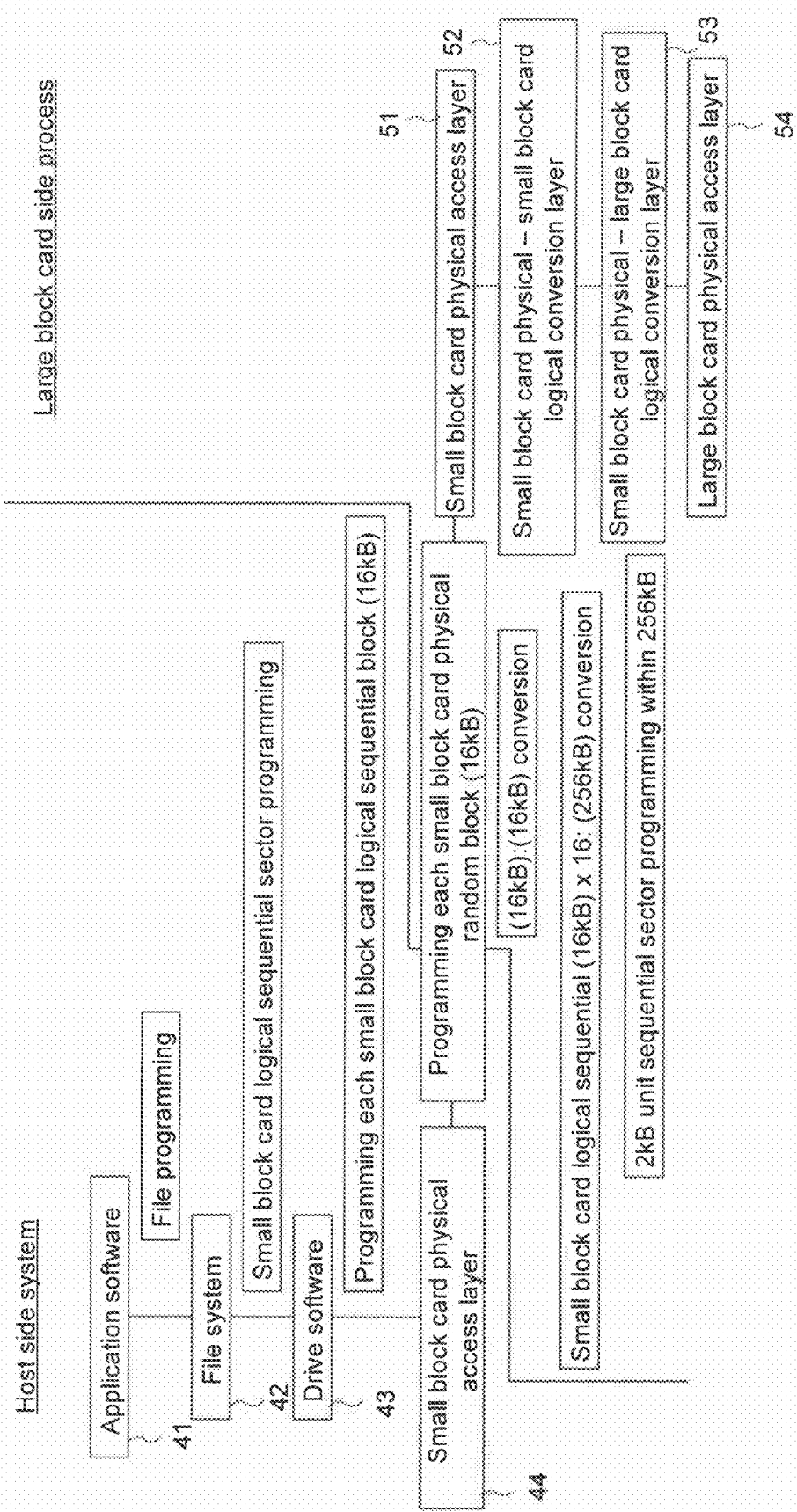
FIG. 5 is a diagram which shows each communication layer of a host side system and a memory card (large block card) related to a first embodiment.

FIG. 5 is a diagram which shows each communication layer of a system of the host equipment 20 side and the memory card 1 (large block card).

The system of the host equipment 20 side includes application software 41, a file system 42, drive software 43 and a small block card physical access layer 44. The memory card 1 (large block card) includes a small block card physical access layer 51, a small block card physical—small block card logical conversion layer 52, a small block card physical—large block card logical conversion layer 53 and a large block card physical access layer 54.

For example, when the host equipment 20 side application software 41 requests a file for programming to the file system 42, the file system 42 instructs sequential sector programming to the drive software 43 based on a small block card logical block address. After receiving this the drive software 43 carries out a process which realizes sequential programming for each 16 kBytes block based on the small block card logical block address. In this case, the drive software 43 performs a logical/physical block conversion, issues a random programming command by a physical block address of a small block card via the small block card physical access layer 44, issues a random programming command to a large block card by a small block card physical block address and transfers data.

Furthermore, during program access both the small block card and large block card are presumed to sent and receive data in the following order according to protocol, (1) command, (2) page address (row address), (3) column address, (4) data, (5) program confirmation command.

When the small block card physical access layer 51 of the large block card side receives a programming command from the host equipment 20 via the small block card physical block address, a logical block address which includes additional data in addition to a physical block address and data for example, are obtained.

The small block card physical—small block card logical conversion layer 52 includes a first table for converting a small block card physical block address (16 kBytes) into a small block card logical block address (16 kBytes) when reading data for example. The small block card physical—small block card logical conversion layer 52 reflects this in a first table when the small block card physical access layer 51 receives a programming command and obtains a small block card logical block address. The small block card physical—small block card logical conversion layer 52 also reflects a physical block address in the first table.

The small block card physical—large block card logical conversion layer 53 includes a second table for converting a small block card logical block address (sequential 16 kBytes block×16) into a large block card physical block address (256 kBytes physical block) when reading data for example. The small block card physical—large block card logical conversion layer 53 reflects this in the second table when the small block card physical access layer 51 receives a read command and obtains a small block card logical block address.

The large block card physical access layer 54 decides the placement of data within the NAND flash memory 4 based on the obtained small block card logical block address when the small block card physical access layer 51 receives a programming command, and sequentially programs 16 kBytes data in 2 kBytes units (1 page) within a 256 kBytes physical block. In addition, the large block card physical access layer 54 stores the obtained small block card logical block address or physical block address in a predetermined region within a management data region within the NAND flash memory 4.

In this way because the host equipment 20 issues a command based on a small block card physical block address, the large block card side is managed so that it is understood in which 256 kBytes physical block data which corresponds to a small block card physical block address exists. Specifically, a small block card logical—physical block address corresponding relationship for every 16 kBytes is managed and also managed so that it is understood in which large block card 256 kByte physical block data which corresponds to a logical block address of a small block card consecutive 256 kBytes block is stored.

In addition, the host equipment 20 accesses the large block card which has erasure units of 256 kBytes physical blocks, when it is presumed that an erasure unit is a 16 kBytes block. In contrast, the large block card can respond flexibly to a control algorithm or physical format which the host equipment 20 uses. For example, an algorithm of the host equipment 20 side which states that [in the case where a programming operation is generated via a new 16 kBytes logical block address, data erasure is performed on a block (below referred to as old assign logical block) which corresponds to a 16 kBytes physical block address of a small block card when a program operation is previously generated via the same logical block address] is considered and an erasure state of an old assign logical block which is to be erased, is emulated. However, erasure of a 16 kBytes block which is to be erased is not actually erased in the large block card side. In this way, it is possible to significantly reduce overheads related to physical operations in the NAND flash memory 4.

Figure 6A:
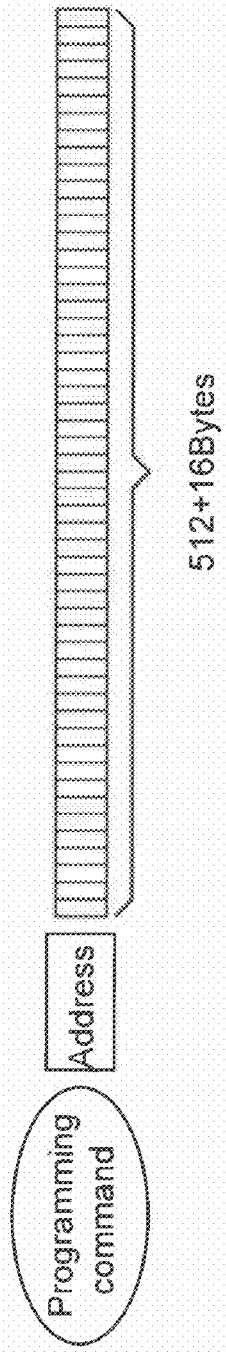
FIG. 6A is a diagram which shows a command format which is sent from a host equipment side related to a first embodiment.

FIG. 6 is a diagram which shows a format of a command which is sent from the host equipment 20 side. A packet of the command which is sent from the host equipment 20 side includes various command classification data (here [programming]), an address (physical block address), data (actual data and additional data of contents etc (512 Bytes+16 Bytes)) as shown in FIG. 6A.

Figure 6B:
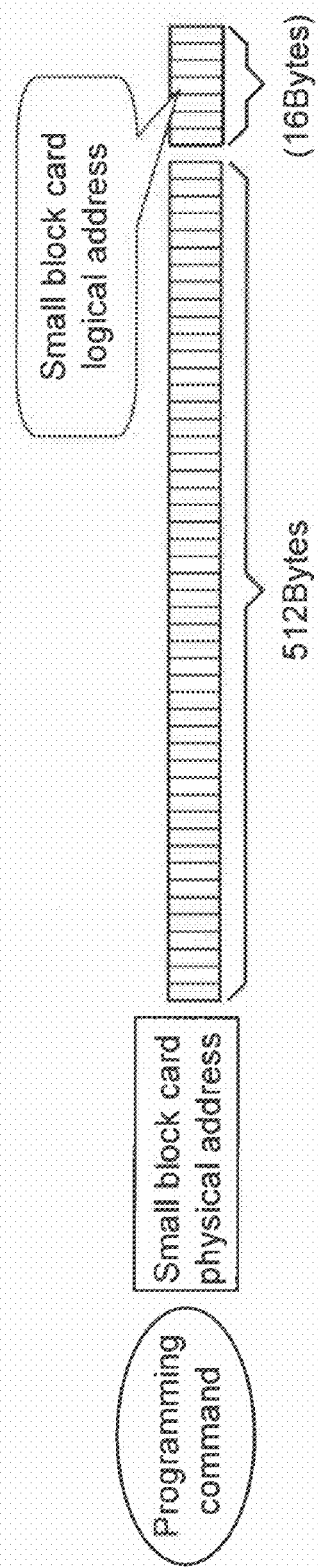
FIG. 6B is a diagram which shows a command format which is processed within a memory card related to a first embodiment.

In this kind of format packet a small block card [logical block address] (a logical address which corresponds to a 16 Bytes block which is to be accessed) is arranged in a predetermined position in additional 16 Bytes data as shown in FIG. 6B. Apart from obtaining command classification data, a physical block address and data the large block card particularly obtains the above stated [logical block address].

Figure 7:
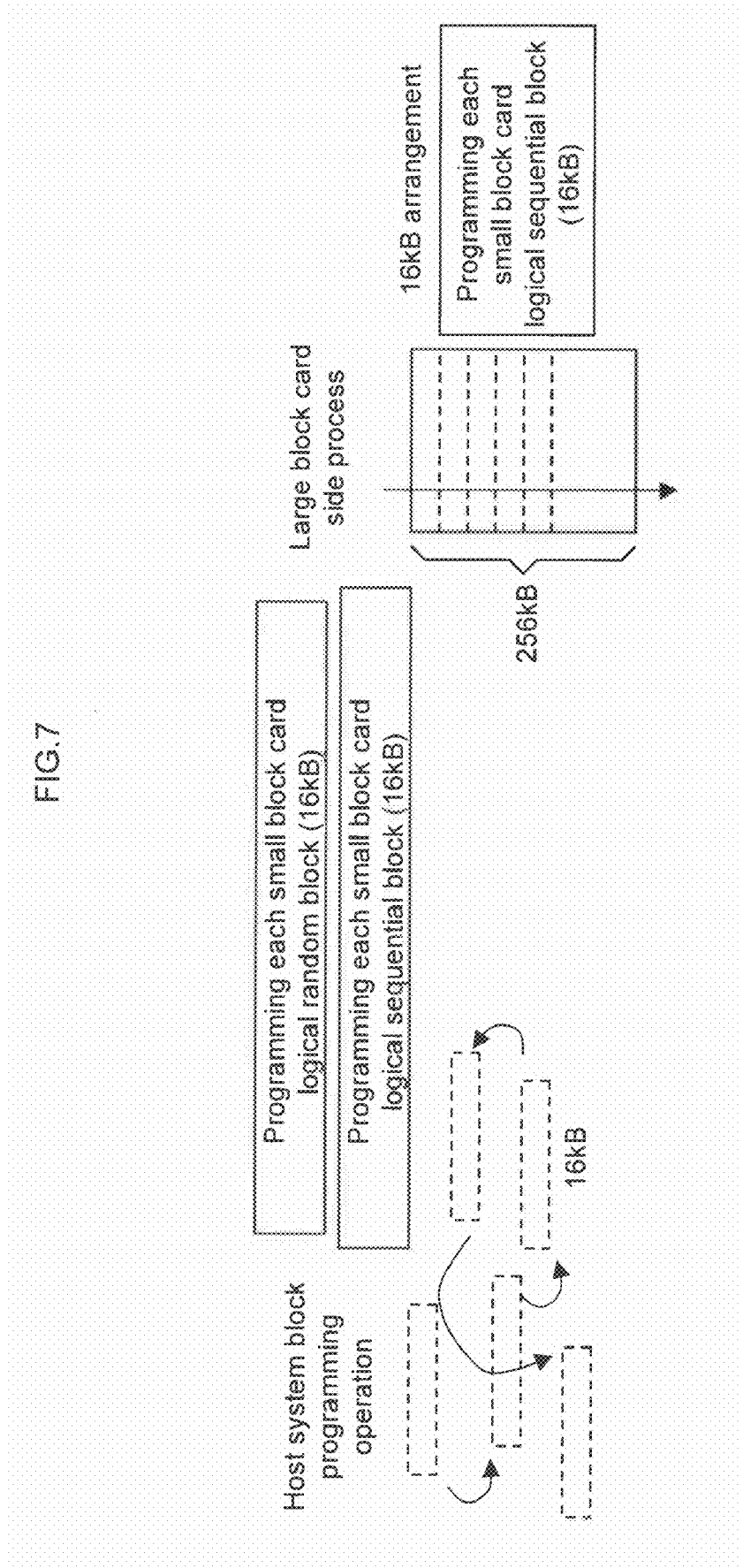
FIG. 7 is a diagram which shows a comparison of a presumed block programming operation by a host equipment and a programming process actually carried out by a memory card (large block card) side related to a first embodiment.

FIG. 7 is a diagram which shows a comparison between a block programming operation assumed by the host equipment 20 side and an actual programming process performed by the memory card 1 (large block card). In the host equipment 20 side (left side of the diagram), when a sequential programming operation of a 16 kBytes physical block unit is generated based on a small block card logical address, a random programming operation of a 16 kBytes block unit is performed via a small block card physical block address. In addition to this programming operation, it is assumed that an old assign logical block is erased in 16 kBytes block units.

However, in the large block card (right side of the diagram), in the case where a programming command is received from the host equipment 20 side, data is sequentially programmed within the NAND flash memory 4 in 16 kBytes block units based on a small block card logical block address. In this case, with regards to the host equipment 20, because of the above stated assumption, an old assign logical block within the small block card of the large block card side is treated as being in an erased state. For example, when an old assign logical block has had a read access, the host equipment 20 is notified that that block is in an erased state. In addition, a small block is also managed as if in an erased state.

As stated above, the host equipment 20 performs random programming operations of 16 kBytes units via a small block physical address. In this type of random programming operation, generally, a plurality of processes are generated for reprogramming only one part of the large block (256 kBytes). In a NAND flash memory erasure is only performed in block units. As a result, in the case of reprogramming only one part of a block a new block in which data to be reprogrammed has been erased is programmed and at the same time a copy operation (below referred to as [collateral data copy]) is performed of data which is not to be reprogrammed from an old block which includes old data which is to be reprogrammed with new data. As a result, when a plurality of processes for reprogramming only a part of a block is generated, overheads increase significantly.

Thus, in the first embodiment, a physical address is again allocated in the large block side following a logical address order which is obtained from the host equipment 20 side, programming of only a part of a block is reduced and overheads can be significantly reduced.

Figure 8:
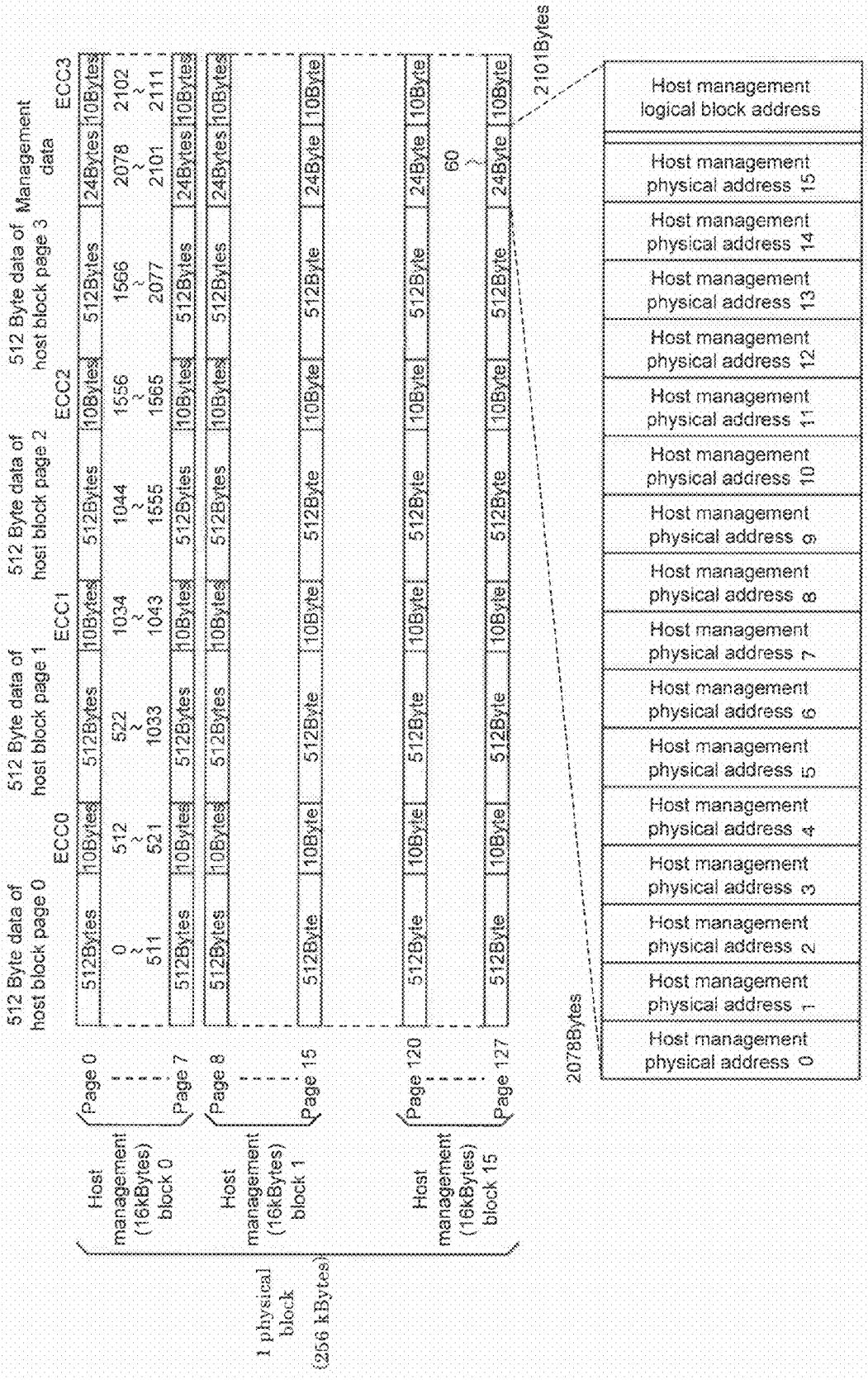
FIG. 8 is diagram which shows a block format (256 kByte physical block) of a flash memory within a large block card related to a first embodiment.

FIG. 8 is a diagram which shows a block format (256 kBytes physical block which is the unit of erasure) of the NAND flash memory 4 within the large block card. Among the 256 kBytes physical blocks which are the unit of erasure in the large block card, sixteen blocks (below referred to as host management blocks) for programming data equivalent to 16 kBytes which is the unit managed by the host equipment 20 side, are included. When data is programmed, each piece of data is arranged in order by small block card logical addresses.

Each host management block is comprised of 8 pages. Each page includes four 512 Bytes data regions and a 10 Bytes ECC region which corresponds to each data region. In addition, a 24 Bytes management data region is arranged after the final 512 Bytes data region (the fourth 512 Bytes data region) in a page. As a result, the final 10 Bytes ECC region in a page has a structure corresponding to both the fourth 512 Bytes data region and the 24 Bytes management data region.

Among the 128, 24 Bytes management data regions which are included in a 256 kBytes physical block which is the unit for erasure, in the last 24 Byte management data region 60, address data (below referred to as [host management physical address]) which is equivalent to a physical block address obtained from a command sent from the host equipment 20 side, and address data (below referred to as [host management logical block address]) which is equivalent to a logical block address, are organized and stored.

Specifically, for each programming of 16 kBytes to one 16 kBytes host management block, a corresponding host management physical address (for example, 10 bits) is stored in a predetermined region within a management data region 60. In this way, 16 host management physical addresses corresponding to sixteen 16 kBytes host management blocks are stored in a predetermined region within the management data region 60. However, with regards to host management logical addresses, the head logical block address (for example, 10 bits) is stored in a predetermined region of the management data region 60 as the host management logical address as a representative of the sixteen consecutive logical block addresses which correspond to sixteen 16 kBytes host management blocks.

In the above stated structure, the data which is arranged in the last region (512 Bytes+24 Bytes+10 Bytes region) within each 256 Bytes block is read and by referring to 24 Bytes management data within this data it is possible to organize and obtain sixteen block [host management physical address] and a [host management logical block address] corresponding to the 256 kBytes block.

A [host management physical address] and a [host management logical block address] which are stored in each 256 Bytes block are used when the first table included in the small block card physical—small block card logical conversion layer 52 explained in FIG. 5, and the second table included in the small block card logical—large block card physical conversion layer 53, are created.

Figure 9:
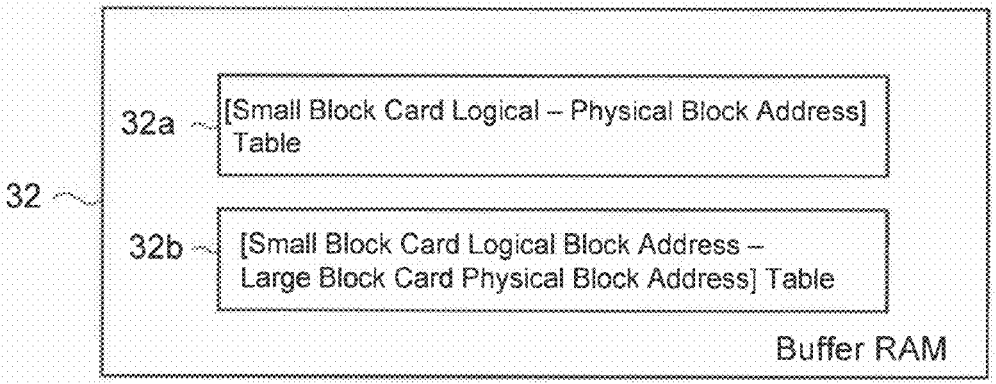
FIG. 9 is a diagram which shows a variety of tables which are created on a buffer RAM within a controller B related to a first embodiment.

FIG. 9 is a diagram which shows each table which is created within the buffer RAM 32 in the controller B3. The [small block card logical—physical block address] table 32*a* and the [small block card logical block address-large block card physical block address] table 32*b* are equivalent to the above stated first table and second table respectively. The tables 32*a* and 32*b* use the [host management physical address] and the [host management logical block address] stored in the data management region 60 (See FIG. 8) and are created in the buffer RAM 32.

The [small block card logical—physical block address] table 32*a* is used to convert a small block card physical address (corresponding to a 16 kBytes block) to a small block card logical block address (corresponding to a 16 kBytes block) when data is read, for example.

The [small block card logical block address—large block card physical block address] table 32*b* is used to covert a small block card logical block address (corresponding to a sequential 16 kBytes block×16) to a large block card logical block address (corresponding to a 256 kBytes physical block) when data is read, for example.

Figure 10:
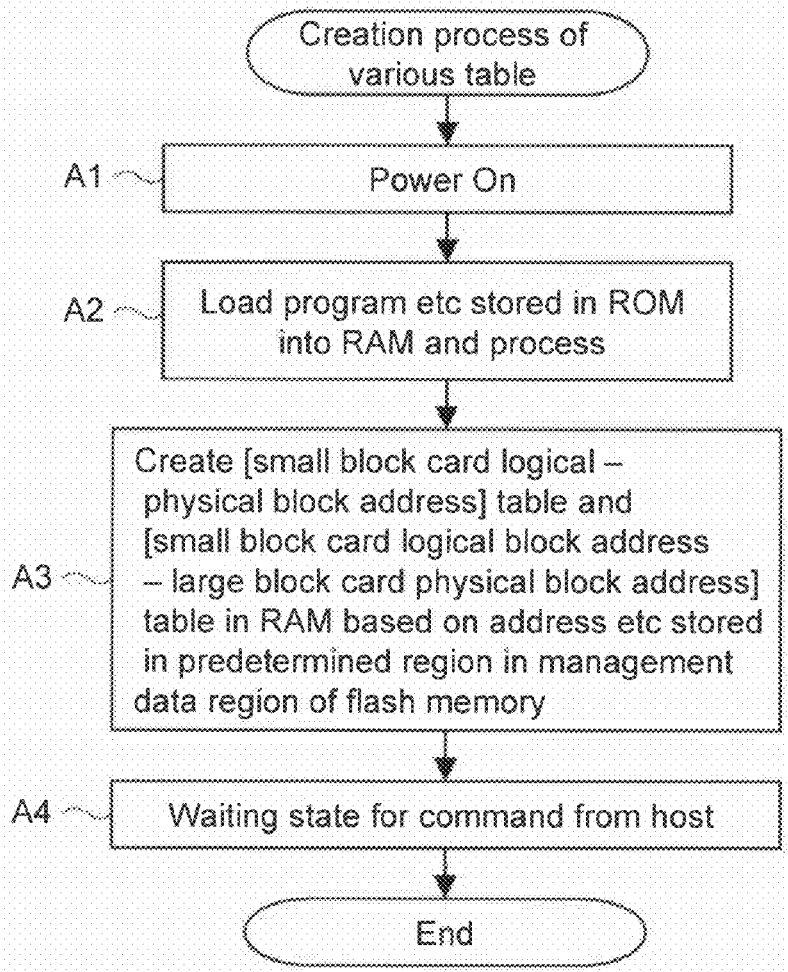
FIG. 10 is a flowchart which shows a process flow of the creation of various tables related to a first embodiment.

Next, the flow of the creation process of each table will be explained while referring to the flowchart in FIG. 10. For example, when the memory card 1 (large block card) receives a power supply from the host equipment 20 side (step A1), the CPU 35 within the controller B3 begins operating and a control program etc, a control program stored in the ROM 36 (a program for managing the correspondence of a physical—logical block address in the small block card and a physical block address in the NAND flash memory 4) is loaded into the buffer RAM 32 and processed (step A2). Furthermore, at this time the CPU 24 in the controller A2 begins to operate and a control program stored in the ROM 36 (a program for controlling the operation of the entire memory card 1) is loaded into the buffer RAM 32 and processed.

Next, by using the [host management physical address] and [host management logical block address] which are stored in the data management region 60 of the NAND flash memory 4, the CPU 35 creates the [small block card logical—physical block address] table 32*a* and the [small block card logical block address—large block card physical block address] table 32*b* in the buffer RAM 32 (step A3). Then the CPU 35 is in a waiting state for a command from the host equipment 20 (step A4) and performs each process for a program access, read access and erasure access according to a control program.

Figure 11:
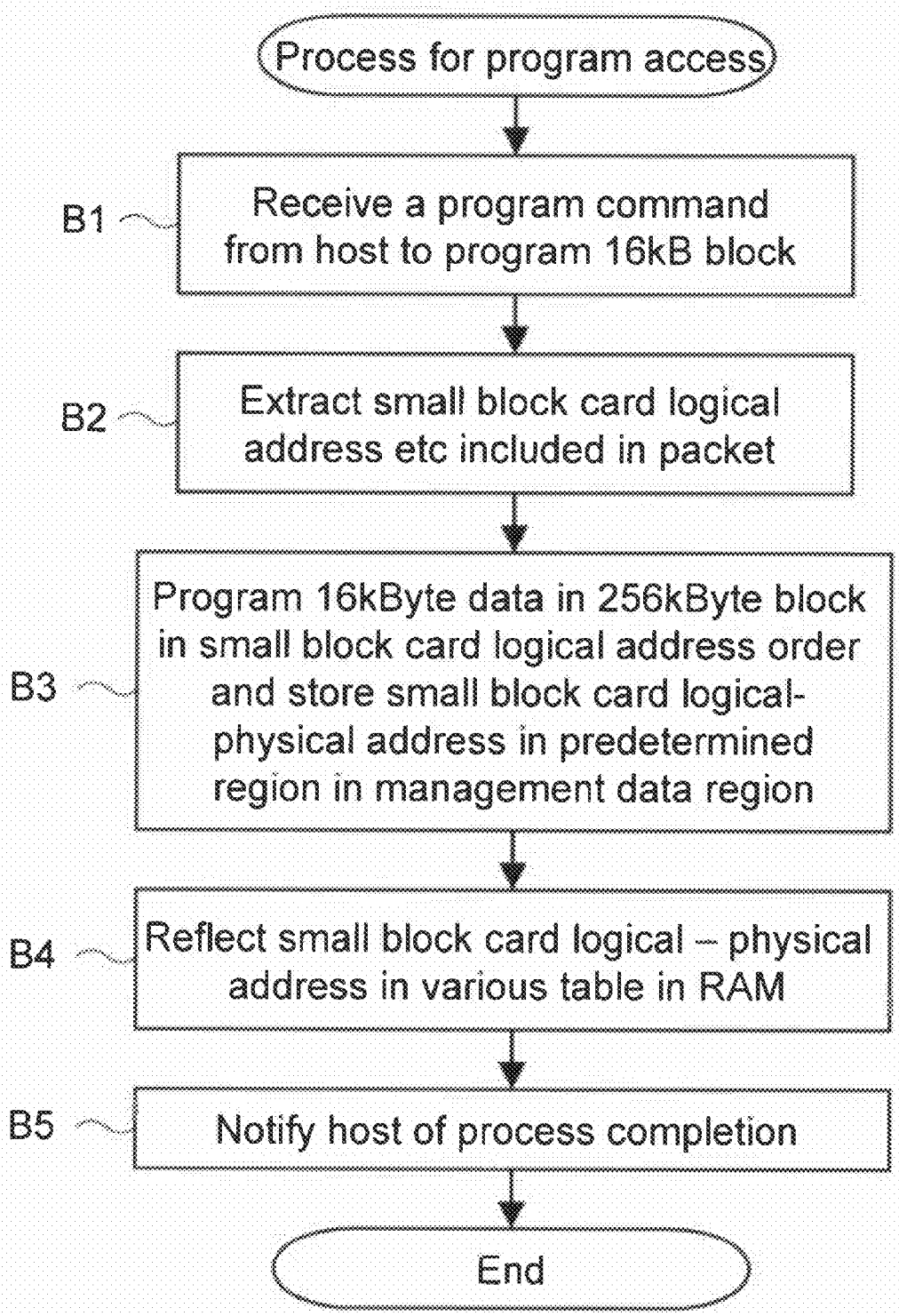
FIG. 11 is a flowchart which shows a process flow of program access related to a first embodiment.

Next, the flow of the process for program access will be explained while referring to the flowchart in FIG. 11. When the CPU 35 receives, for example, a command for programming a 16 kBytes block from the host equipment 20 side via the controller A2 (step B1), a logical block address which is included in additional data apart from small block card physical block address or data, is obtained (step B2).

The CPU 35 programs 16 kBytes data within a 256 kBytes block in the order of the small block card logical block address which is obtained and also stores a [host management logical address] and a [host management physical address] which are equivalent to the small block card logical block address and physical block address in a predetermined region of the management data region 60 (step B3). In addition, the CPU 35 reflects the obtained small block card logical block address and the physical block address in the [small block card logical—physical block address] table 32a and the [small block card logical block address—large block card physical block address] table 32b in the buffer RAM 32 (step B4). Finally, the CPU 35 notifies the host equipment 20 that the programming process is completed (step B5).

Next, the data programming process in step B3 shown in FIG. 11 will be explained in detail while referring to the flowchart in FIG. 12 and the schematic diagrams in FIG. 13 to FIG. 16.

Figure 12:
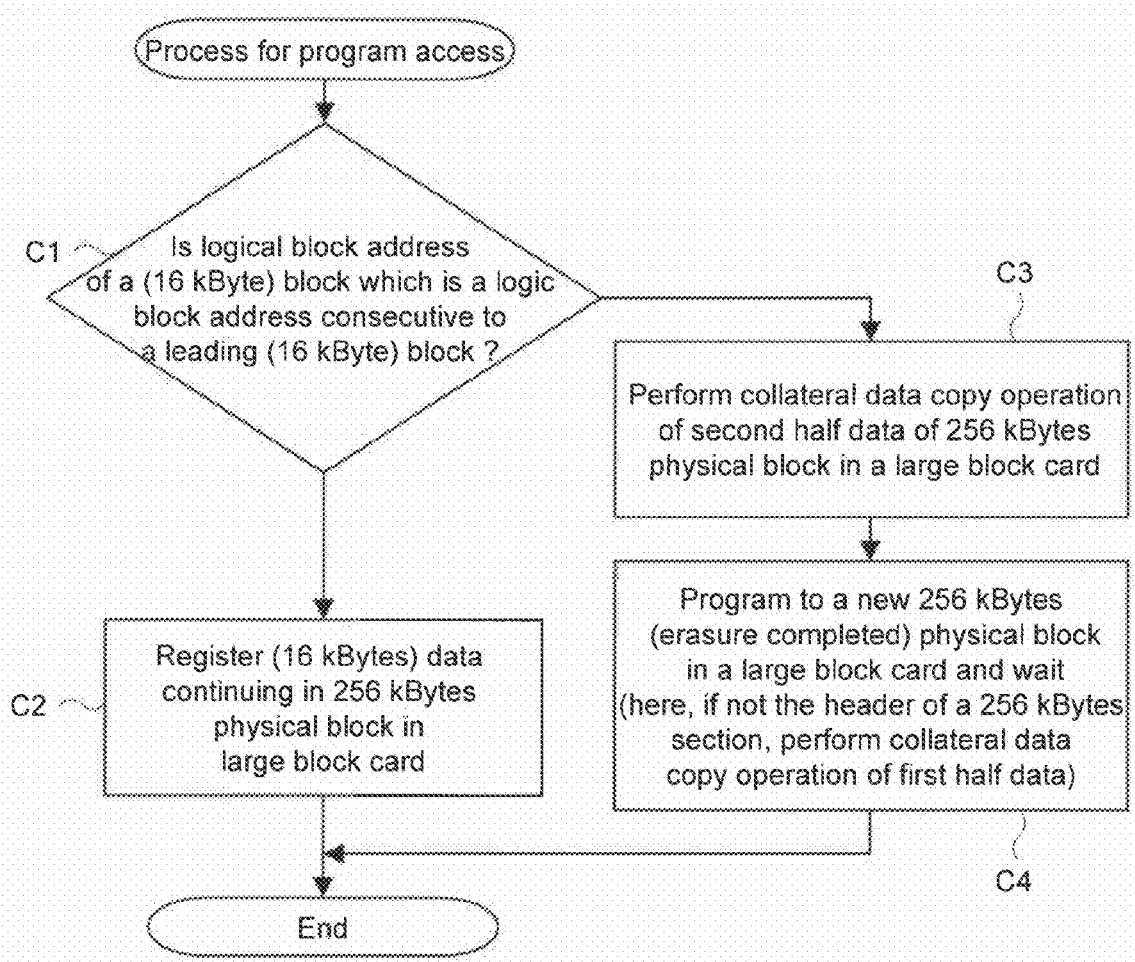
FIG. 12 is a flowchart which shows the details of the flow of programming data in step B3 in FIG. 11 related to a first embodiment.
Figure 13:
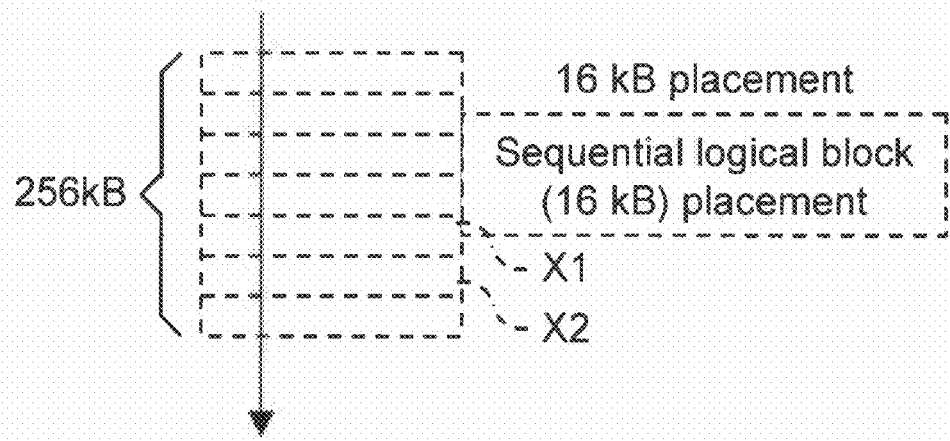
FIG. 13 typically shows a process in step C1 in FIG. 12 related to a first embodiment.

The CPU 35 determines whether a certain logical block address (corresponding to a 16 kBytes block) is consecutive to a lead logical block address (corresponding to a 16 kBytes block) at the time of programming data (step C1 in FIG. 12). That is, as is shown in FIG. 13, the CPU 35 determines that while in a state in which programming of data to a 16 kBytes physical block address X1 has finished, whether the next physical block which should be programmed is a 16 kBytes physical block X2 which is consecutive to the above stated physical block X1

Figure 14:
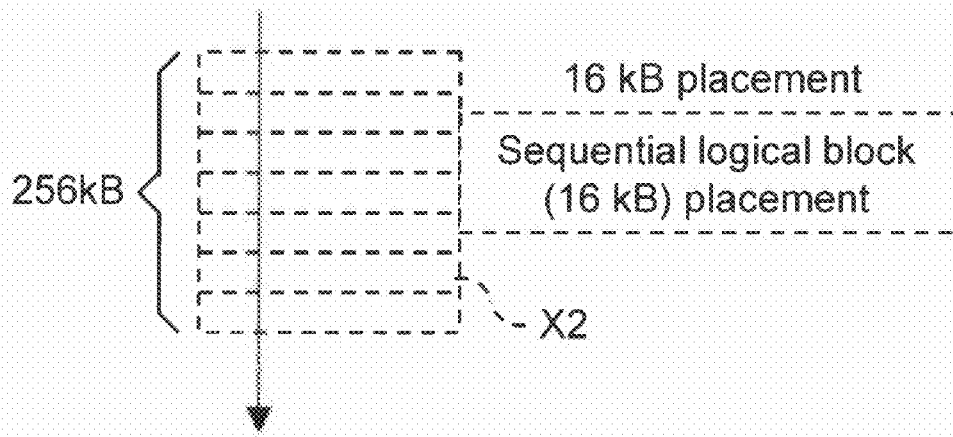
FIG. 14 typically shows a process in step C2 in FIG. 12 related to a first embodiment.

If the logical block address is consecutive, the CPU 35 programs 16 kBytes data, which is to be programmed, after the 16 kBytes data which is programmed first, within a large block card 256 kBytes physical block (step C2 in FIG. 12). That is, as is shown in FIG. 14, data is programmed to the above stated 16 kBytes physical block X2.

Figure 15:
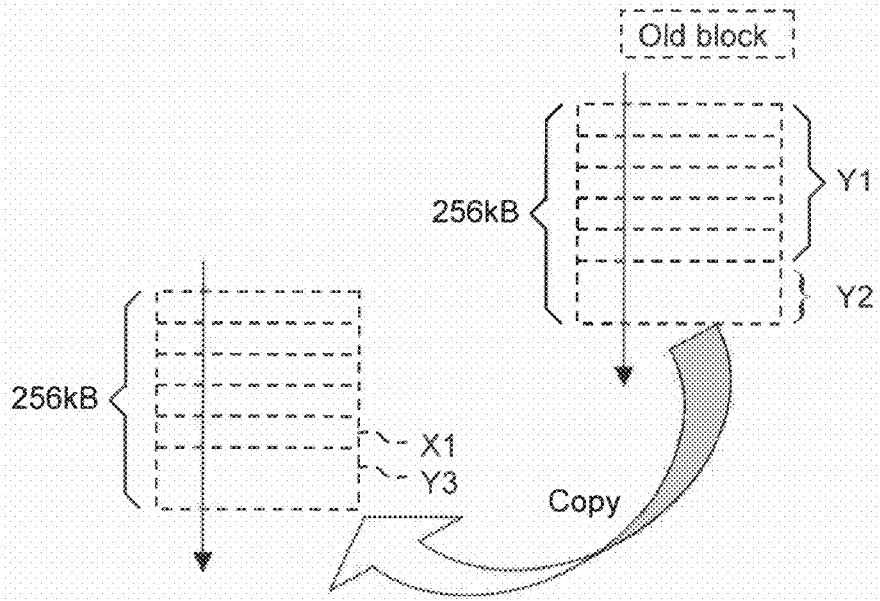
FIG. 15 typically shows a process in step C3 in FIG. 12 related to a first embodiment.

However, if the logical block address is not consecutive, a collateral data copy operation is performed of the latter half of the data within a large block card 256 kBytes physical block (step C3 in FIG. 12). That is, as is shown in FIG. 15, in this 256 kBytes physical block there is a physical region Y1 of an old assign 16 kBytes logical block group which includes old data which is no longer required, and a physical region Y2 which includes effective data which remains effective because it hasn't been renewed by programming (renewed) up to the above stated physical block X1. Thus, data of this physical block Y2 is copied to a physical region Y3 which comes after the above stated physical block X1 within this 256 kBytes block. In addition, after copying, the CPU 35 erases data within the old 256 kBytes block which is no longer required.

Figure 16A:
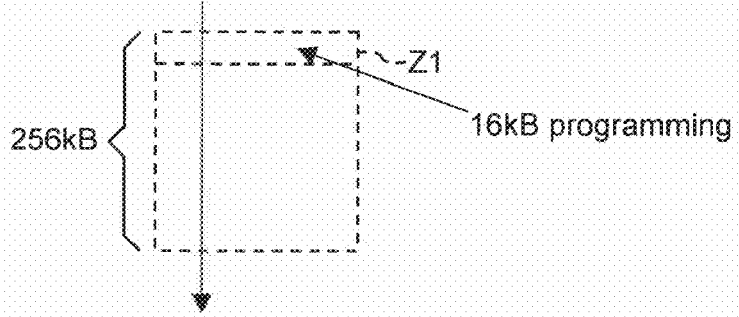
FIG. 16 typically shows a process in step C4 in FIG. 12 related to a first embodiment.
Figure 16B:
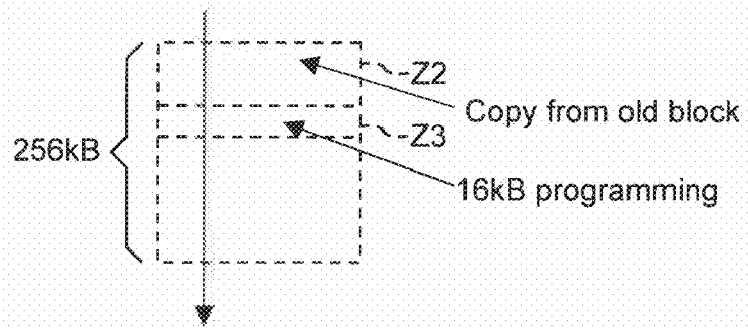

Next, a new large block card 256 kBytes physical block (after data erasure) is programmed and waits (step C4 in FIG. 12). Furthermore, treatment is different depending on whether a region to be programmed is a head of a 256 kBytes section. That is, if the region to be programmed is a head of a 256 kBytes section, 16 kBytes data is programmed to a physical block Z1 which is located is in that head position as is shown in FIG. 16A. However, if the region to be programmed is not a head of a 256 kBytes section, a collateral data copy operation is performed if the former half of the data. That is, as is shown in FIG. 16B, old assign 16 kBytes physical block group data is copied to a physical region Z2 just up to the above stated region which is to programmed from the head and then 16 kBytes data is programmed to a physical region X3 which is to be programmed.

Figure 17:
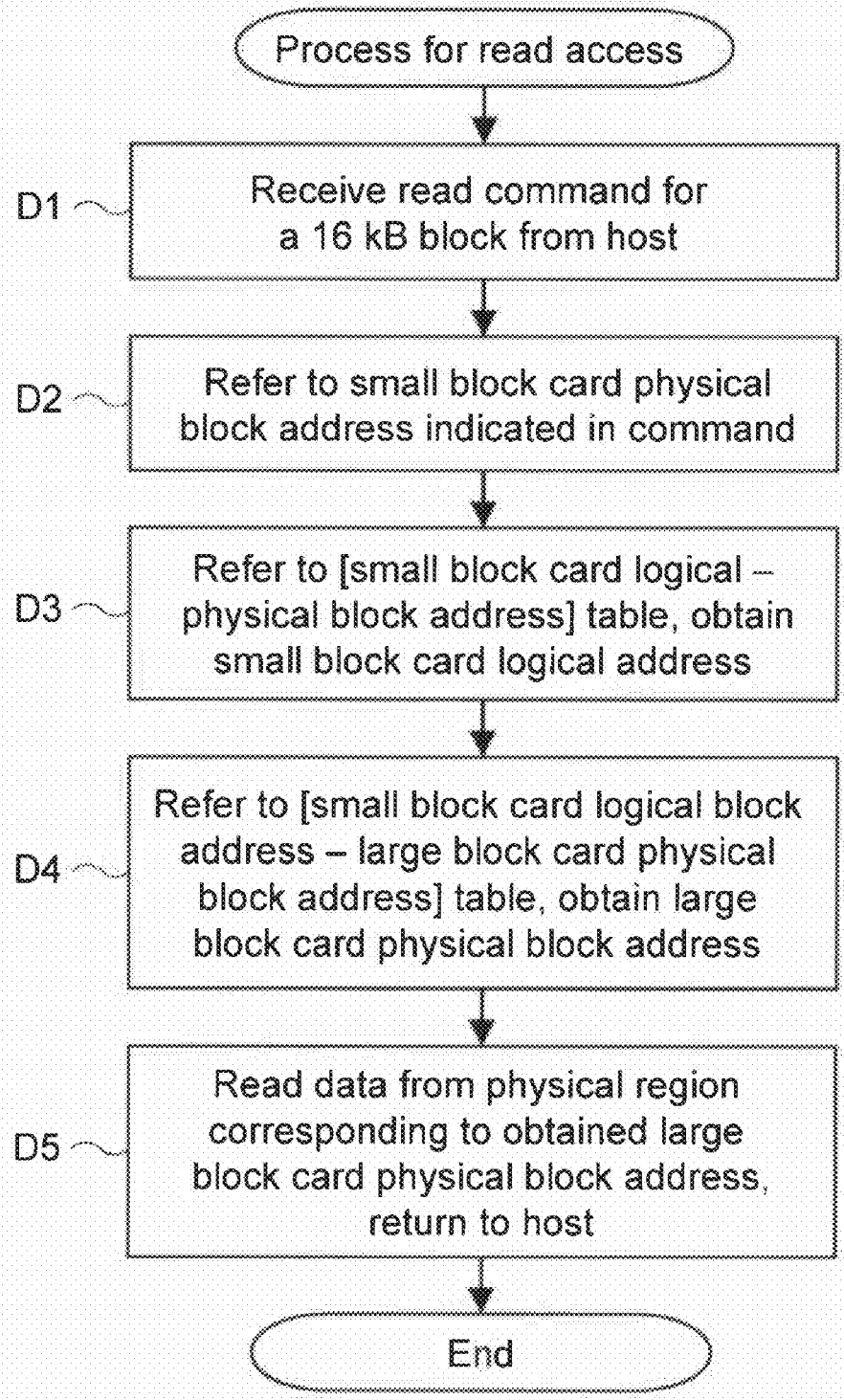
FIG. 17 is a flowchart which shows a process flow of a read access related to a first embodiment.

Next, the flow of the process for read access will be explained while referring to the flowchart in FIG. 17. When the CPU 35 receives a read command for example for a 16 kBytes block from the host equipment 20 (step D1), a small block card physical block address which is attached to this command is also obtained (step D2).

Next, by referring to the [small block card logical—physical block address] table 32a the CPU 35 obtains a small block logical block address from the obtained small block card physical block address (step D3). Next, by referring to the [small block card logical block address—large block card physical block address] table 32b the CPU 35 obtains a large block card physical block address from the obtained small block logical block address (step D4). Finally, the CPU 35 reads data from a physical region which is in the obtained large block card physical block address and returns it to the host equipment 20 (step D5).

Figure 18:
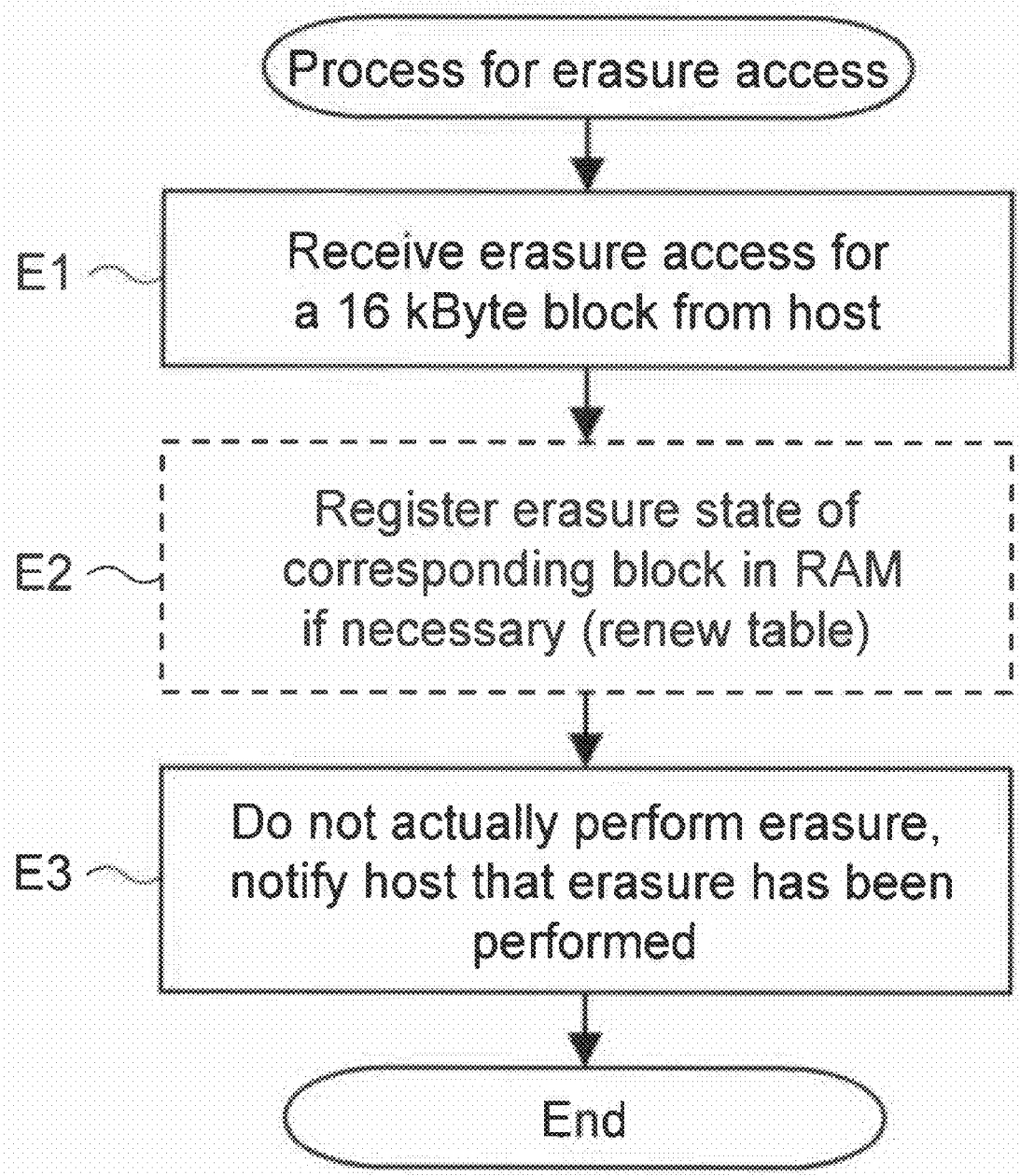
FIG. 18 is a flowchart which shows a process flow of an erasure access related to a first embodiment.

Next, the flow of a process for erasure access will be explained while referring to the flowchart in FIG. 18. When the CPU 35 receives an erasure command for, for example, a 16 kByte physical block from the host equipment 20 (step E1), if required, data which shows that this block is in an erasure state is stored in a predetermined region in the buffer RAM 32 (a predetermined table is renewed) (step E2).

Furthermore, the process in this step E2 may be omitted. If the process in E2 is performed in advance, in the case where there is a confirmation request of an erasure state from the host equipment 20 side when the power supply is off or on, it is possible to correctly respond to that erasure state.

Lastly, the CPU 35 notifies the host 20 that erasure has been performed without actually performing an erasure process on a specified block (step E3).

Figure 19:
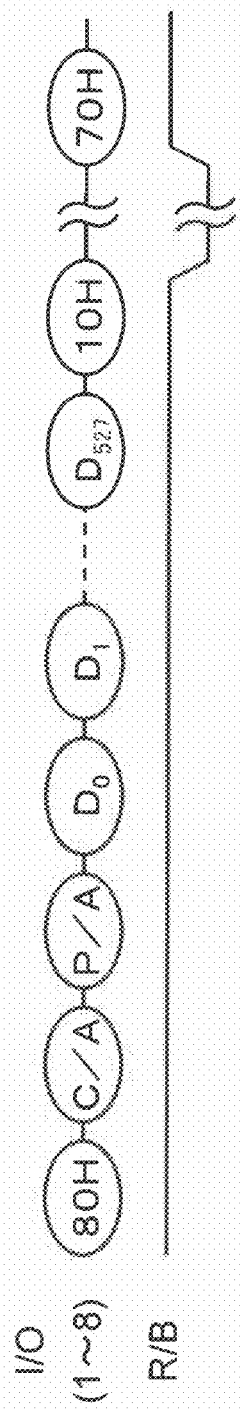
FIG. 19 is a timing chart which shows an example of a signal which is input/output to an I/O pin and an R/B pin when a host equipment programs a memory card related to a first embodiment.

FIG. 19 is a timing chart which shows an example of a signal which is input/output to an I/O pin and R/B pin of the memory card 1 when the host equipment 20 performs programming to the memory card 1 of the first embodiment.

The host equipment 20 controls the memory card 1 assuming that the memory card 1 is a nonvolatile memory which includes a 16 kBytes erasure block size. For example, when the memory card 1 is programmed, the host equipment 20 inputs a serial data input command 80H (H indicates a hexadecimal base) to the I/O pins 1 to 8. Next, the host equipment 20 inputs a column address C/A and page address P/A to the I/O pins 1 to 8. Furthermore, here the column address C/A and page address P/A are a column address and page address in a virtual physical address space in the memory card 1 which the host equipment 20 assumes.

Furthermore, the host equipment 20 inputs programming data 528 times to the I/O pins 1 to 8. Specifically, while an input signal which is input to a write enable pin is clocked 528 times, the host equipment 20 shifts-in 528 bits (a total of 528 bytes to all the I/O pins) of data in order to each I/O pin. When the shift-in of data is complete the host equipment 20 inputs a program command 10 H to the I/O pins 1 to 8. In response to this, the memory card 1 outputs a low level signal to that R/B pin and memory card 1 is shown as being in a busy state. Following this, after a predetermined period of time, by outputting a high level signal to the R/B pin the memory card 1 is shown as being in a ready state.

However, the state of the R/B pin in FIG. 19 always shows what state the memory card 1 is in to the host equipment 20. In other words, in response to the input of the program command 10H in FIG. 19, even if the state of the R/B pin is shown as busy (that is, outputs a low level), it is not always the case that a programming operation to the NAND flash memory 4 within the memory card 1 (a transfer of data to a memory cell array from a page buffer) is actually carried out. In addition, even if the R/B pin is returned to a ready state, it is not always the case that a programming operation to the NAND flash memory 4 within the memory card 1 has been completed.

Figure 20:
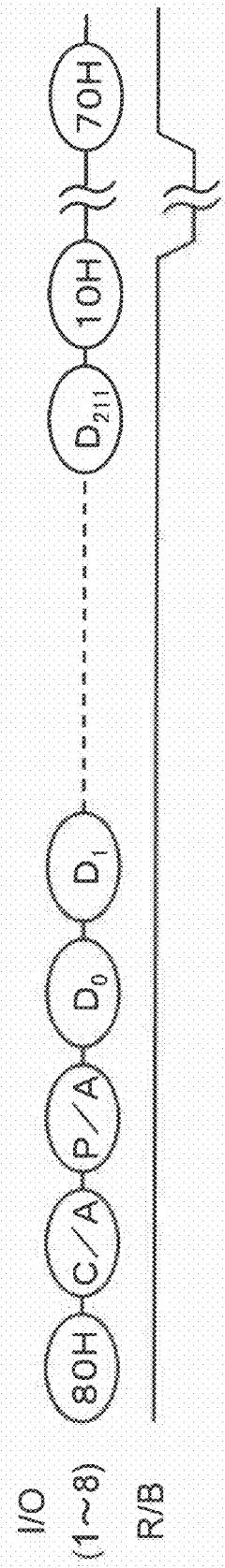
FIG. 20 is a timing chart which shows an example of a signal which is input/output to an I/O pin and an R/B pin when a controller B programs a nonvolatile memory within a memory card related to a first embodiment.

FIG. 20 is a timing chart which shows an example of a signal which is input and output to an I/O pin and a R/B pin of the NAND flash memory 4 when programming is carried out by the controller B3 of the memory card 1 to the NAND flash memory 4 within the memory card 1 of the first embodiment.

The controller B3 recognizes that the NAND flash memory 4 is a nonvolatile memory which has a 256 kBytes erasure block size. Similarly, the controller A2 recognizes that the NAND flash memory 4 is a nonvolatile memory which has a 256 kBytes erasure block size. For example, when the NAND flash memory 4 is programmed the controller B3 inputs a serial data input command 80H (H is a 16 hexadecimal base) to I/O pins 1 to 8. Next, the controller B3 inputs a column address C/A and a page address P/A to the I/O pins 1 to 8. Furthermore, it is not always the case that the column address C/A and the page address P/A match the column address and page address which the controller B3 assumes are actually in a physical space in the NAND flash memory 4.

Furthermore, the controller B3 inputs programming data 2112 times to the I/O pins 1 to 8. Specifically, while an input signal which is input to a write enable pin is clocked 2112 times, the controller B3 shifts-in 2112 bits (a total of 2112 bytes to all the I/O pins) of data in order to each I/O pin. When the shift-in of data is complete the controller B3 inputs a program command 10H to the I/O pins 1 to 8. In response to this, the memory card 1 outputs a low level signal to that R/B pin and memory card 1 is shown as being in a busy state. Following this, after a predetermined period of time, by outputting a high level signal to the R/B pin the memory card 1 is shown as being in a ready state.

The state of the R/B pin in FIG. 20 shows what state the NAND flash 4 is actually in to the controller B3.

Furthermore, each input of the column address C/A and the page address P/A is shown in one cycle in FIG. 19 and FIG. 20 stated above, however, the number of cycles can be two or more depending on the capacity of the memory card 1 and the NAND flash memory 4.

Figure 21:
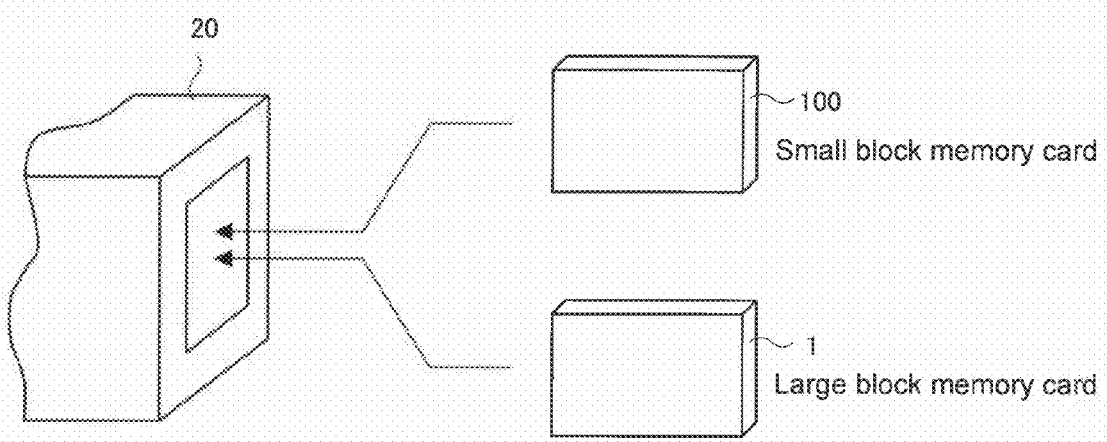
FIG. 21 is a diagram which typically shows a usage method of a memory card related to a first embodiment.

FIG. 21 is a diagram which typically shows a usage method of the memory card 1 in the first embodiment.

For example, it is assumed that the controller which is mounted in advance in the host equipment 20 uses a small block card 100 which has a block erasure unit of 16 kBytes. In this case, when a large block card is realized using a memory which has a block erasure unit of 256 kBytes without internally mounting an appropriate controller within the memory card, there are cases where a normal access can not be achieved because the units of erasure are different. As a result, if a large block card 1 is realized which includes a controller 3 for a memory which has a block erasure unit of 256 kBytes based on the first embodiment, it is possible to use a large block card by inserting a large block 1 even in the host 20 which is enabled for a small block card.

In this way, according to the first embodiment, a consecutive logical block address is obtained from data which is added to a programming command sent from the host equipment 20 side which accesses a small block card and data is arranged in order of a logical block address of a small block card in a physical block of a large block card. An optimum data arrangement can be realized by this operation and overheads at the time of programming can also be reduced. In addition, by managing a corresponding relationship between a small block card physical—logical block address and a large block card physical block address it is possible to efficiently maintain consistency between a small block card and a large block card. In addition, an erasure command from the host equipment 20 is not actually reflected in one part of a large block card erasure size (when a partial erasure state is assumed) but it is possible to reduce the operation load within a large block by pretending that an erasure block within a memory card has been erased.

In addition, the memory card 1 of the present embodiment is comprised of a controller A2 which controls the operations of the entire memory card 1, and a controller B3 which controls the processes for accessing the NAND flash memory 4. The controller B3 is connected with the controller A2 via the NAND bus 12 and the controller B3 is constructed so that the controller A2 is recognized as a NAND flash memory. As a result, for example, in the case where the generation of the NAND flash memory 4 is changed, the protocols such as control commands which are carried out via the NAND bus 13 are renewed or where a need arises to renew the ECC circuit 33 for maintaining reliability, it is possible to reconstruct the memory card 1 without changes to the controller A2 and the host equipment 20 which is connected to the host bus 11 by renewing the NAND_I/F 34 and the ECC circuit 33 of the controller B3.

Figure 22:
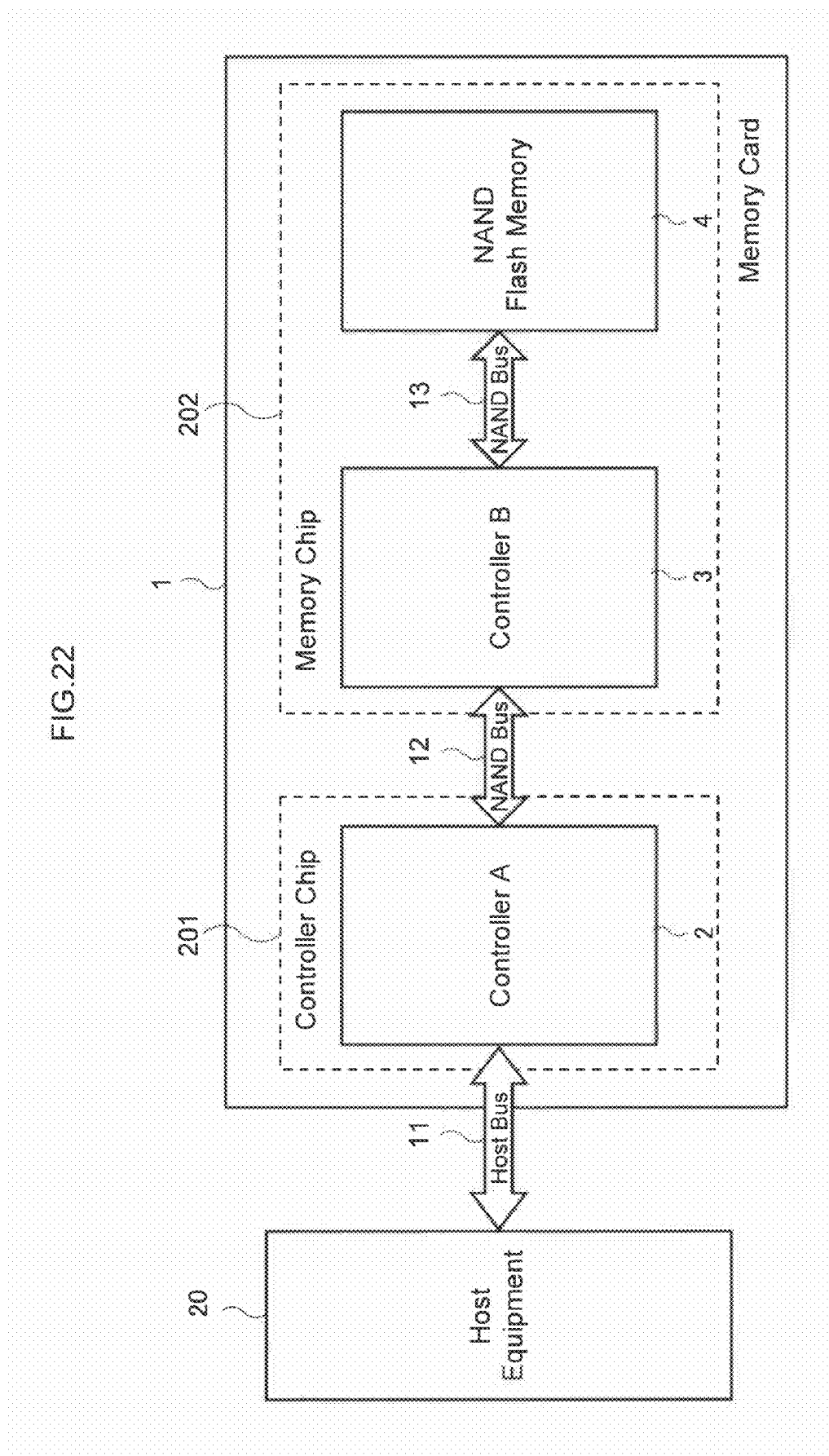
FIG. 22 is a diagram which shows an outline construction of a different memory card related to a first embodiment.

Furthermore, when constructing the memory card 1 shown in FIG. 1 stated above, the two controllers A2 and B3 and the NAND flash memory 4 may be constructed as separate packages. For example, as is shown in FIG. 22, the memory card 1 is constructed as a controller chip 201 which includes the controller A2 and a memory chip 202 which includes the controller B3 and the NAND flash memory 4. By constructing the memory card in this way, even if the generation of the NAND flash memory 4 is changed, it is possible to reconstruct the memory card 1 without influencing the memory card 1 by only exchanging the memory chip 202.

Second Embodiment

Figure 23:
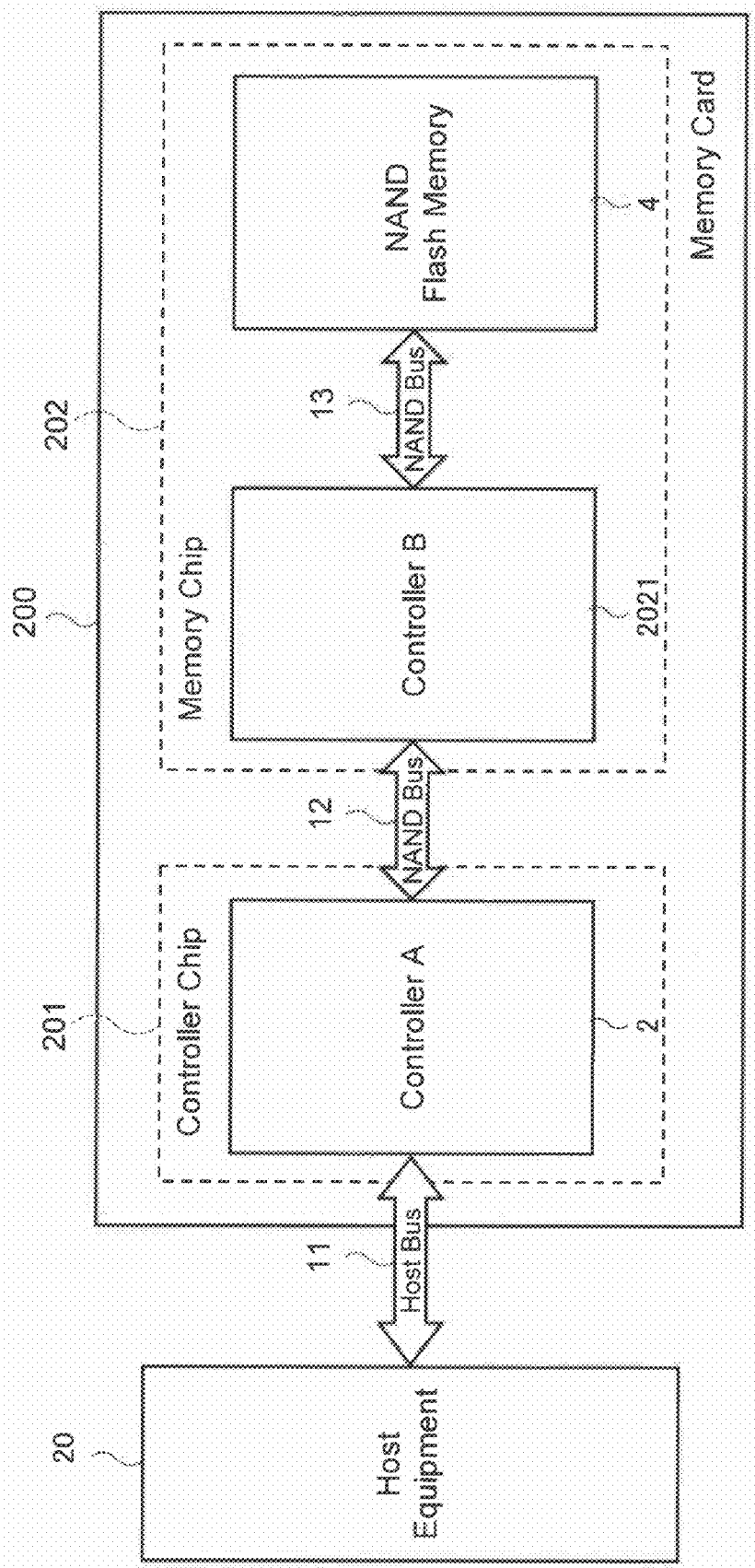
FIG. 23 is a diagram which shows an outline construction of a memory card related to a second embodiment.

In the second embodiment a memory card which has a controller B with a construction forming a circuit which directly connects the NAND bus 12 and the NAND bus 13 is proposed. FIG. 23 is a diagram which shows an outline construction of a memory card related to the second embodiment. Furthermore, in FIG. 23, the structural parts which are the same as in the memory card 1 shown in FIG. 22 in the first embodiment stated above, have the same symbols and thus an explanation of their structure is omitted.

As is shown in FIG. 23 a memory card 200 includes a controller chip 201 which includes the controller A2 and a memory chip 202 which includes a controller B2021 and the NAND flash memory 4. The controller A2 is connected to the host equipment 20 by the host bus 11 and also connected to the controller B201 via the NAND bus 12. The controller B2021 is connected to the controller A2 via the NAND bus 12 and also connected to NAND flash memory 4 via the NAND bus 13. The NAND flash memory 4 is connected to the controller B2021 via the NAND bus 13. Furthermore, the NAND flash memory 4 may be a 2 level memory which stores 1 bit of data in one memory cell or a multi-level memory which stores multiple data (for example, 2 bits) in one memory cell. Here, a NAND flash memory is explained as an example of a nonvolatile memory, however, a nonvolatile memory is not limited to a NAND flash memory, for example, a NOR type flash memory may also be used.

In the second embodiment the host equipment 20 is electrically connected with the memory card 200 as a tester when the memory card 200 is tested before shipment. The controller B2021 converts an address which the NAND_I/F 31 receives and operates by a first mode which accesses the NAND flash memory 4 using this converted address and a second mode which directly accesses the NAND flash memory 4 using the address which the NAND_I/F 31 receives, and controls switching of an operation mode between the first mode and second mode according to a command.

Below, an operation which switches the first mode to the second mode is called a shift operation and an operation which switches the second mode to the first mode is called a return operation. Furthermore, the first mode is an operation mode in which the host equipment 20 does not directly access the NAND flash memory 4 and indicates an operation mode similar to when actually using the memory card 200.

During testing before shipping, the host equipment 20 separately tests the controller B2021 and the NAND flash memory 4. In the explanation below, a test which tests only the controller B2021 is called a [controller unit test] and a test which only tests the NAND flash memory 4 is called a [NAND unit test]. During the controller unit test the first mode is set as an operation mode and during the NAND unit test the second mode is set as an operation mode.

The NAND flash memory 4 has, for example, a storage capacity of 1 GBits or more, the erasure block size is set at 256 kBytes and programming and reading of data is set at units of 16 kBytes. Furthermore, the NAND flash memory 4, for example, is manufactured using a 0.09 μm process technology and the design rule is assumed to be less than 0.1 μm.

Figure 24:
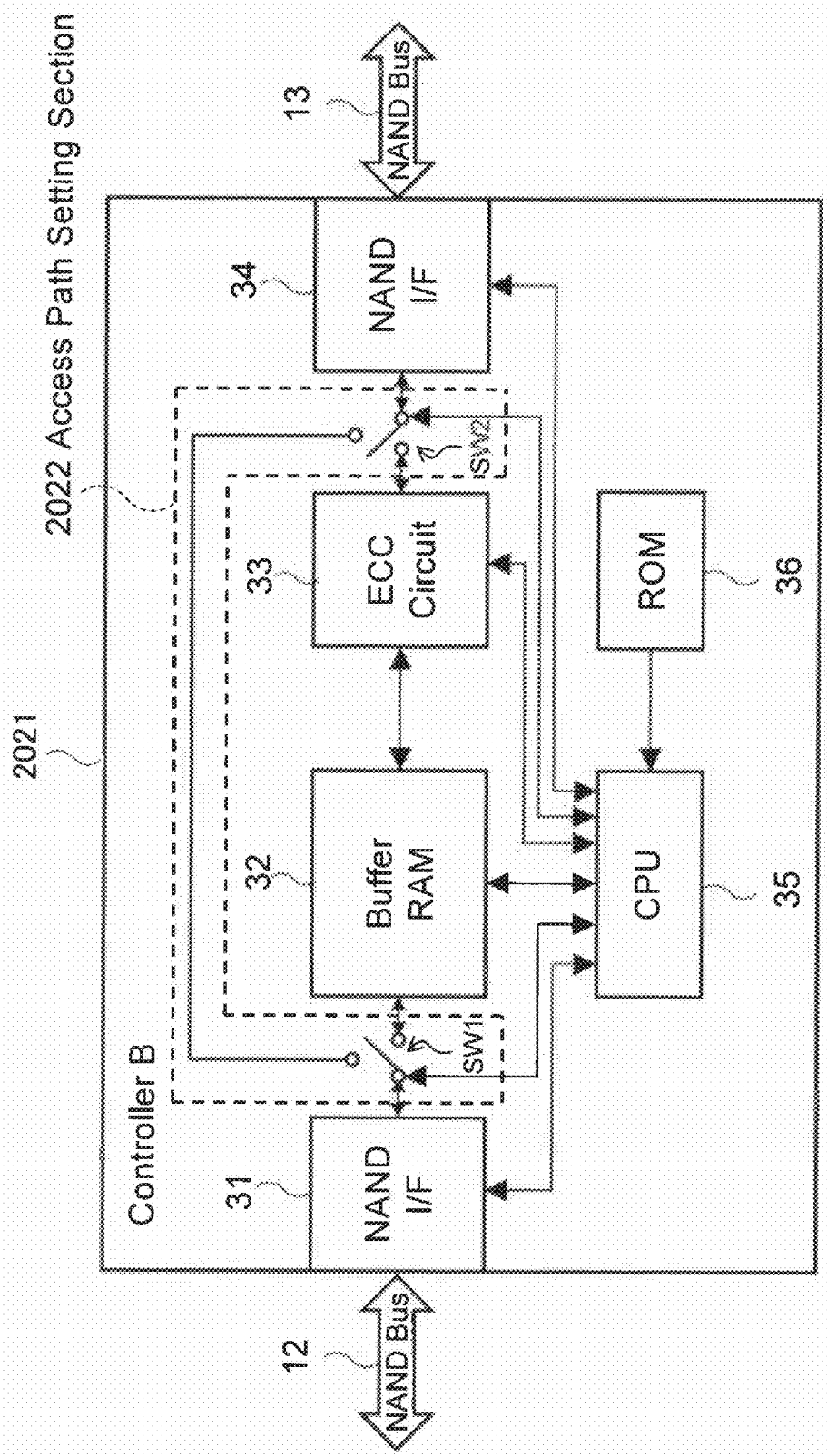
FIG. 24 is a diagram which shows an outline construction of a controller B related to a second embodiment.

As is shown in FIG. 24, the controller B2021 includes the NAND_I/F 31, the buffer RAM 32, the ECC circuit 33, the NAND_I/F 34, the CPU 35, the ROM 36 and an access path setting section 2022.

The CPU 35 controls the processes which access the NAND flash memory 4. In a first mode the CPU 35 loads firmware which is stored in the ROM 36 into the buffer RAM 32 and performs a predetermined process. A variety of tables are created in the buffer RAM 32 by the processes carried out by the CPU 35 during the first mode, a programming command, a read command and erasure command are received from the host equipment 20, the NAND flash memory 4 is accessed and a transfer process of data via the buffer RAM 32 is controlled.

The access path setting section 2022 sets a path for the host equipment 20 to directly access the NAND flash memory 4 during the second mode. As is shown in FIG. 24, the access path setting section 2022 includes a first switch SW1 which is connected between the NAND_I/F 31 and the buffer RAM 32 and also includes a second switch SW2 which is connected between the ECC circuit 33 and the NAND_I/F 34. The first switch SW1 and the second switch SW2 switch the connection relationships between the NAND_I/F 31, the buffer RAM 32, the ECC circuit 33 and the NAND_I/F 34 according to a switch control signal input from the CPU 35. During the second mode, data programming and data read bypass the buffer RAM 32 and the ECC circuit 33 via this switching and it is possible to directly transmit a command issued by the host equipment 20 to the NAND flash memory 4.

Because the controller B2021 is constructed by controlling the shift operation and return operation according to a command as stated above, it is possible to realize the second mode without increasing the number of external connection pins of the memory card 200.

Figure 25:
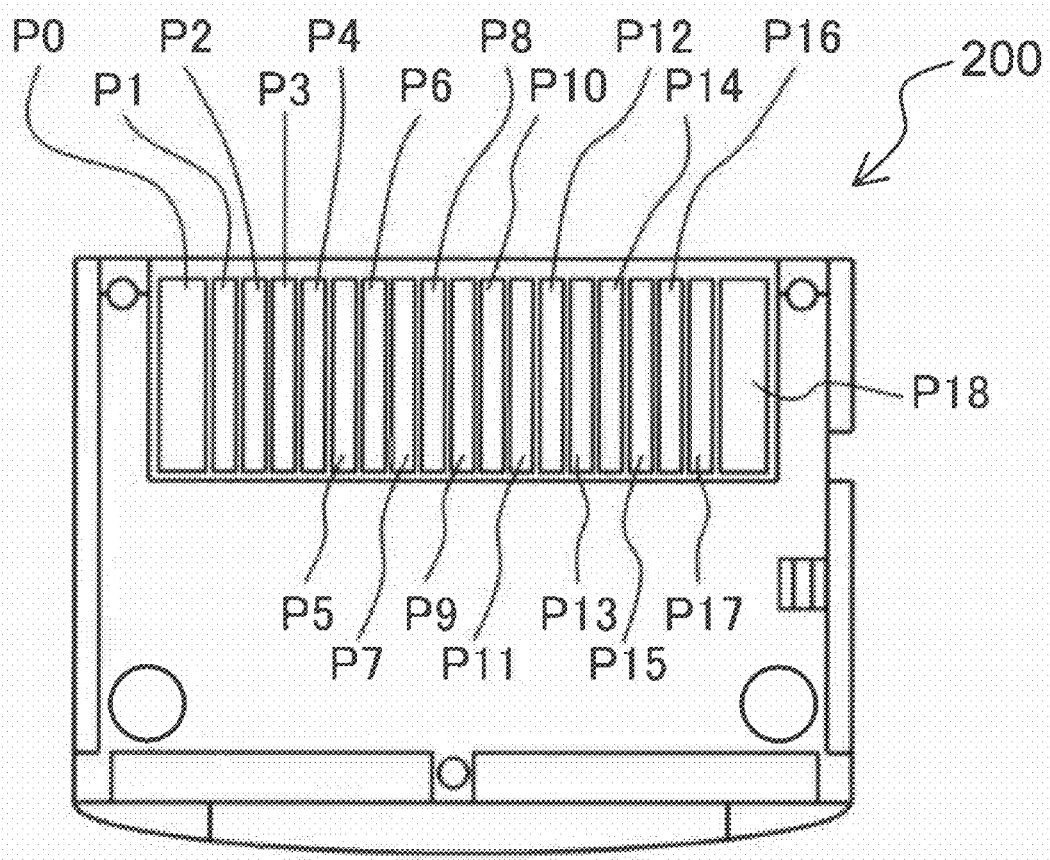
FIG. 25 is a diagram which shows an example placement of an external connection pin of a memory card related to a second embodiment.

An example of the memory card 200 external connection pin placement is shown in FIG. 25. FIG. 25 is a planar diagram which shows the memory card 200 from the view of pin formation. The memory card 200 includes eighteen external connection pins, a first pin to an eighteenth pin P1 to P18. Examples of the signals which are allocated to each pin P1 to P18 are shown in FIG. 26. Furthermore, with regard to type, FIG. 26 shows that the symbol "S" is a power supply, "I" is an input to the memory card 200, "O" is an output from the memory card 200 and "I/O" shows inputs and outputs to and from the memory card 200. In addition, with regard to the symbol attached to the head of each pin name (symbol name) "−" is a low true signal, that is, a signal which is activated when a level is "Low".

In FIG. 26, the first and ninth pin P1 and P9 are allocated as ground voltages GND and the eighteenth pin P18 is allocated as a power supply voltage Vcc.

The second pin P2 is allocated with a ready/busy (R/−B) signal for notifying the host equipment 20 of an internal operation state of the memory card 200. In the memory card 200, during programming, read and erasure of data operations, a busy signal is output from the second pin P2 and when an operation is complete a ready signal is output from the second pin P2.

The third pin P3 is allocated with a read enable (−RE) signal which outputs data form the memory card 200. The fourth pin P4 is allocated with a card enable (−CE) signal which makes the state of the memory card 200 operational.

The fifth pin P5 is allocated with a command latch enable (CLE) signal for controlling the loading of commands. The sixth pin P6 is allocated with an address latch enable (ALE) signal for controlling the loading of addresses.

The seventh pin P7 is allocated with a write enable (−WE) signal for programming the memory card 200 with data. The eighth pin P8 is allocated with a write protect (−WP) signal for forcibly forbidding programming and erasure.

The tenth to seventeenth pins P10 to P17 are allocated with command, address and each bit of data D0 to D7. Furthermore, the example arrangement of the external connection pins shown in FIG. 26 corresponds one to one with the pins (not shown in the diagram) included in the host I/F 21 (see FIG. 2) within the controller A2 which is connected to the host bus 11 shown in FIG. 24.

The NAND flash memory 4 and the NAND_I/F 34 include the same pin construction as the host I/F 21 shown in FIG. 26. Specifically, the NAND flash memory 4 and the NAND_I/F 34 are arranged with input output (I/O) pins one to eight which are input and output with commands, addresses and data, an R/−B pin which outputs a ready/busy signal, an −RE pin which is input with a read enable signal, a −CE pin which is input with chip enable signal, a CLE pin which is input with a command latch enable signal, an ALE pin which is input with an address latch enable signal, a −WE pin which is input with write enable signal and a −WP pin which is input with a write protect signal.

As stated above, the memory card 200 includes a pin structure which corresponds to the pin structure of the NAND flash memory 4 and it is possible for the host equipment 20 to access the memory card 200 by a command sequence to the NAND flash memory 4. Here, [command sequence] means one command combined with and address, a combination of a plurality of commands or a combination of one or a plurality of commands, addresses and data.

As stated above, the controller B2021 controls a shift operation and a return operation according to a command. However, the controller B2021 might malfunction by recognizing a command related to a shift operation and return operation input from the host equipment 20 as a programming command or read command. In addition, in the case where the same address or data as a command which indicates a return operation from the host equipment 20 (for example, "FFh"

command (h indicates a 16 hexadecimal base)) is input, the controller B2021 might carry out an unintended return operation.

Thus, in the second embodiment, by controlling a shift operation and return operation by a command sequence which is input to the controller B2021 from the host equipment 20, it is possible to avoid malfunction of the controller B2021. Specifically, in the case where the NAND unit is tested, the host equipment 20 issues a command sequence which indicates a shift operation after the power supply to memory card 200 is turned on. The controller B2021 sets an operation mode to the second mode by receiving the command sequence and maintains the second mode until a command sequence which indicates a return operation is issued by the host equipment 20. In this way, it is possible to avoid an unintended return operation from being carried out by the controller B2021 during the second mode by using a command sequence.

Furthermore, the host equipment 20 allocates logical addresses and physical addresses in 16 kBytes units assuming that in the first mode the NAND flash memory 4 will be used with an erasure block size being set at 16 kBytes. Because the host equipment 20 performs programming access or read access sequentially with regard to logical address of 16 kBytes in the first mode, that command is issued. Furthermore, the expressions [logical block address] and [physical block address] which are used in the explanations below each mean a logical address and a physical address which are allocated to a block itself within the NAND flash memory 4. In addition, [logical address] and [physical address] mainly refer to a logical address and physical address of a block itself. However, they could also be addresses equivalent to a unit of resolution which is smaller than a block unit.

In addition, the host equipment 20 manages the physical state within the memory card 200, for example, which logical sector address data is included in which physical block address, or which block is in an erasure state. The host equipment 20 is constructed so that the NAND flash memory 4 within the memory card 200 is directly controlled.

For example, the host equipment 20 operates assuming that the NAND flash memory 4 is used with erasure blocks being set at 16 kBytes. In this case, because the actual erasure block size of the NAND flash memory 4 is 256 kBytes the memory card 200 can not respond normally and malfunctions.

In order to avoid the above stated malfunction of the memory card 200, a command sequence process is issued by the host equipment 20 which assumes that an erasure block size smaller than an erasure block size of the NAND flash memory 4, and the controller B2021 controls each operation, programming, read and erasure to the NAND flash memory 4.

A difference in data arrangement between the NAND flash memory assumed by the host equipment 20 and the NAND flash memory 4 which is actually used will be explained using FIG. 27.

The NAND flash memory assumed by the host equipment 20 has a storage capacity of 528 Bytes comprised of a data storage section where each page is 512 Bytes and a 16 Byte redundant section wherein one unit of erasure is 32 pages (16 kBytes+0.5 kBytes). Below, for the purposes of explanation, a memory card mounted with a NAND flash memory which has this type of page construction will sometimes be referred to as [small block card].

However, the NAND flash memory 4 which is actually used has a storage capacity of 2112 Bytes comprised of four data storage sections in which each page is 512 Bytes, four 10 Bytes redundant sections and a 24 Bytes management data storage section wherein one erasure unit is 128 pages (256 kBytes+8 kBytes). Below, for the purposes of explanation, the memory card 200 which is mounted with the NAND flash memory 4 which has this type of page construction will sometimes be referred to as [large block card].

Figure 27:
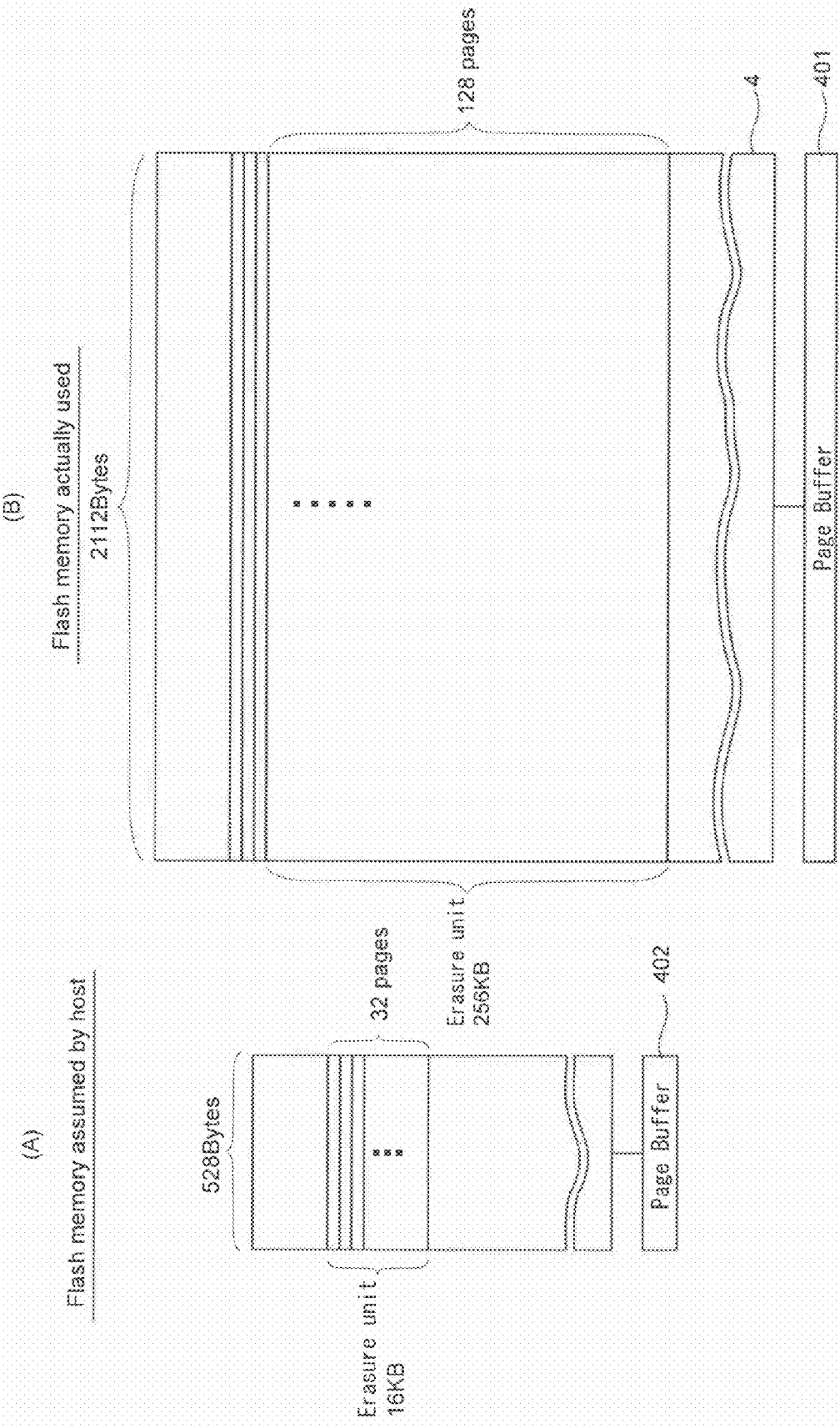
FIG. 27 is a diagram which shows the difference in data placement between a flash memory presumed by a host equipment related to a second embodiment and a NAND flash memory which is actually used.

In addition, as is shown in FIG. 27, the NAND flash memory assumed by the host equipment 20 and the NAND flash memory 4 which is actually used are each respectively arranged with a page buffer 401 and 402 for inputting and outputting data to the NAND flash memory. The storage capacity of the page buffer 401 which is arranged on the NAND flash memory assumed by the host equipment 20 is 528 Bytes (512 Bytes+16 Bytes). However, the storage capacity of the page buffer 402 which is arranged on the NAND flash memory 4 which is actually used is 2112 Bytes (2048 Bytes+64 Bytes). Data input and output to the NAND flash memory when data programming for example, is performed in one page units which is equivalent to the storage capacity of each page buffer 401 and 402.

As stated above, the page construction of the NAND flash memory assumed by the host equipment 20 and the NAND flash memory which is actually used is different. As a result, controller B2021 carries out each process for enabling the host equipment 20 access to the NAND flash memory 4.

Figure 28:
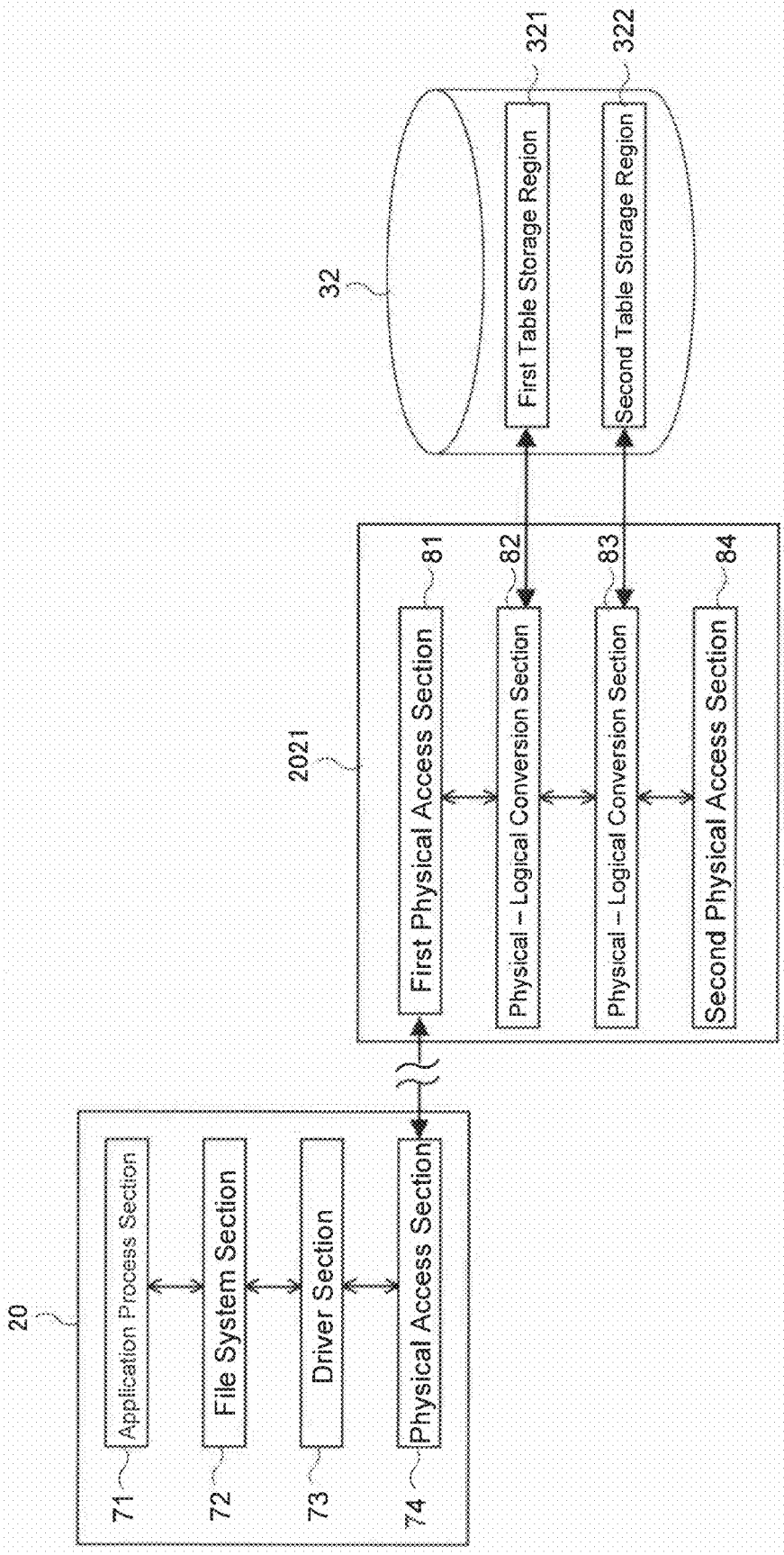
FIG. 28 is a diagram which shows a construction example of each function of a controller B within a host equipment and a memory card related to a second embodiment.

An example construction of each function of the controller B2021 within the host equipment 20 and the memory card 200 is shown in FIG. 28. The host equipment 20 realizes each function of an application process section 71, a file system section 72, a driver section 73 and a physical address section 74 which are shown in FIG. 28 by carrying out a program in a CPU (not shown in the diagram) for example housed in a ROM (not shown in the diagram) in the host equipment 20 side.

The controller B2021 realizes each function of a first physical access section 81, a physical—logical conversion section 82, a logical—physical conversion section 83 and a second physical access section 84, by carrying out a control program which is housed in a ROM 36 in the CPU 35.

When the application process section 71 of the host equipment 20 side requests programming of a file to the file system section 72, the file system section 72 instructs the driver 73 to perform sequential sector programming based on a small block card logical block address. Because the driver section 73 which receives this instruction realizes sequential programming to every 16 kBytes based on a small block card logical block address, logical—physical block conversion takes place, a random programming command is issued to the large block card by a small block card physical block address via the physical access section 74 and data is transferred.

According to protocol, in programming access, data is sent and received in the order (1) command (2) page address (row address) (3) column address (4) data (5) program confirmation command, in the case of a small block card and a large block card.

When the first physical access section 81 of the controller B2021 side receives a programming command by a small block card physical block address from the host equipment 20, a logical block address which is included in additional data apart from a physical block address or data, is obtained.

The physical—logical conversion part 82 creates a first table for performing a process to convert a small block card physical block address (corresponding to 16 kBytes) into a small block card logical block address (corresponding to 16 kBytes) when data is read. The first table is stored in a first table storing region 321 in the buffer RAM 32. The first physical access section 81 receives a programming command and when a small block card logical block address is obtained the physical—logical conversion part 82 reflects that logical block address in the first table. In addition, the physical—logical conversion section 82 also reflects a physical block address in the first table.

The logical—physical conversion section 83 creates a second table for performing a process to convert a small block card logical block address (corresponding to sixteen sequential 16 kBytes) into a large block card physical block address (corresponding to a 256 kByte block) when data is read. The second table is stored in a second table storing region in the buffer RAM 32. The first physical access section 81 receives a programming command and when a small block card logical block address is obtained the logical—physical conversion section 83 reflects that logical block address in the second table.

The first physical access section 81 receives a programming command, a data arrangement within the NAND flash memory 4 is set based on the obtained small block card logical block address and the second physical access section 84 sequentially programs 16 kByte data in 2 kBytes units (one page) in a 256 kBytes physical block. In addition, the second physical access section 84 stores a small block card logical block address or a physical block address which is obtained in a predetermined region in a management data region within the NAND flash memory 4.

In this way, the host equipment 20 issues a command based on the small block card physical block address. As a result, in the memory card 200 side, data which corresponds to a small card block physical block address is managed so that it is understood in which 256 kBytes physical block this data exists. Specifically, the controller B2021 manages a corresponding relationship of a small block card logical—physical block address for every 16 kBytes block and data which corresponds to a small block card consecutive 256 kBytes logical block address is managed so that it is understood in which 256 kBytes physical block within the NAND flash memory 4 of the memory card 200 this data is housed.

Next, an example of a format of a command which is sent to the memory card 200 from the host equipment 20 will be explained while referring to FIG. 29. A packet of a command which is sent from the host equipment 20 includes various data such as command classification data (for example, programming command), address (physical block address), and data (content data such as actual data and additional data (512 Bytes+16 Bytes)) as is shown in FIG. 29A.

In the packet of this type of format as is shown in FIG. 29B, a small block card logical address (a logical address corresponding to a 16 kBytes block to be accessed) is arranged in a predetermined position among 16 Bytes additional data. The memory card 200 obtains in particular a logical block address apart from obtaining command classification data, physical block address and data from a command which is sent from the host equipment 20. Furthermore, the logical block address is not added in the case of a read command.

Next, a block programming operation assumed by the host equipment 20 and a programming process actually carried out by the memory card 200 in a first mode are contrasted and explained while referring to FIG. 30.

Figure 30B:
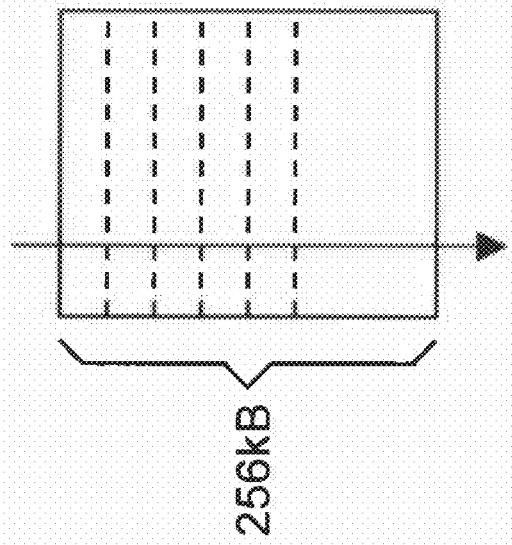
FIG. 30B is a diagram which shows a comparison of a programming process which is actually carried out by a memory card (large block card) related to a second embodiment.
Figure 30A:
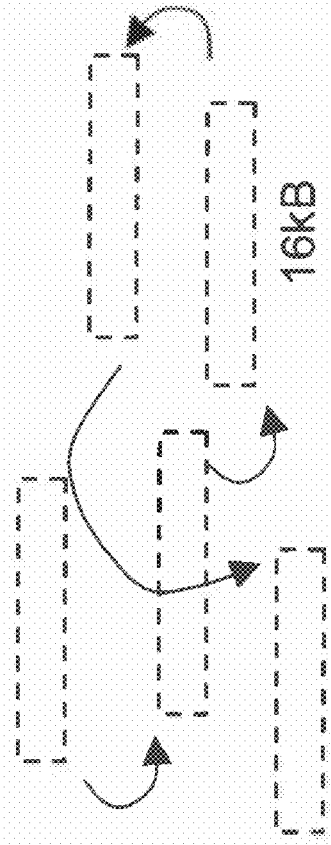
FIG. 30A is a diagram which shows a block programming operation presumed by a host equipment related to a second embodiment.

In the host equipment 20 side, as is shown in FIG. 30A, when a sequential programming operation of 16 kBytes block units based on a small block card logical address is generated, a random programming operation of 16 kBytes block units is performed by a small block card physical block address.

In the memory card 200 side, as is shown in FIG. 30B, when a programming command is received from the host equipment 20, 16 kBytes block unit data is sequentially programmed within the NAND flash memory 4 based on the small block card logical block address.

As stated above, the host equipment 20 performs a random programming operation in 16 kBytes block units by a small block card physical address. Generally, in this type of random programming operation reprogramming of only one part of a large block (256 kBytes) often occurs. Because erasure is only carried out in block units in the NAND flash memory 4, when only one part of a block is reprogrammed, a new block in which erasure of new data which is to be reprogrammed is complete is programmed and there is a need to copy the remaining data which can not be reprogrammed to a new block from an old block in which the new data is reprogrammed.

As stated above, because a process which reprograms only a part of a block is performed as well as a copy operation of data which can not be reprogrammed (collateral data copy), when a process to reprogram only one part of a block occurs often, overheads increase significantly. Thus, in the second embodiment, by reallocating physical addresses in the memory card 200 side according to the order of logical addresses obtained from the host equipment 20 side, reprogramming of only one part of a block can be reduced and an increase in overheads can also be reduced.

Figure 31:
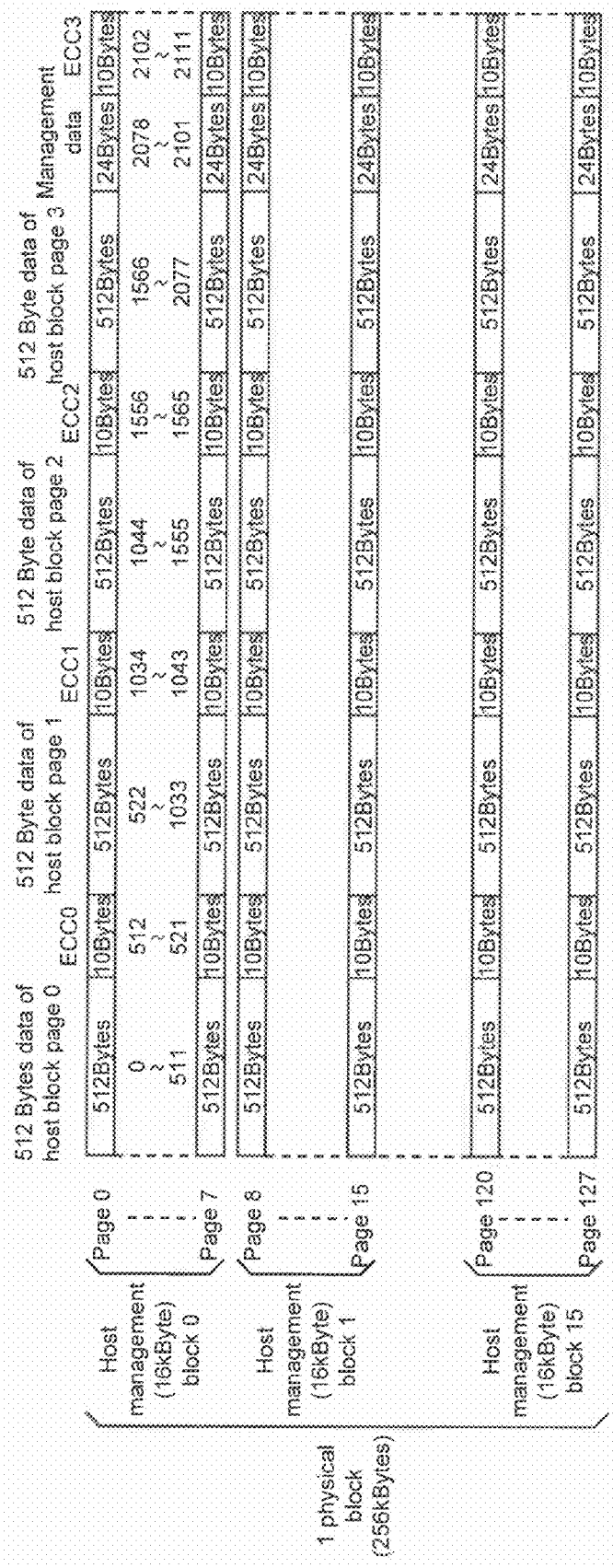
FIG. 31 is a diagram which shows a block format (256 kByte physical block) of a flash memory within a large block card related to a second embodiment.

Next, the block format of the NAND flash memory 4 (a 256 kbytes physical block which is a unit of erasure) will be explained while referring to FIG. 31.

In the NAND flash memory 4, sixteen blocks (below referred to as host management blocks) for programming data which is equivalent to 16 kByes which is a unit managed by the host equipment 20, are included among the 256 kBytes physical blocks which are the unit of erasure. At the time of programming data each of data is arranged according to the order of logical block addresses of a small block card.

Each host management block is comprised of 8 pages. Each page includes four 512 Bytes data regions and a 10 Bytes error correction code region (ECC) which corresponds to each data region. In addition, after the last 512 Bytes data region (fourth 512 Byte data region) in a page, a 24 Bytes management data region is arranged. As a result, the last 10 Bytes ECC region in a page is comprised of both the fourth 512 Byte data region and the 24 Bytes management data region.

Among the 128, 24 Bytes management data regions which are included in a 256 kBytes physical block which is a unit of erasure, for example, address data which is equivalent to a physical block address obtained from a command sent from the host equipment 20 and address data which is equivalent to a logical block address, are organized and stored in the last 24 Bytes management data region. The data of these addresses are used when the above stated the first and second tables are created.

Next, an example signal which is input/output to an input/output (I/O) pin (tenth to seventeenth pin P10 to P17) of the memory card 200, and to a ready/busy (R/–B) pin (second pin P2), when the host equipment 20 programs to the memory card 200 in a first mode will be explained while referring to FIG. 32.

The host equipment 20 controls the memory card 200 assuming that the memory card 200 is a nonvolatile memory which has a 16 kBytes erasure block size. As a result, when programming is performed to the memory card 200 the host equipment 20 inputs the serial data input command "80H" to the I/O pins (tenth to seventeenth pins P10 to P17). Next, the host equipment 20 inputs a column address "C/A" and a page address "P/A" to the I/O pins (tenth to seventeenth pins P10 to P17). Furthermore, here, a column address "C/A" and a page address "P/A" are a column address and page address which are assumed to exist by the host equipment 20 in a virtual physical address space in the memory card 200.

Furthermore, the host equipment 20 inputs programming data 528 times to each of the I/O pins (tenth to seventeenth pins P10 to P17). Specifically, while an input signal is clocked 528 times to a write enable pin (seventh pin P7) the host equipment 20 shifts in order 528 bits of data (a total of 528 Bytes for all the I/O pins) to each I/O pin (tenth to seventeenth pins P10 to P17). When data shifting is completed the host equipment 20 inputs the program command "10H" to the I/O pins (tenth to seventeenth pins P10 to P17). In reply to this the memory card 200 outputs an "L" signal to the ready/busy (R/−B) pin and notifies the host equipment 20 that the memory card 200 is in a busy state. After this, following a specific period of time an "H" signal is output to the ready/busy (R/−B) pin and the host equipment 20 is notified that the memory card 200 is in a ready state.

However, the state of the ready/busy (R/−B) pin in FIG. 32 shows the host equipment 20 what state the memory card 200 is in. In other words, in FIG. 32, in reply to the input of a program command "10H" even if the ready/busy (R/−B) pin of the memory card 200 is shown as being in a busy state (that is, an "L" signal is output), it is not always the case that a programming operation (data transfer from the page buffer 401 to the memory cell array) is actually performed to the NAND flash memory 4 within the memory card 200. In addition, even if the ready/busy (R/−B) pin is returned to a ready state, it is not always the case that a programming operation to the NAND flash memory 4 within the memory card 200 has actually been completed.

An example of a signal which is input and output to the I/O pins 1 to 8 and R/−B pin of the NAND flash memory 4 in the first mode, when the controller B2021 within the memory card 200 programs to the NAND flash memory 4 within the memory card 200, is shown in FIG. 33.

The controller B2021 recognizes the NAND flash memory 4 as a nonvolatile memory which has a 256 kBytes erasure block size. When, for example, the NAND flash memory 4 is programmed, the controller B2021 inputs the serial data input command "80H" to the I/O pins 1 to 8. Next, the controller B2021 inputs the column address "C/A" and the page address "P/A" to the I/O pins 1 to 8. Furthermore, here, the column address "C/A" and the page address "P/A" are the column address and page address which exist in an actual physical address space in the NAND flash memory 4. Therefore, the column address and page address in FIG. 32 and the column address and page address in FIG. 33 do not always match.

Furthermore, the controller B2021 inputs programming data to each of the I/O pins 1 to 8, 2112 times. Specifically, while an input signal is clocked 2112 times to a write enable pin the controller B2021 shifts in order 2112 bits of data (a total of 2112 Bytes for all the I/O pins) to each I/O pin 1 to 8. When data shifting is complete the controller B2021 inputs the program command "10H" to the I/O pins 1 to 8. In reply to this the memory card 200 outputs an "L" signal to the ready/busy (R/−B) pin and notifies the host equipment 20 that the memory card 200 is in a busy state. After this, following a specific period of time an "H" signal is output to the ready/busy (R/−B) pin and the host equipment 20 is notified that the memory card 200 is in a ready state. The state of the R/−B pin in FIG. 33 actually shows what state the NAND flash memory 4 is in to the controller B2021.

Furthermore, one cycle of the input of each of the column address "C/A" and page address "P/A" is shown in FIG. 32 and FIG. 33, however, the capacity of the memory card 200 may appropriately be two or more cycles according to the capacity of the NAND flash memory 4.

In addition, in FIG. 32 and FIG. 33 a programming operation in the first mode was explained. However, in the second mode the host equipment 20 directly carries out a programming operation shown in FIG. 33 to the NAND flash memory 4 of the memory card 200.

Below, a method for testing a memory card related to the second embodiment is explained while referring to a flowchart shown in FIG. 34.

First, in step F1 it is determined by the controller B2021 whether the NAND unit has been tested or not. If the NAND unit has been tested (step F1: YES), the process moves to step F2. If the NAND unit has not been tested (step F1: NO) the process moves to step F5.

In step F2, the host equipment 20 outputs a command sequence, for example, "XX-YY-ZZ" which instructs the memory card 200 to carry out a shift operation. The CPU 35 of the controller B2021 sets an operation mode to the second mode according to the command sequence which instructs the shift operation. Specifically, an access path is set when the CPU 35 supplies a control signal which switches the first and second switches SW1 and SW2 of the access path setting section 2022. When an operation mode is set to the second mode the process moves to step F3.

In step F3, the host equipment 20 tests the NAND unit By matching, for example, programming data and read data, the host equipment 20 determines whether there are defects included in the NAND flash memory 4. As a result of this, it is determined whether there are bits (fail bits) which have defective data and bits which can not be programmed and read (bad block). When testing of the NAND unit has is complete the process moves to step F4.

In step F4 the host equipment 20 outputs a command sequence which instructs the memory card 200 to perform the return operation. When the command sequence which instructs the return operation is transmitted the process moves to step F5.

In step F5 the CPU 35 sets an operation mode to the first mode.

In step F6 the controller B2021 determines whether the controller unit has been tested. When the controller B2021 determines that the controller unit has been tested (step 6: YES) the process moves to step F7. When the controller B2021 determines that the controller unit has not been tested (step 6: NO) the process returns to step F5.

In step F7 the host equipment 20 tests the controller unit. As an example, the host equipment 20 inputs an arbitrary command to the controller B2021 and a test is performed to determine whether the controller B2021 is responding normally. When the controller unit test is complete the process moves to step F8.

In step F8 the controller B2021 determines whether the NAND unit has been tested. In the case where the NAND unit has been tested (step F8: YES) the process returns to step F2. In the case where the NAND unit has not been tested (step F8: NO) the test operation is complete.

As explained above, in the memory card 200 of the second embodiment, because the shift operation and the return operation are controlled by a command which is sent from the host equipment 20, the second mode can be realized without increasing the number of pins in the memory card 200. Furthermore, by controlling the second mode using a specific command sequence it is possible to avoid false recognition of when the memory card 200 is programming or reading and prevent malfunction. In addition, because the host equipment 20 in the second mode manages an erasure block size which is larger than in the first mode, it is possible to reduce the amount of time required to test the NAND flash memory 4 unit.

Furthermore, in the above stated second embodiment, the memory card 200 was shown in the case where the access path setting section 2022 set an access path using a command which is sent form the host equipment 20. This construction is not limited to this, for example, as in the memory card 200 shown in FIG. 35, the memory card 200 may also have a construction in which the access setting path 2022 detects the input of a power supply and an access path is automatically set.

In the controller B2021 shown in FIG. 24 above, in the case where defects occur during start up of the CPU 35 for example, the host equipment 20 can not shift to the second mode and can not progress to a test. As a result, when a power supply is switched on the NAND unit can be tested by automatically setting the second mode.

When the first and ninth pins P1, P9 shown in FIG. 25 and FIG. 26 are applied with a ground voltage GND and the eighteenth pin P18 is applied with a power supply voltage Vcc, the access path setting section 2022 sets an access path as a trigger for the power supply voltage Vcc to be raised.

When the second mode which is automatically set when a power supply is switched on in the memory card 200 is returned to the first mode, not only a command sequence which instructs a return operation but also a command, for example, an "FFH" command which instructs a return operation may be used. That is, the controller B2021 shown in FIG. 35 can carry out a return operation by using either a command or a command sequence. However, similar to the controller B2021 shown in FIG. 24, in the case where the second mode is set using a command sequence which instructs a shift operation, if it is not a command sequence which instructs a return operation, it is assumed that the first mode can not be returned to.

Below, a method for testing a memory card using the controller B2021 shown in FIG. 35 will be explained while referring to the flowchart shown in FIG. 36. However, the processes which overlap with the test methods of the memory card shown in FIG. 34 have the same step symbols and an explanation is omitted here.

First, in the step G1, the memory card 200 is inserted into a card slot of the host equipment 20 which is not shown in the diagram, and a power supply is supplied to the memory card 200 from the host equipment 20. When a power supply is supplied to the memory card 200 an access path is automatically set by the access path setting section 2022 in the controller B2021 and an operation mode is automatically set at the second mode.

In the controller B2021 in step F1, it is determined whether the NAND unit has been tested. If the NAND unit has been tested (step F1: YES) the process moves to step F2. If the NAND unit has not been tested (step F1: NO) the process moves to step F5.

In the step G2, a command which instructs the return operation is input to the memory card 200 from the host equipment 20. When the command which instructs the return operation is input to the memory card 200 from the host equipment 20, the process moves to step F5.

Figure 34:
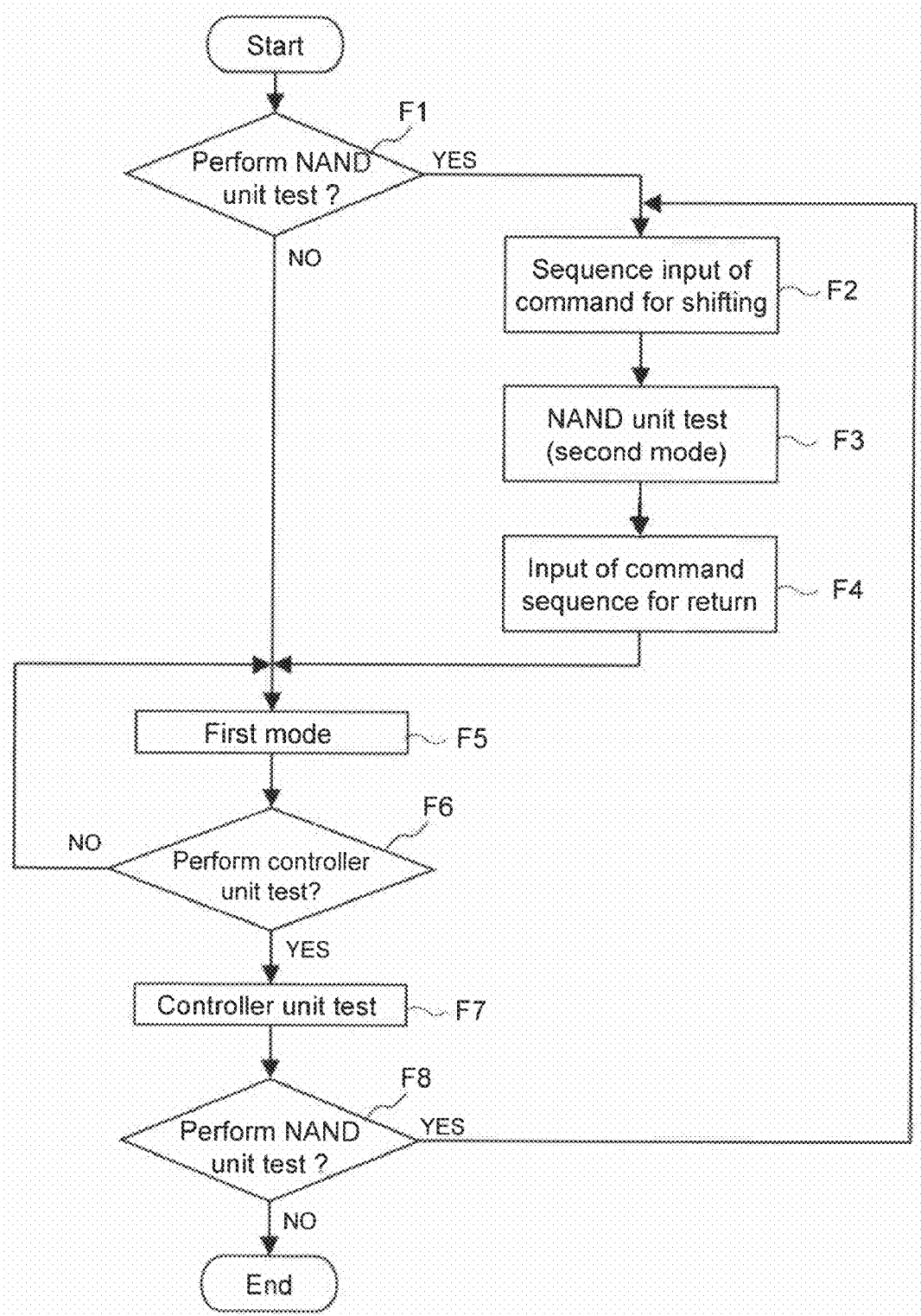
FIG. 34 is a flowchart which shows an example test operation in a memory card related to a second embodiment.

Each process from step F2 to step F8 is carried out in the same way as in FIG. 34.

Figure 35:
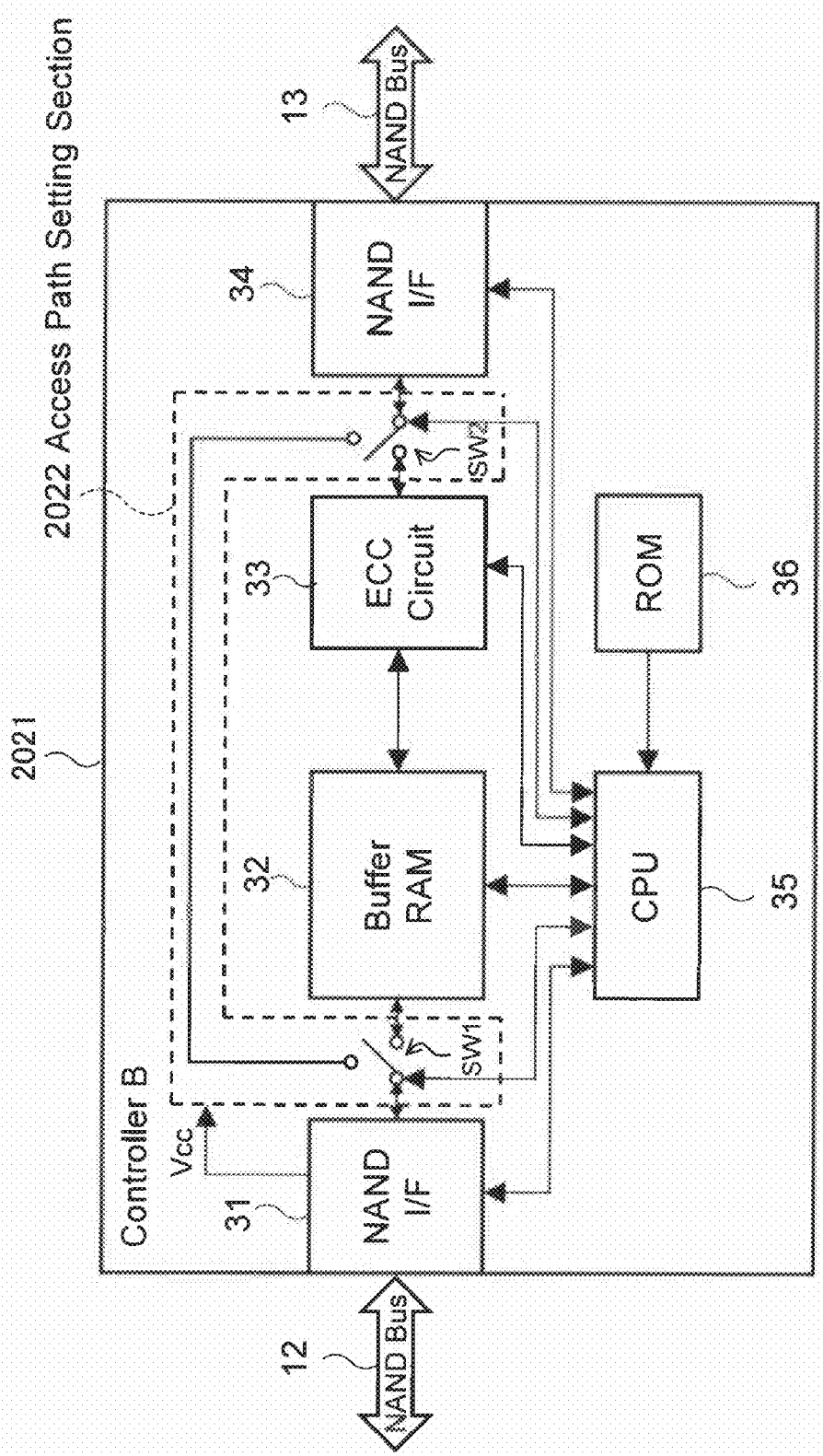
FIG. 35 is a diagram which shows an outline construction of a different controller B related to a second embodiment.
Figure 36:
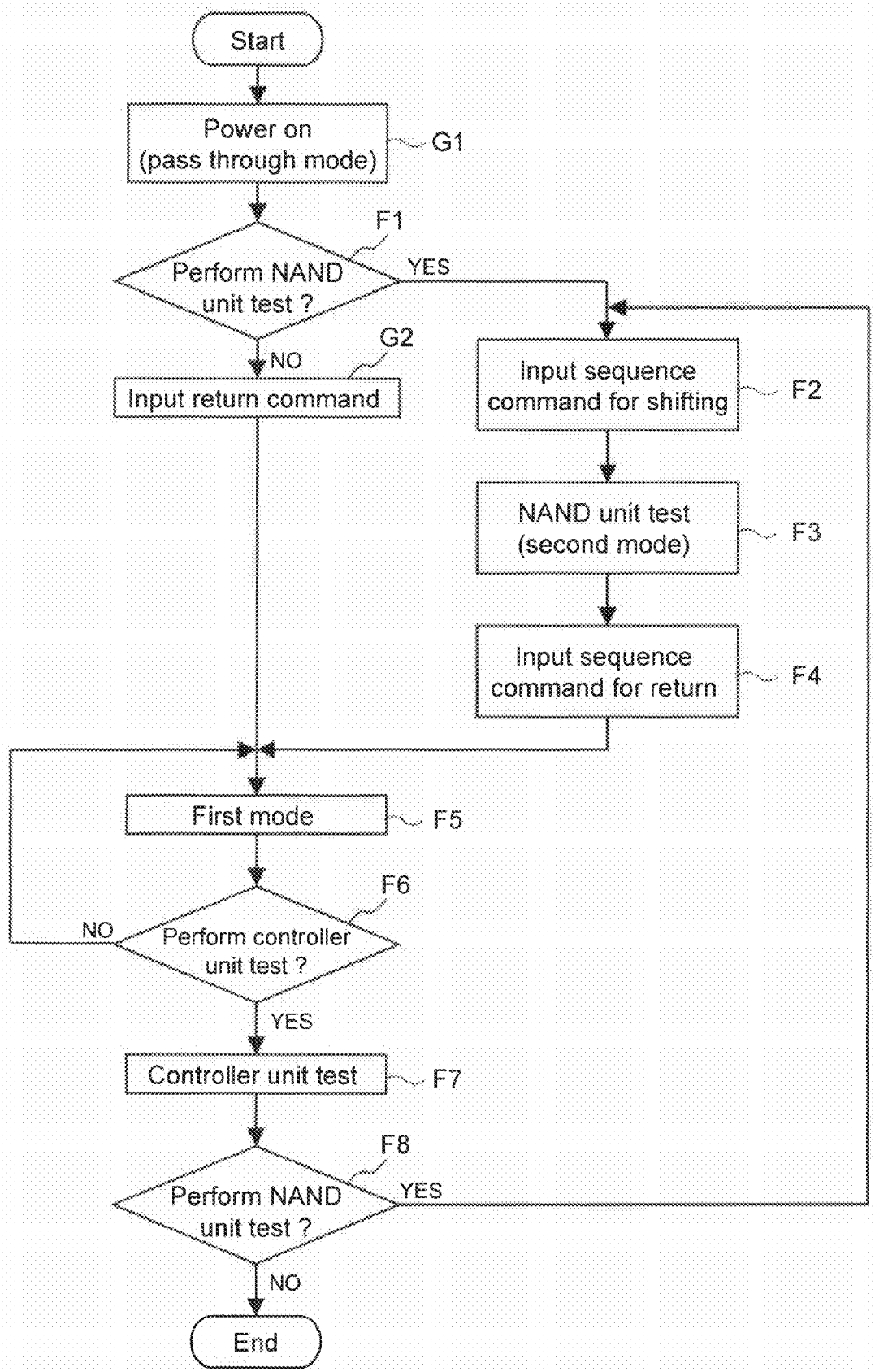
FIG. 36 is a flowchart which shows an example operation of a different test in a memory card related to a second embodiment.

As stated above, according to the construction of the controller B2021 shown in FIG. 35, immediately after a power supply is input the second mode is automatically set and even if there are defects in the controller B2021a test of the NAND unit can be carried out.

Third Embodiment

Figure 37:
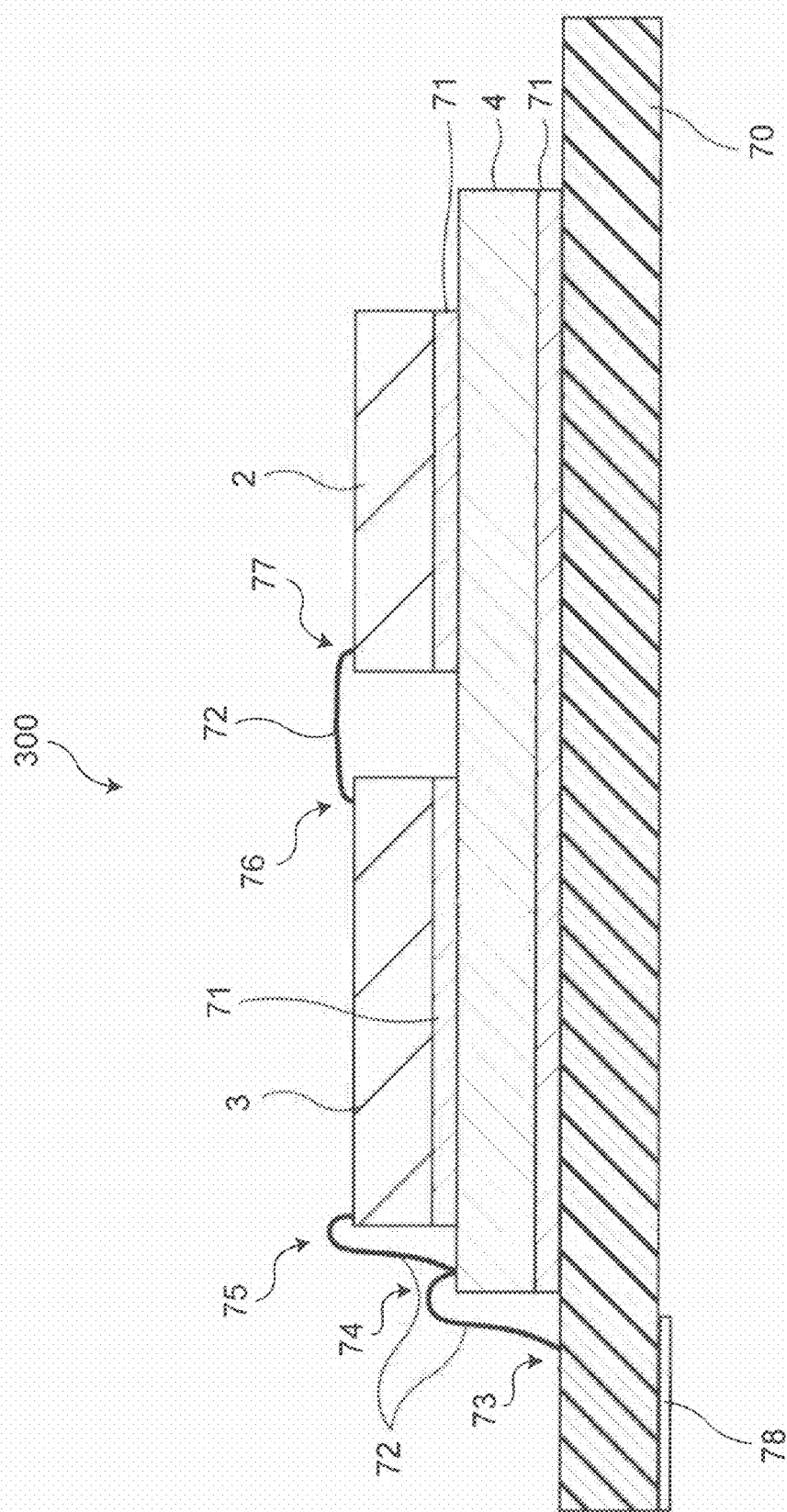
FIG. 37 is a cross sectional diagram which shows a structure when a memory card is packaged related to a third embodiment.

In the third embodiment an example construction when the memory card 1 shown in the above stated first embodiment has been packaged. FIG. 37 is cross sectional diagram which shows a construction of a memory card 300 which has been packaged related to the third embodiment. Furthermore, in FIG. 37, the same structural parts as in the memory card 1 shown in FIG. 1 in the first embodiment have the same symbols.

In FIG. 37, 70 is a substrate. The NAND flash memory 4 stated above is formed on this substrate 70 between an interlayer film 71. The above stated controller A2 and the controller B3 are each formed on the NAND flash memory 4 separated by the interlayer film 71. On the substrate 70, the NAND flash memory 4 and the controller B3, pads 72 to 75 are formed on each surface of the parts on the left side of the diagram for connecting a bonding wire 72. In addition, pads 76 and 77 for connecting the bonding wire 72 are each formed on the surface of the parts on the right side of the controller B3 and on the left side of the controller A2. In addition, external connection pin 78 which corresponds to the first to eighteenth pins shown in FIG. 25 stated above is formed on the left side bottom surface of the substrate 70.

Figure 38:
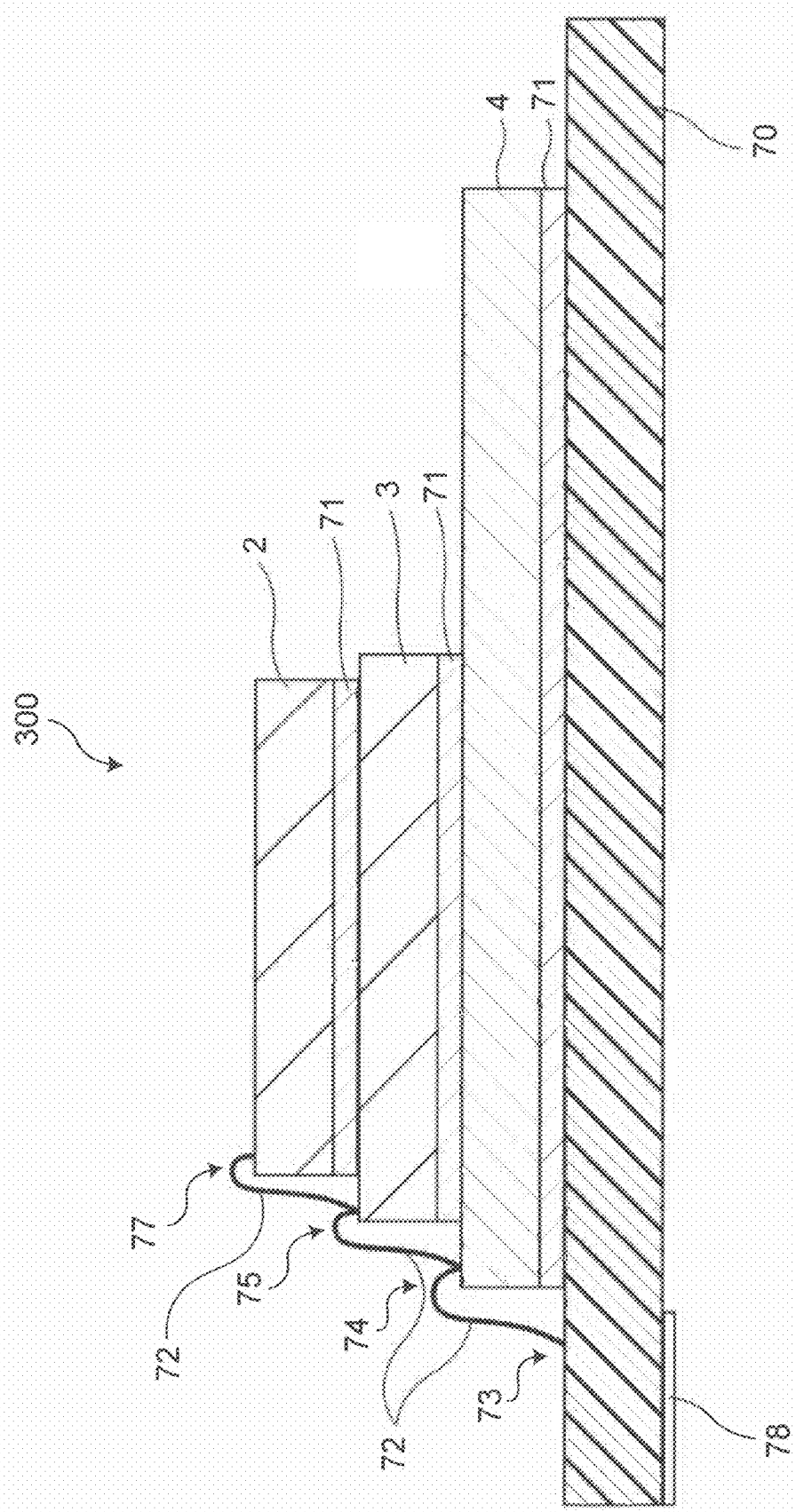
FIG. 38 is a cross sectional diagram which shows a different structure when a memory card is packaged related to a third embodiment.

FIG. 38 is cross sectional diagram which shows another construction of the memory card 300 when it is packaged related to the third embodiment. Furthermore, in FIG. 38, the same structural parts as the memory card 1 shown in FIG. 1 in the first embodiment have the same symbols and an explanation is omitted.

In FIG. 38, the controller B3 is formed on the NAND flash memory 4 separated by the interlayer film 71. The controller A2 is formed on the controller B3 separated the interlayer film 71. On the substrate 70, the NAND flash memory 4, the controller B3 and the controller A2, pads 73 to 75 and 77 for connecting the bonding wire 72 are each formed on each surface on the parts on the left side of the diagram.

Each package of the cross sectional diagrams shown in FIG. 37 and FIG. 38 show examples in the case where the controller B3 and controller A2 are formed by being stacked on the NAND flash memory 4. After the controller B3 and controller A2 are stacked on the NAND flash memory 4 and the bonding wire 72 is connected each memory card 300 shown in FIG. 37 and FIG. 38 is sealed by a resin for example except the external connection pin 78.

By adopting this stacking construction stated above it is possible to form a memory card 300 which can be mounted with the NAND flash memory 4 on the substrate 70 of this size and it is also possible to reduce the size of the package of the memory card 300.

Figure 39:
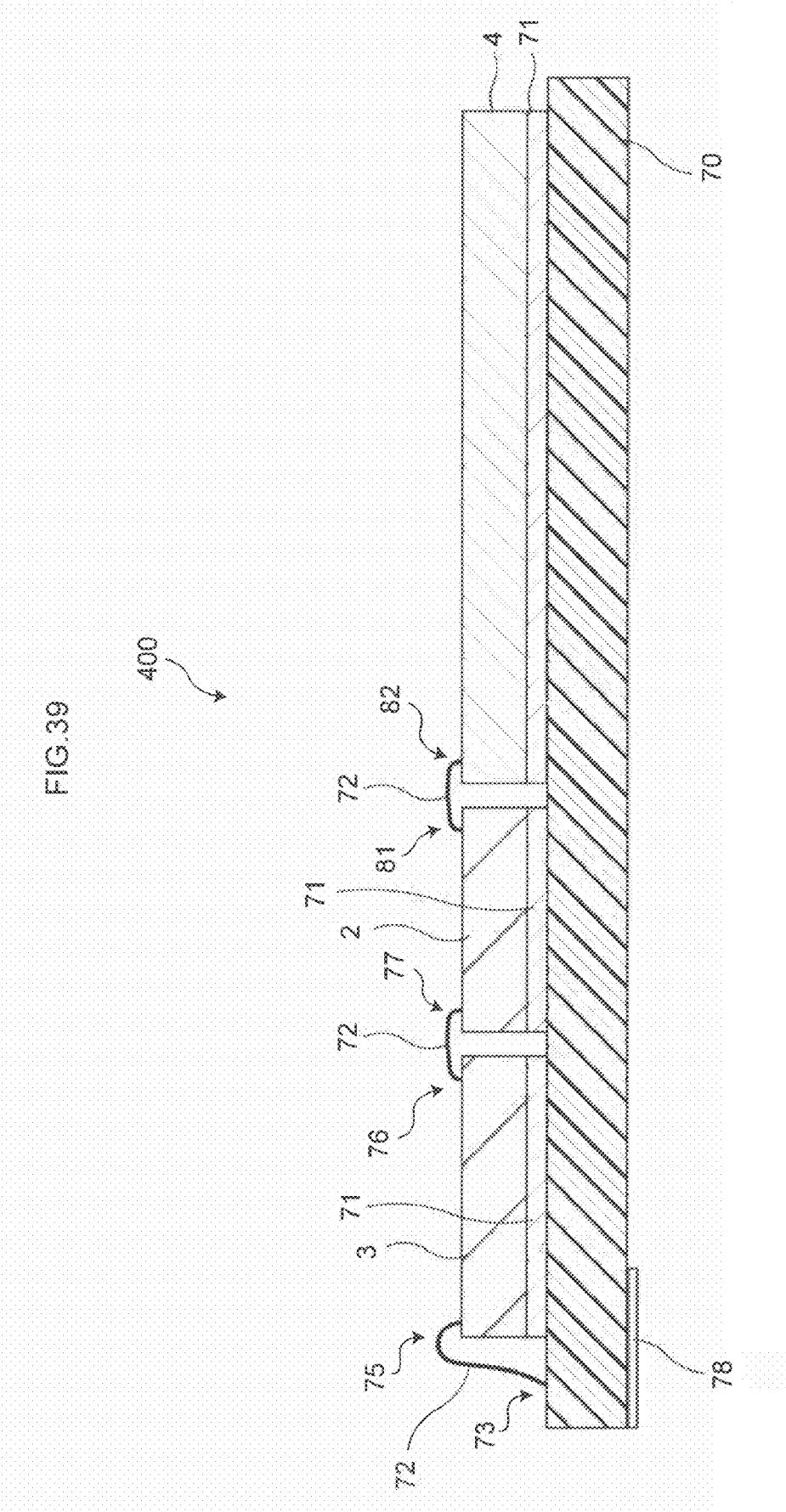
FIG. 39 is a cross sectional diagram which shows a different structure when a memory card is packaged related to a third embodiment.

FIG. 39 is a cross sectional diagram which shows another construction of a memory card when packaged related to the third embodiment. Furthermore, in FIG. 39 the same structural parts as in the memory card 1 shown in FIG. 1 in the first embodiment stated above and the same structural parts as shown in FIG. 37 have the same symbols and thus an explanation is omitted here.

In FIG. 39 the NAND flash memory 4, the controller B3 and the controller A2 are each formed on the substrate 70 of a memory card 400 separated by the interlayer film 71. A pad 75 for connecting the bonding wire 72 is formed on the upper surface of the controller B3 on the left side of the diagram. In addition, pads 76 and 77 for connecting the bonding wire 72 are each formed on the upper surface of the controller B3 on the right side of the diagram an on the upper surface of the controller A2 on the left side of the diagram. In addition, pads 81 and 82 for connecting the bonding wire 72 are each formed respectively on the upper surface of the controller A2 on the right side of the diagram and on the upper surface of the NAND flash memory 4 on the left side of the diagram.

After the NAND flash memory 4, the controller B3 and the controller A2 are formed on the substrate 70 and the bonding wire 72 is connected, the entire memory card 400 shown in FIG. 39 is sealed by a resin for example, except the external connection pin 78.

The cross sectional diagram of the package shown in FIG. 39 shows an example in the case where the NAND flash memory 4, the controller B3 and the controller A2 are arranged on the substrate 70. By adopting this type of construction it becomes easy to exchange the NAND flash memory 4 or the controller B3 when the generation of the NAND flash memory 4 changes.

Furthermore, although the construction of each package shown in FIG. 37 to FIG. 39 corresponds to the memory cards 1 and 200, the construction can also be applied to a multi-chip package (MCM) or a system in package (SiP) for example.

Fourth Embodiment

Figure 40:
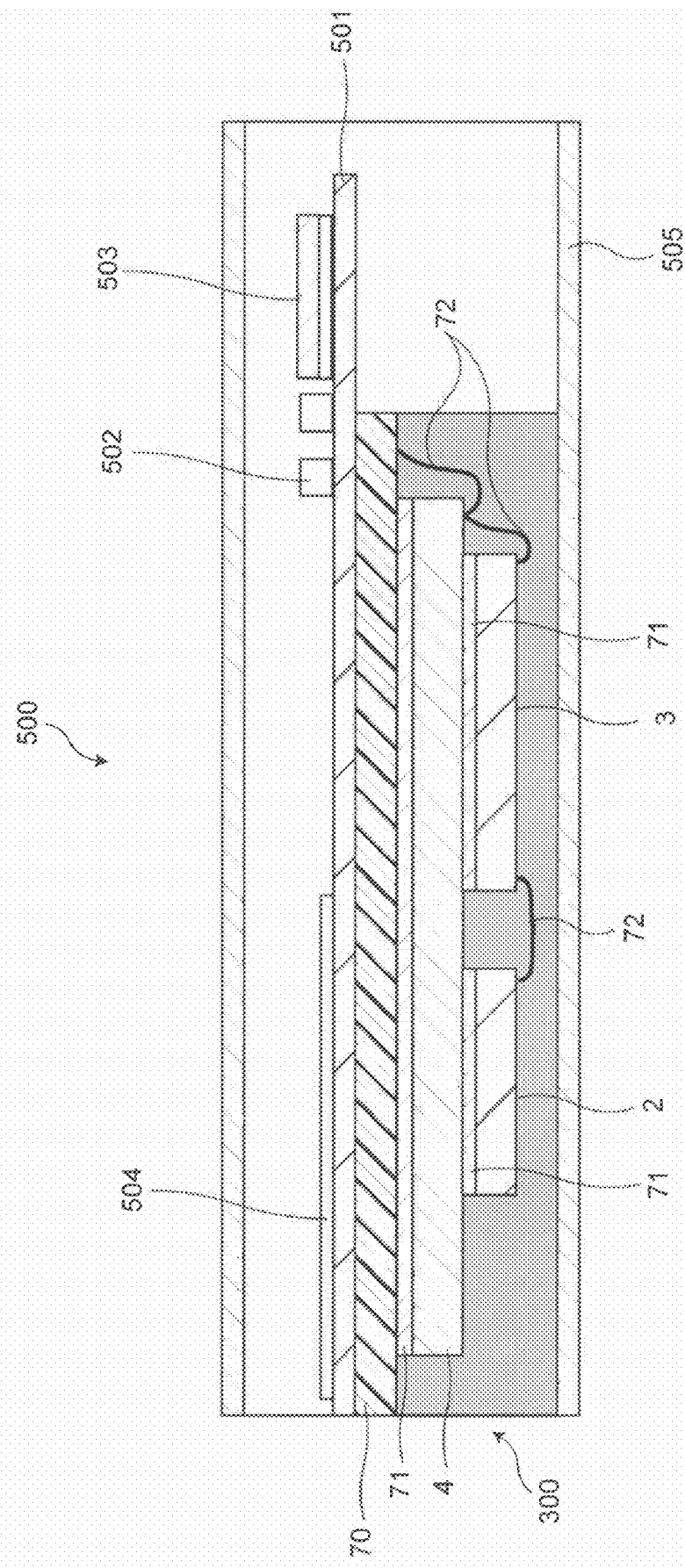
FIG. 40 is a cross sectional diagram which shows an outline structure of a USB memory which is applied with a memory card related to a fourth embodiment.

In the fourth embodiment, an example construction is shown in the case where the package shown in the third embodiment is applied as a USB (Universal Serial Bus) memory. FIG. 40 is a cross sectional diagram which shows a construction of a USB memory related to the fourth embodiment. Furthermore, in FIG. 40 the same structural elements as in the package construction of the memory card shown in FIG. 37 of the third embodiment have the same symbols and thus an explanation is omitted of these elements in the fourth embodiment.

In the USB memory 500 shown in FIG. 40, 501 is a circuit substrate. Electrical parts 502 and a control chip 503 such as a USB controller are mounted on the upper surface of this circuit substrate 501 and a conducting layer 504 which becomes an input/output terminal for a USB connector is also formed. In addition, the memory card 300 which was packaged and shown in FIG. 37 is mounted on the bottom surface of the circuit substrate 501. Also, 505 is an external casing of the USB memory 500.

In the USB memory 500 shown in FIG. 40 because the memory card 300 is mounted on the circuit substrate 501 without adjustment it is easy to manufacture the USB memory and expand the range of use of the memory card 300. In addition, when a generation of the NAND flash memory 4 within the USB memory 500 is changed it is possible to mount the memory card 300 which is manufactured according to the specifications of that generation. A change in the USB memory specifications also becomes easy.

Furthermore, in the fourth embodiment, an example where the memory card shown in FIG. 37 was applied within a USB memory was shown. However, it is not limited to this, the memory card 300 shown in FIG. 38 or the memory card 400 shown in FIG. 39 may also be used.

Fifth Embodiment

Figure 41:
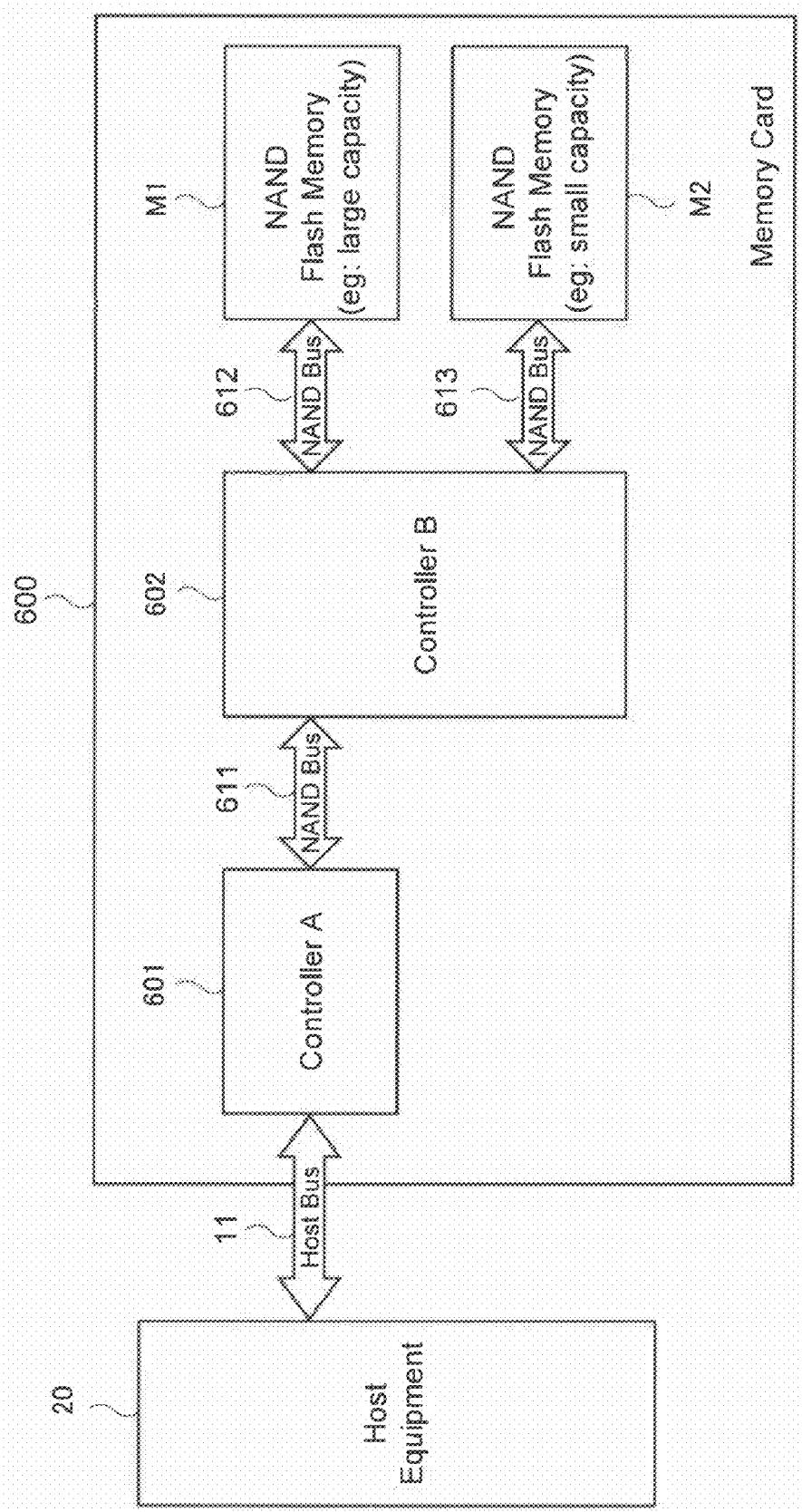
FIG. 41 is a diagram which shows an outline construction of a memory card related to a fifth embodiment.

In the fifth embodiment, a case is explained in which two NAND flash memories having different constructions are connected to a controller B and the storage destination of data which is programmed to the two NAND flash memories can be changed based on a reprogramming counts of programming data which is input from the host equipment 20. FIG. 41 is a diagram which shows an outline construction of a memory card related to the fifth embodiment. Furthermore, in FIG. 41 the structural parts which are the same as in the memory card 1 shown in FIG. 1 in the first embodiment have the same symbols.

As is shown in FIG. 41 the memory card 600 includes a controller A601, a controller B602 and NAND flash memories M1 and M2. The controller A601 is connected to the host equipment 20 via the host bus 11 and is also connected to the controller B602 via a NAND bus 611. The controller B602 is connected to the controller A601 via the NAND bus 611 and is also connected the NAND flash memory M1 via a NAND bus 612 and also connected to the NAND flash memory M2 via a NAND bus 613. The NAND flash memory M1 is connected to the controller B602 via the NAND bus 612. The NAND flash memory M2 is connected to the controller B602 via the NAND bus 613.

Furthermore, the NAND flash memories M1 and M2 may be 2 level memories which store one bit of data in one memory cell or they may be multi-level memories which store multi-data (for example, 2 bits) of more than one bit in one memory cell. Here, a NAND flash memory is explained as an example of a nonvolatile memory, however, the nonvolatile memory is not limited to a NAND flash, for example, a NOR type flash memory may also be used. In addition, an example in which two connected NAND flash memories M1 and M2 was shown, however a plurality of connected NAND flash memories may be used.

It is assumed that memories having different constructions such as memories with different storage capacities (large capacity and small capacity), memories which store a different number of data bits (two levels and multi-level), memories with different design rules or memories with different block sizes (large block and small block) are used as the NAND flash memories M1 and M2. In the fifth embodiment, a memory with a large capacity is used as the NAND flash memory M1 and a memory with a small capacity is used as the NAND flash memory M2. Generally, the design rules of a NAND flash memory are reduced in order to realize large capacity and a reduction in chip size. However, with a reduction in design rules there is a tendency for the guaranteed number of times data can be reprogrammed to decrease causing a possible reduction in the reliability of the NAND flash memory. As a result, by appropriately changing the NAND flash memory storage destination according to data in which the number of times the data needs to be reprogrammed is different using two types of NAND flash memory which have different design rules, it is possible to avoid a reduction in reliability.

The terms [logical block address] and [physical block address] used in the following explanations each refer to a logical address and a physical address which are allocated to the NAND flash memories M1 and M2 themselves. In addition, [logical address] and [physical address] generally refer to a logical address and physical address of a block itself, however, they may also refer to an address which is equivalent to a resolution unit which is smaller than a block unit.

The host equipment 20 is provided with hardware and software for accessing the connected memory card 600. The host equipment 20 manages the physical state within the memory card 600 (which logical sector address data is included in which physical block address, or which block is in an erased state) and is constructed so that it directly controls the NAND flash memories M1 and M2 within the memory card 600.

In addition, the host equipment 20 assumes that a NAND flash memory which is used has an erasure block size of 16 kBytes (not limited to the NAND flash memories M1 and M2), and allocates logical and physical addresses in 16 kBytes units. That is, the host equipment 20 in many cases performs (issues that command) a write access or a read access sequentially with regards to a logical address of 16 kBytes.

Figure 42:
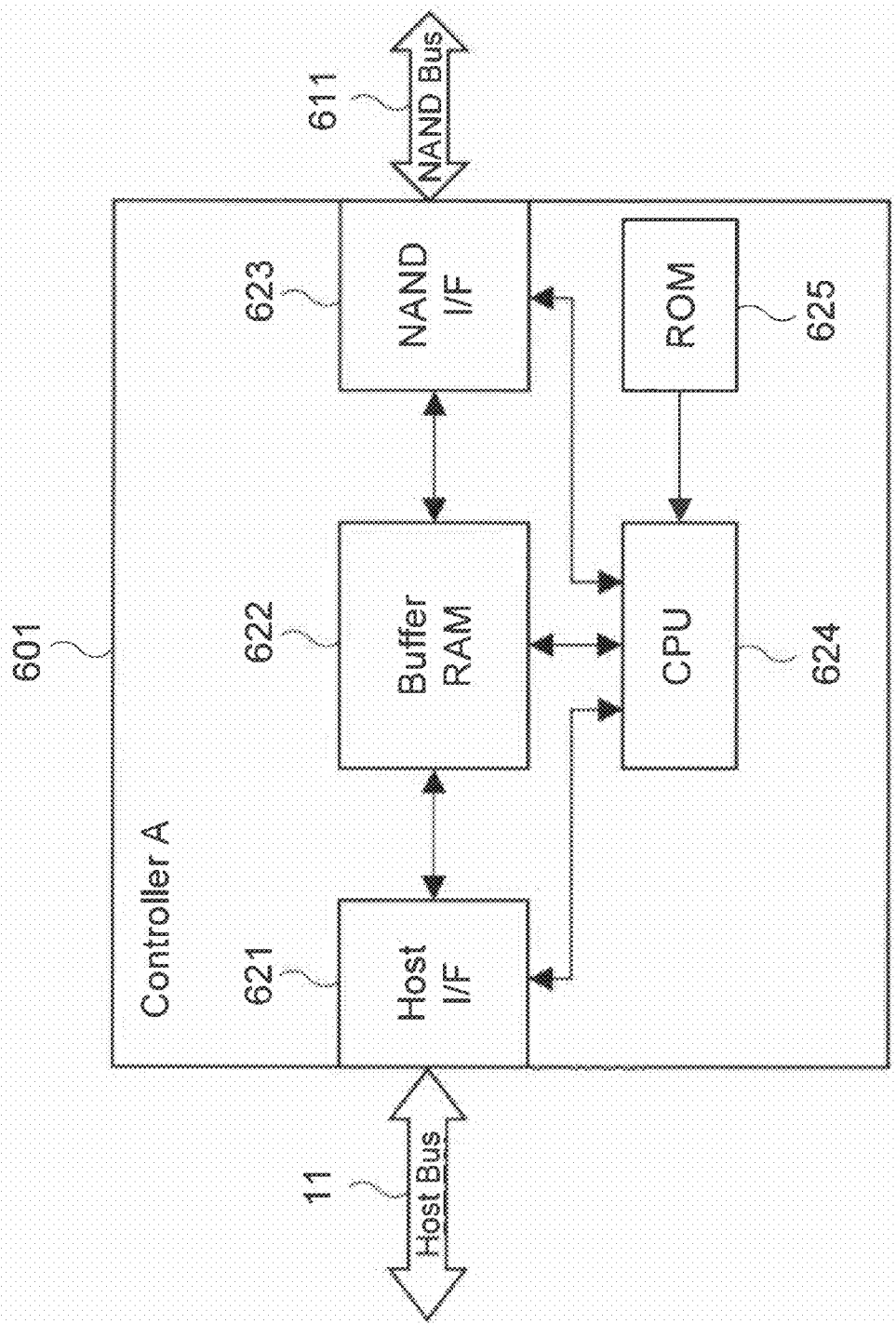
FIG. 42 is a diagram which shows an outline construction of a controller A related to a fifth embodiment.

The memory card 600 operates by receiving a power supply when connected to the host equipment 20 and performs processes according to an access from the host 20. The controller A601, as shown in FIG. 42, includes a host interface 621 (below referred to as host I/F), a buffer RAM 622, a NAND interface 623 (below referred to as NAND_I/F), a CPU 624 (Central Processing Unit) and a ROM 625 (Read Only Memory).

The host I/F 621 is connected to a host bus 11 and performs an interface process between the host equipment 20 and the buffer RAM 622 and the CPU 624. The NAND_I/F 623 is connected to a NAND bus 611 and performs an interface process between the controller B602 and the buffer RAM 622 and the CPU 624.

The buffer RAM 622 temporarily stores a certain amount of data (for example one page) when data which is input from the host equipment 20 is programmed to the NAND flash memories M1 and M2 and temporarily stores a certain amount of data when data read from the NAND flash memories M1 and M2 is output to the host equipment 20. In addition, the buffer RAM 622 is used as an operation region of the CPU 624 and stores control programs for example.

The CPU 624 controls the entire operations of the memory card 600. When for example a power supply is received by the memory card 600 the CPU 624 loads firmware (later referred to as a control program) which is stored in the ROM 625 into the buffer RAM 622 and performs a predetermined process. By performing this process the CPU 624 receives a programming command, a read command and an erasure command from the host equipment 20 and performs an access process between the controller B602 to that region within the NAND flash memories M1 and M2 and controls a transfer process of data via the buffer RAM 622.

The ROM 625 is a memory which houses control programs, for example, which are used by the CPU 624. Furthermore, the controller A601 is connected to the controller B602 via the NAND bus 611 and the CPU 624 performs a variety of processes as if the controller B602 was the NAND flash memories M1 and M2. That is, when a programming command, a read command and an erasure command are received from the host equipment 20, the CPU 624 performs a transfer process of the programming command, read command and erasure command to the controller B620.

Figure 43:
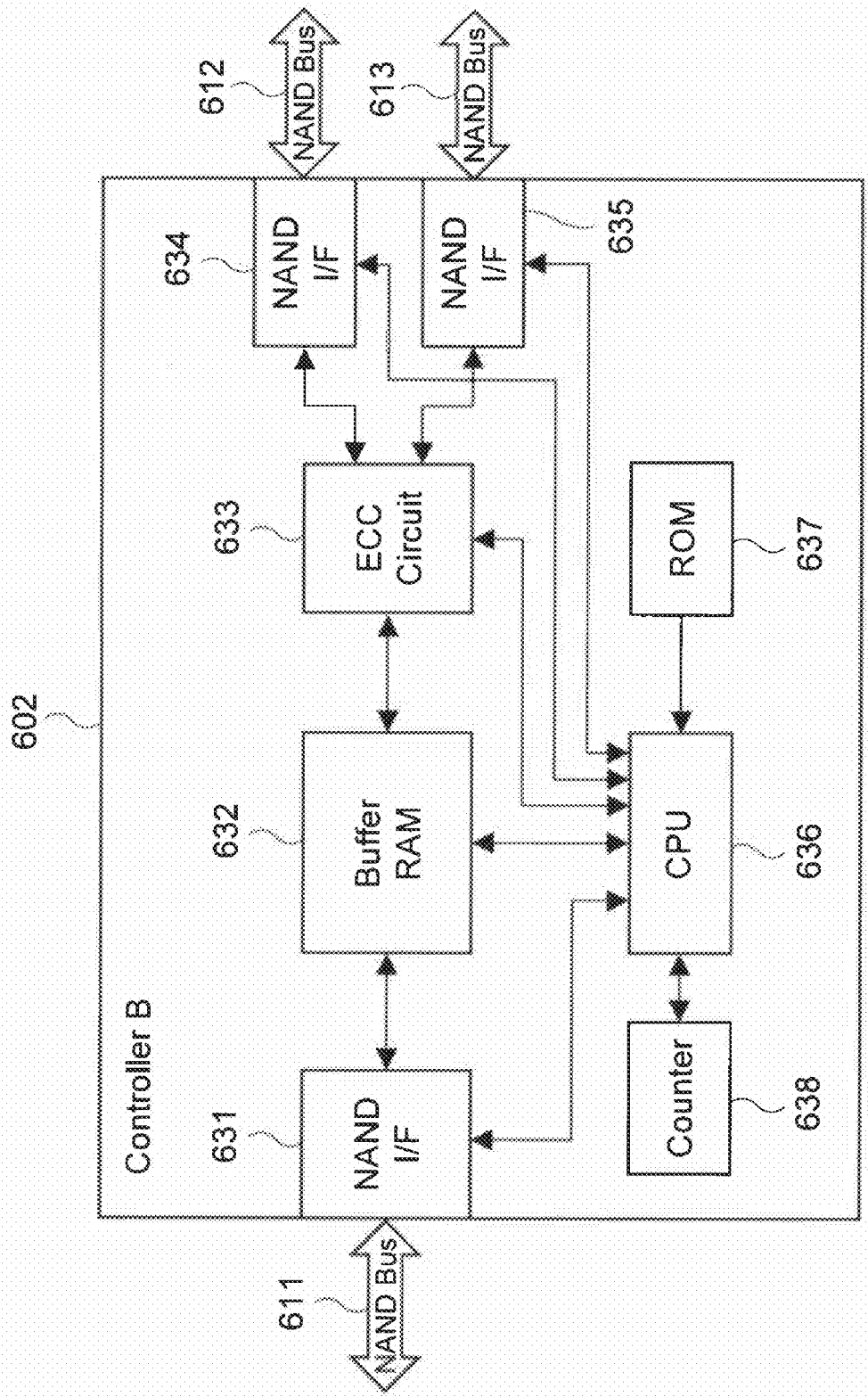
FIG. 43 is a diagram which shows an outline construction of a controller B related to a fifth embodiment.

The controller B620, as is shown in FIG. 43, includes a NAND_I/F 631, a buffer RAM 632, an ECC circuit 633 (Error Correction Code), a NAND_I/F 634, 635, a CPU 636, a ROM 637 and a counter 638.

The NAND_I/F 631 is connected to a NAND bus 611 and performs an interface process between the controller A601 and the buffer RAM 632 and the CPU 636. The NAND_I/F 634 is connected to a NAND bus 612 and performs an interface process between the NAND flash memory M1 and the ECC circuit 633 and the CPU 636. The NAND_I/F 635 is connected to the NAND bus 613 and performs an interface process between the NAND flash memory M2 and the ECC circuit 633 and the CPU 636.

The buffer RAM 632 stores temporarily a certain amount of data (for example one page) when data which is input from the controller A601 is programmed to the NAND flash memories M1 and M2. The buffer RAM 632 stores temporarily a certain amount of data (for example one page) when data which is read from the NAND flash memories M1 and M2 is output to the controller A601. In addition, the buffer RAM 632 is used as an operation region of the CPU 636 and stores control programs and various tables.

The ECC circuit 633 performs an error correction process of programming data based on ECC data which has been added to programming data programmed to the NAND flash memories M1 and M2 and performs a process which adds ECC data to data read data which has been read from the NAND flash memories M1 and M2.

The CPU 636 controls an access process to the NAND flash memories M1 and M2. When, for example, a power supply is received by the memory card 600 the CPU 636 loads firmware which is stored in the ROM 637 into the buffer RAM 636 and performs a predetermined process. The CPU 636 creates various tables in the buffer RAM 636 during this process, receives a programming command, a read command and an erasure command from the controller A601, performs an access process to those regions within the NAND flash memories M1 and M2 and performs a transfer process of data via the buffer RAM 632.

The ROM 637 is a memory which stores control program and programming control program, for example, which are used by the CPU 636. Furthermore, the controller B602 is connected to the controller A601 via the NAND bus 611 and the CPU 636 performs a variety of processes as if the controller A601 was the NAND flash memories M1 and M2. That is, when a programming command, a read command and an erasure command are received from the controller A601, the CPU 636 performs an access process to those regions within the NAND flash memories M1 and M2. In addition, when a programming command and programming data are received from the controller A601 the CPU 636 performs a programming process (refer to the flowchart shown in FIG. 45) according to a programming control program.

In the above stated programming process the counter 638 counts the number of times (n) data has been reprogrammed for each programming logical block address LBA of programming data. The counter 638 counts up the number of times (n) data has been reprogrammed for each programming logical block address of programming data under the control of the CPU 636 and out puts this figure (n) to the CPU 636.

Figure 44:
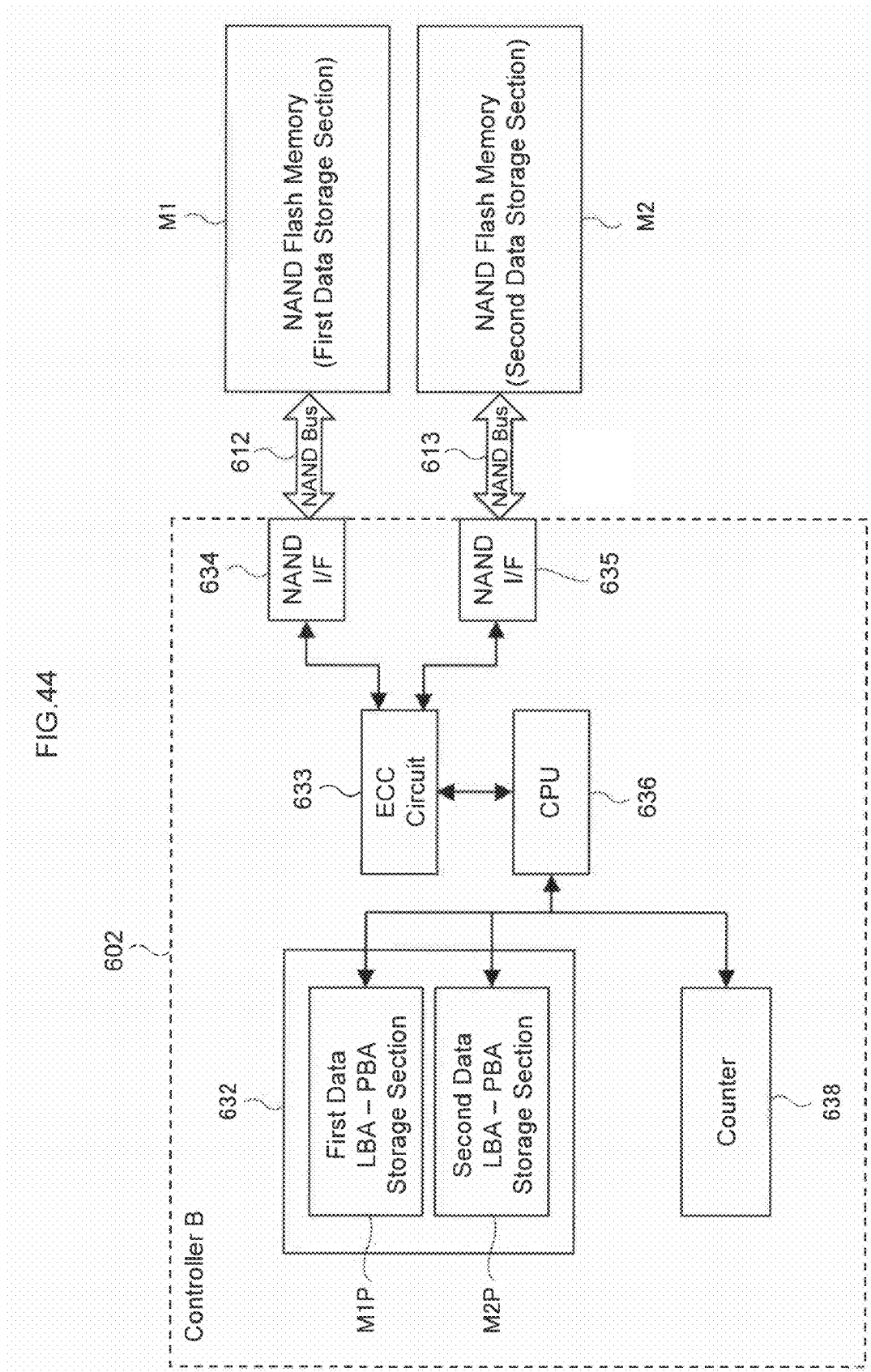
FIG. 44 is a diagram which shows a construction related to a programming process of a controller B related to a fifth embodiment.

FIG. 44 is a diagram which shows a construction related to the above stated programming process of the controller B602. In FIG. 44, the same structural parts as in the controller B602 shown in FIG. 43 have the same symbols. As is shown in FIG. 44 the controller B602 is arranged with a first data LBA-PBA storage section M1P and a second data LBA-PBA storage section M2P which are regions which store logical block addresses LBA and physical block address PBA of programming data which changes the storage destinations of data in the NAND flash memories M1 and M2 based on the number of times (n) data is reprogrammed in the buffer RAM 632. The first data LBA-PBA storage section M1P is a region which stores the number of times (n) a low amount of data is reprogrammed (below referred to as a first data), a logical block address LBA and a physical block address PBA for each reprogramming logical block address block (below referred to as programming LBA block). The second data LBA-PBA storage section M2P is a region which stores the number of times (n) a large amount of data is reprogrammed (below referred to as a second data), a logical block address LBA and a physical block address PBA for each programming LBA block.

As is shown in FIG. 44, the NAND flash memory M1 is a first data storage section and the NAND flash memory M2 is a second data storage section. Therefore, a logical block address LBA and a physical block address PBA of the first data stored in the NAND flash memory M1 are stored in the first data LBA-PBA storage section M1P. A logical block address LBA and a physical block address PBA of the second data stored in the NAND flash memory M2 are stored in the second data LBA-PBA storage section M2P.

Figure 45:
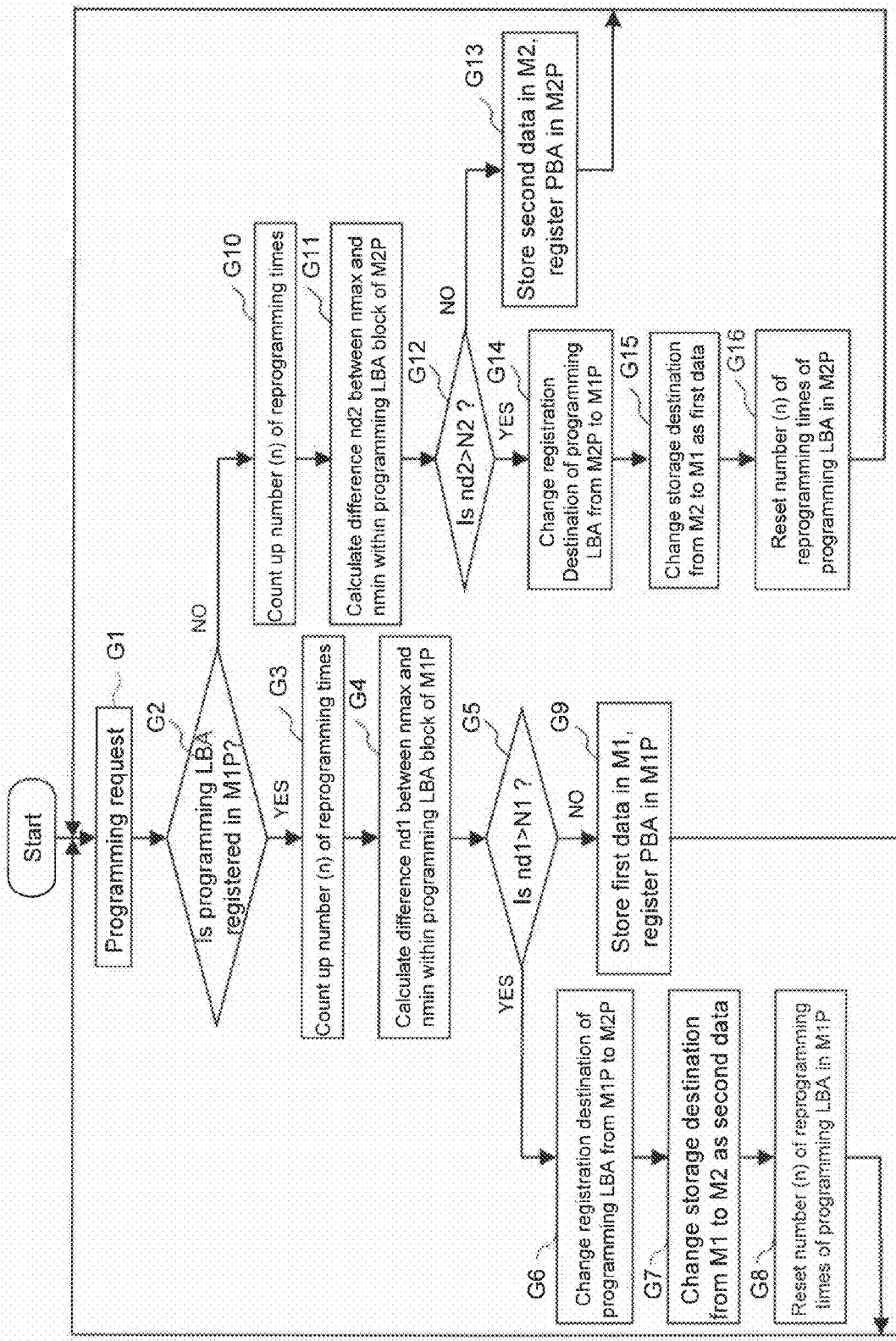
FIG. 45 is a flowchart which shows a programming process which is carried out in a controller B related to a fifth embodiment.

Next, a programming process carried out in the controller B602 is explained while referring to the flowchart shown in FIG. 45.

When a programming request command and programming data are received via the controller A601 from the host equipment 20 (step G1) the CPU 636 obtains the logical block address LBA which is included in additional data added to the programming request command. Next, the CPU 636 verifies whether the obtained logical block address LBA is registered or not in the first data LBA-PBA storage section M1P (step G2). When the CPU 636 verifies that the logical block address LBA is registered in the first data LBA-PBA storage section M1P (step G2: YES), the number of times (n) this programming logical block address (referred to below as programming LBA) is reprogrammed is counted up by the counter 638 (step G3).

Next, the CPU 636 calculates the difference nd1 between the largest value nmax and the minimum value nmin of the number of times (n) data is reprogrammed within the programming LBA block in which the programming LBA is registered within the first data LBA-PBA storage section M1P (step G4). Next, the CPU 636 determines whether the difference nd1 is larger or not than a standard level N1 (a level which determines the number of times first data is reprogrammed) (nd1>N1) (step G5). If the difference nd1 is larger than the standard level N1 (step G5: YES) the CPU 636 changes the registration destination of that programming LBA from the first data LBA-PBA storage section M1P to the second data LBA-PBA storage section M2P (step G6).

Next, the CPU 636 changes the storage destination of the programming data as second data from the NAND flash memory M1 to the NAND flash memory M2 (step G7). At this time the CPU 636 corresponds a programming physical address (below referred to as programming PBA) of the NAND flash memory M2 which stores second data, with the programming LBA and registers them in the second data LBA-PBA storage section M2P (step G7). Furthermore, before storing this second data in the NAND flash memory M2 an error correction process of the programming data is performed based on ECC data which has been added to the programming data in the ECC circuit 633. Next, the CPU 636 resets the number of times (n) the programming LBA, which changes the registration destination within the first data LBA-PBA storage section M1P, has been reprogrammed (reset="0") (step G8).

In addition, if the difference nd1 is below the standard level N1 (step G5: NO), the CPU 636 stores that programming data, that is first data, in the NAND flash memory M1 (step G9). At this time, the CPU 636 registers the programming PBA which is in the NAND flash memory M1 which stores that first data, in the first data LBA-PBA storage section M1P. Furthermore, before storing the first data in the NAND flash memory M1 an error correction process is preformed on the programming data based on ECC data which has been added to programming data in the ECC circuit 633.

In addition, in step G2, if the programming data LBA is not registered in the first data LBA-PBA storage section M1P (step G2: NO) the programming LBA is then registered in the second data LBA-PBA storage section M2P. At this time, the CPU 636 counts up the number of times (n) the programming LBA is reprogrammed by the counter 638.

Next, the CPU 636 calculates the difference nd2 between a maximum value nmax and a minimum value nmin of the number of times (n) data is reprogrammed within the programming LBA block in which the programming LBA is registered within the second data LBA-PBA storage section M2P (step G11). Next, the CPU 636 determines whether the difference nd2 is smaller or not than a standard level N2 (a level which determines the number of times second data is reprogrammed) (nd2<N2) (step G12). If the difference nd2 is smaller than the standard level N2 (step G12: YES) the CPU 363 changes the registration destination of that programming LBA from the second data LBA-PBA storage section M2P to the first data LBA-PBA storage section M1P (step G14).

Next, the CPU 636 changes the storage destination of the programming data as first data from the NAND flash memory M2 to the NAND flash memory M1 (step G15). At this time the CPU 636 corresponds a programming PBA of the NAND flash memory M1 which stores first data, with the programming LBA and registers them in the first data LBA-PBA storage section M1P (step G15). Furthermore, before storing this first data in the NAND flash memory M1 an error correction process of the programming data is performed based on ECC data which has been added to the programming data in the ECC circuit 633. Next, the CPU 636 resets the number of times (n) the programming LBA, which changes the registration destination within the second data LBA-PBA storage section M2P, has been reprogrammed (reset="0") (step G16).

In addition, if the difference nd2 is more than the standard level N2 (step G12: NO), the CPU 636 stores that programming data, that is second data, in the NAND flash memory M2 (step G13). At this time, the CPU 636 registers the programming PBA which is in the NAND flash memory M2 which stores that second data, in the second data LBA-PBA storage section M2P. Furthermore, before storing the second data in the NAND flash memory M2 an error correction process is preformed on the programming data based on ECC data which has been added to programming data in the ECC circuit 633.

In this way, in the memory card 600 related to the fifth embodiment two NAND flash memories M1 and M2 which have different storage capacities are connected to the controller B602 and the storage destination of programming data to the NAND flash memories M1 and M2 can be changed by the controller B602 based on the number of times (n) the programming data is reprogrammed. In this case, first data in which the number of times (n) data is reprogrammed is few is stored in the large capacity NAND flash memory M1 and second data in which the number of times (n) data is reprogrammed is large is stored in the small capacity NAND flash memory M2. In addition, if the difference nd1 of the number of times (n) first data is reprogrammed becomes larger than a standard level N1, the storage destination of data is changed from the NAND flash memory M1 to the NAND flash memory M2 as second data. Furthermore, if the difference nd2 of the number of times (n) second data is reprogrammed becomes fewer than a standard level N2, the storage destination of data is changed from the NAND flash memory M2 to the NAND flash memory M1 as first data.

Therefore, when a memory card is mounted with two NAND flash memories which have different storage capacities, it is possible to dynamically change a storage destination of data according to the number times programming data received from the host equipment is reprogrammed. For example, large capacity data (first data) in which the number of times the data is reprogrammed is few, such as application programs or image data, is received from a host equipment as programming data and small capacity data (second data) in which the number of times the data is reprogrammed is large, such as file system data, can be separated and stored between a NAND flash memory M1 which has a large capacity and a NAND flash memory M2 which has a small capacity. As a result, it is possible to provide a memory card which can effectively use two NAND flash memories M1 and M2 with different constructions.

Furthermore, in the NAND flash memories M1 and M2 in which data is programmed in block units, it is possible to stop a data moving operation for example to only the NAND flash memories M2 together with programming second data. As a result, it is possible to restrict the influence of overheads which come with a reprogramming operation of second data and improve the capability and reliability of a memory card.

Figure 46:
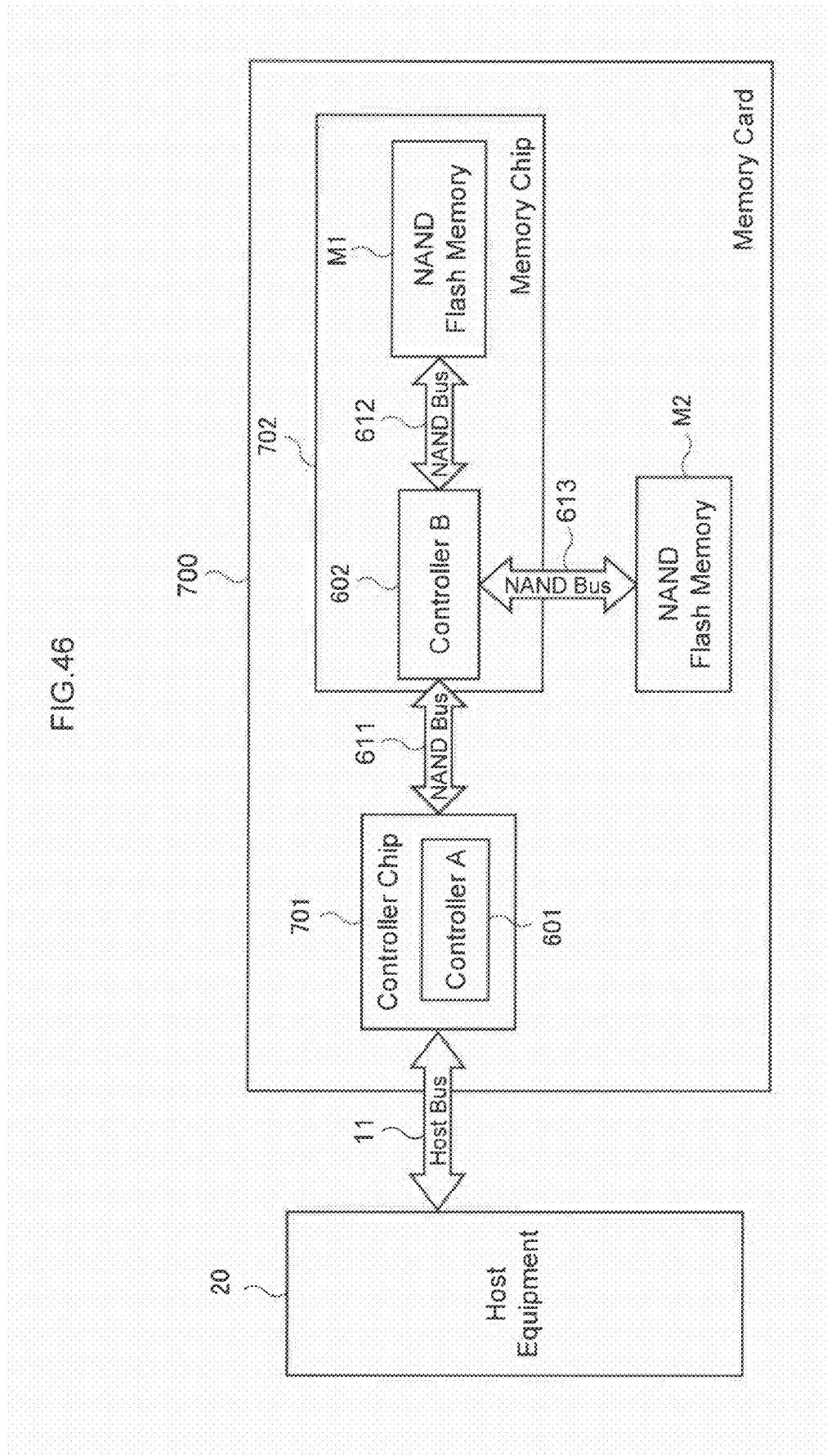
FIG. 46 is a diagram which shows an outline construction of a different memory card related to a fifth embodiment.

Furthermore, in the memory card 600 related to the fifth embodiment, a case was shown where the NAND flash memories M1 and M2 which have different storage capacities are connected to the controller B602. However, the construction is not limited to this. For example, the construction of the memory card 700 shown in FIG. 46 is also possible. Furthermore, in the memory card 700 shown in FIG. 46 the same structural elements as in the memory card 600 shown in FIG. 41 have the same symbols.

The memory card 700 shown in FIG. 46 is comprised of a NAND flash memory M2 as a different chip, a memory chip 702 which consolidates a controller B602 and the NAND flash memory M1 and the controller A601 as a controller chip 701.

With this type of construction when the generation of the NAND flash memory M2 (design rule) is changed, only the NAND flash memory M2 is exchanged, the memory card can be enabled just by changing a control program of the controller B602 and it is possible to renew the memory system without any influence on the design of the entire memory card.

Furthermore, the standard levels N1 and N2 in the flow-chart shown in FIG. 45 can be appropriately changed according to the specifications of the NAND flash memories M1 and M2 or the type of data which is input from the host equipment which is connected to the memory card 600. That is, the standard levels N1 and N2 can be set so that the number of times the storage destination of first data and second data is changed between the NAND flash memories M1 and M2 is reduced.

Sixth Embodiment

Figure 47:
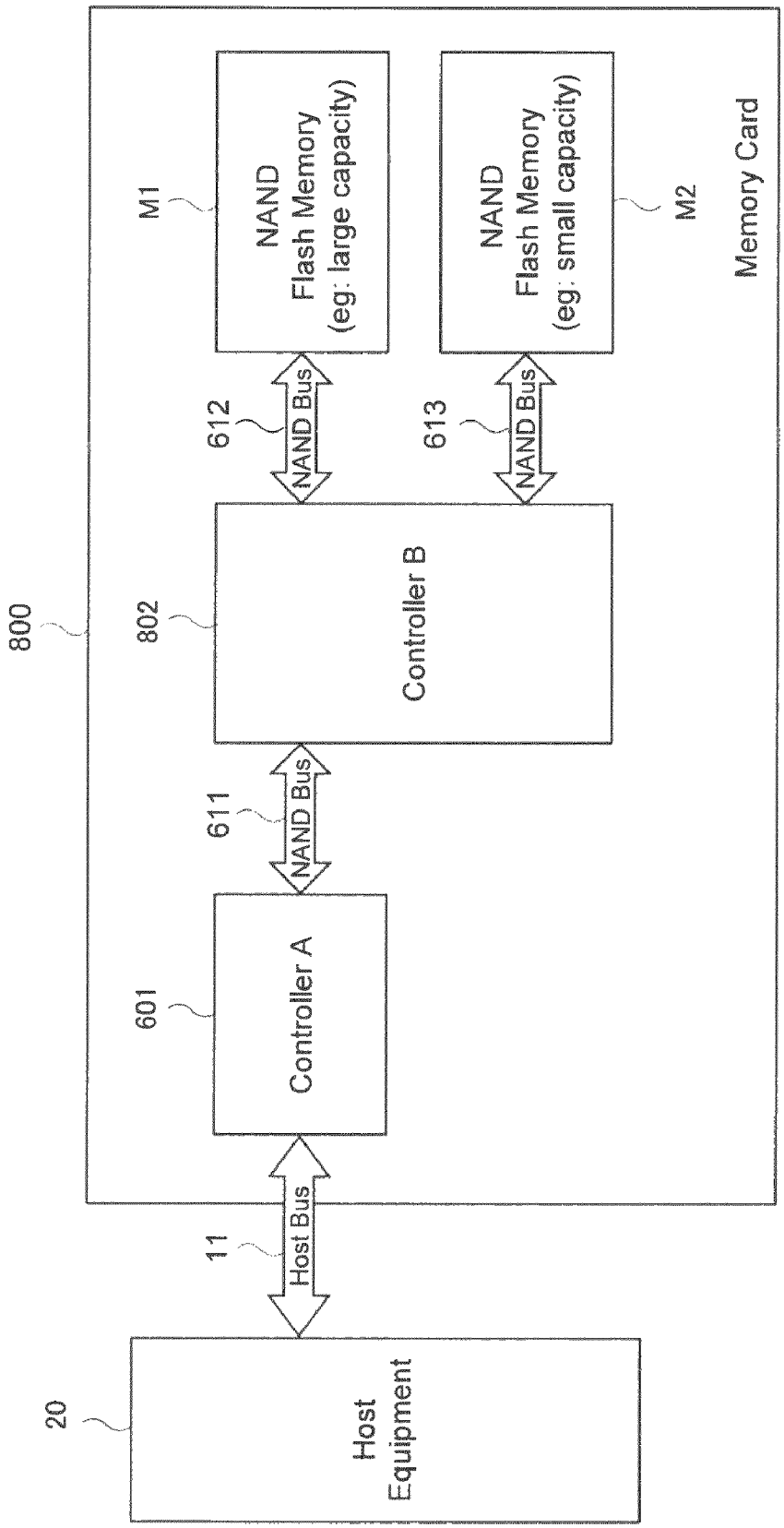
FIG. 47 is a diagram which shows an outline construction of a memory card related to a sixth embodiment.

In the sixth embodiment, a case is explained in which two NAND flash memories with different constructions are connected to a controller B, programming data and additional data (parity data etc) which are input from the host equipment 20 are separated and the storage destinations of the programming data and additional data are divided between the two NAND flash memories. FIG. 47 is a diagram which shows an outline construction of a memory card 800 related to the sixth embodiment. Furthermore, in FIG. 47 the same structural elements as in the memory card 600 shown in FIG. 41 in the fifth embodiment have the same symbols.

In the memory card 800 shown in FIG. 47, the structural element which is different to those in the memory card 600 shown in FIG. 41 is the controller B802. Other constructions and connection relationship between other elements are the same.

Furthermore, the NAND flash memories M1 and M2 may be 2 level memories which store 1 bit of data in one memory cell or they may be multi-level memories which store multi-data (for example 2 bits) of more than one bit in one memory cell. Here, the NAND flash memory is explained as an example of a nonvolatile memory, however, the nonvolatile memory is not limit to a NAND type flash memory, for example, a NOR type flash memory may also be used. In addition, an example of two connected NAND flash memories M1 and M2 was shown, however it is possible to connect a plurality of NAND flash memories.

It is assumed that the memories used as the NAND flash memories M1 and M2 have different constructions, for example, memories with different storage capacities (large capacity and small capacity), memories which store a different number of data bits (2 levels or multi-level), memories with different design rules or memories with different data block sizes (large block and small block). In the fifth embodiment, a large capacity memory is used as the NAND flash memory M1 and a small capacity memory is used as the NAND flash memory M2.

The terms [logical block address] and [physical block address] used in the explanation below each refer to logical addresses and physical addresses which are allocated to blocks themselves within the NAND flash memories M1 and M2. In addition, [logical address] and [physical address] generally refers to a logical address and physical address of a block itself however they may be addresses which are equivalent to a unit which has a smaller resolution than a block unit.

Figure 48:
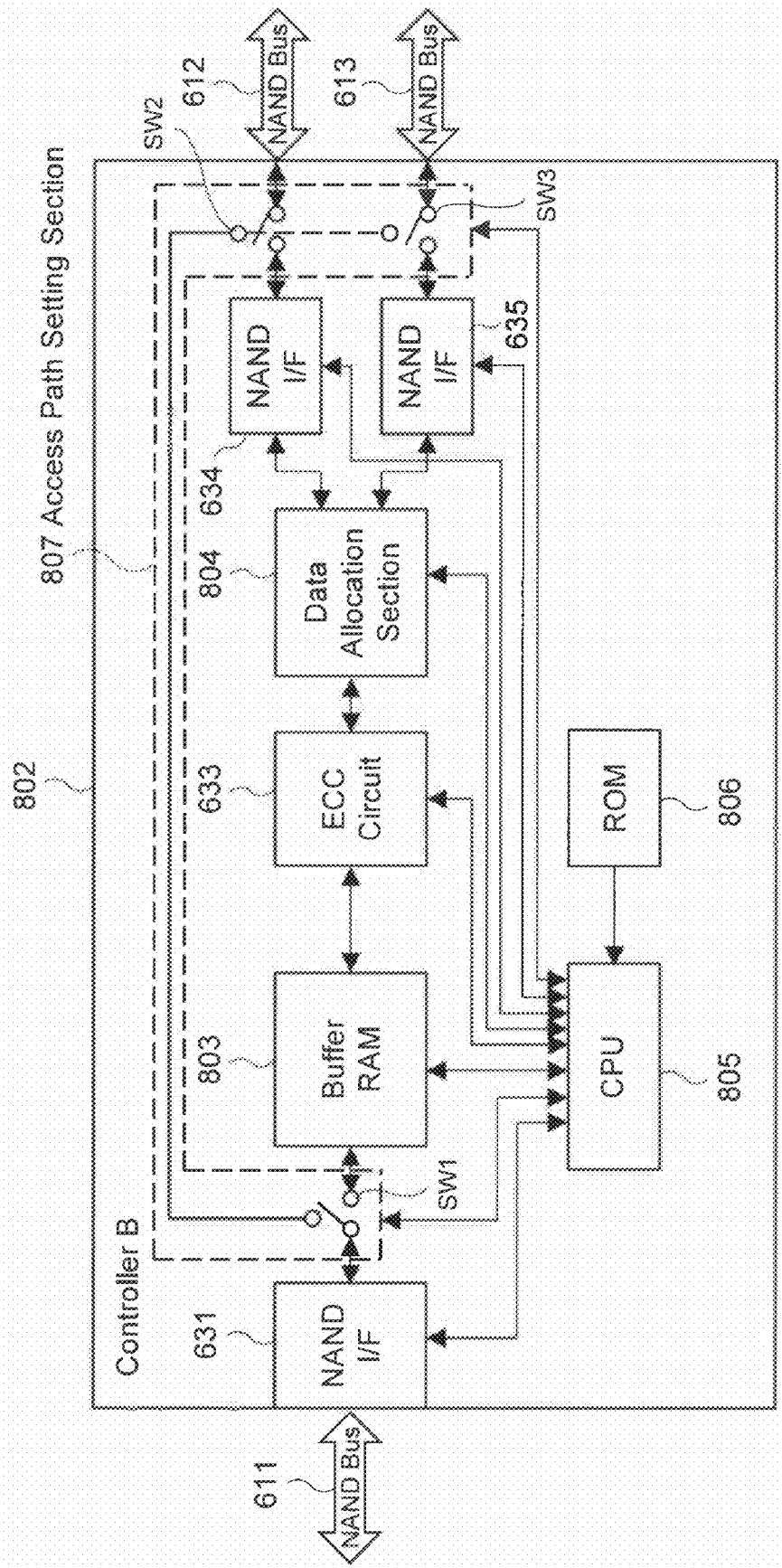
FIG. 48 is a diagram which shows an outline construction of a controller B related to a sixth embodiment.

As shown in FIG. 48, the controller B802 includes the NAND_I/F 631, a buffer RAM 803, the ECC circuit 633 (Error Correcting Code), a data allocation section 804, the NAND_I/F 634, 635, a CPU 805, a ROM 806 and an access path setting section 807. Furthermore, in FIG. 48 the same structural elements as in the controller B602 shown in FIG. 42 in the fifth embodiment have the same symbols and an explanation of these elements is omitted.

When data which is input from the controller A601 is programmed to the NAND flash memories M1 and M2, the buffer RAM 803 temporarily stores a certain amount of data (for example one page). When data which is read from the NAND flash memories M1 and M2 is output to the controller A601, the buffer RAM 803 temporarily stores a certain amount of data. In addition, the buffer RAM 803 is used as an operation region of the CPU 805 and stores control programs and various tables. Furthermore, the buffer RAM 803 includes an actual data LBA-PBA storage section M1P and an ECC data LBA-PBA storage section M2P for managing the storage destinations of actual data and ECC data which are allocated and stored in the NAND flash memories M1 and M2.

The CPU 805 controls processes for accessing the NAND flash memories M1 and M2. When a power supply is received by the memory card 800 for example, the CPU 805 loads firmware which is stored in the ROM 806 into the buffer RAM 803 and performs a predetermined process. During this process the CPU 805 receives programming commands, read commands and erasure commands from the controller A601 and performs processes for accessing these regions within the NAND flash memories M1 and M2 and carries out a data transfer process via the buffer RAM 803.

The ROM 806 is a memory which stores control programs and programming control programs which are used by the CPU 805. Furthermore, the controller B802 is connected to the controller A601 via a NAND bus 611 and the CPU 805 performs processes to the controller A601 as if it were the NAND flash memories M1 and M2. That is, when a programming command, read command and erasure command are received from the controller A601 the CPU 805 performs a process for accessing those regions within the NAND flash memories M1 and M2.

Figure 50:
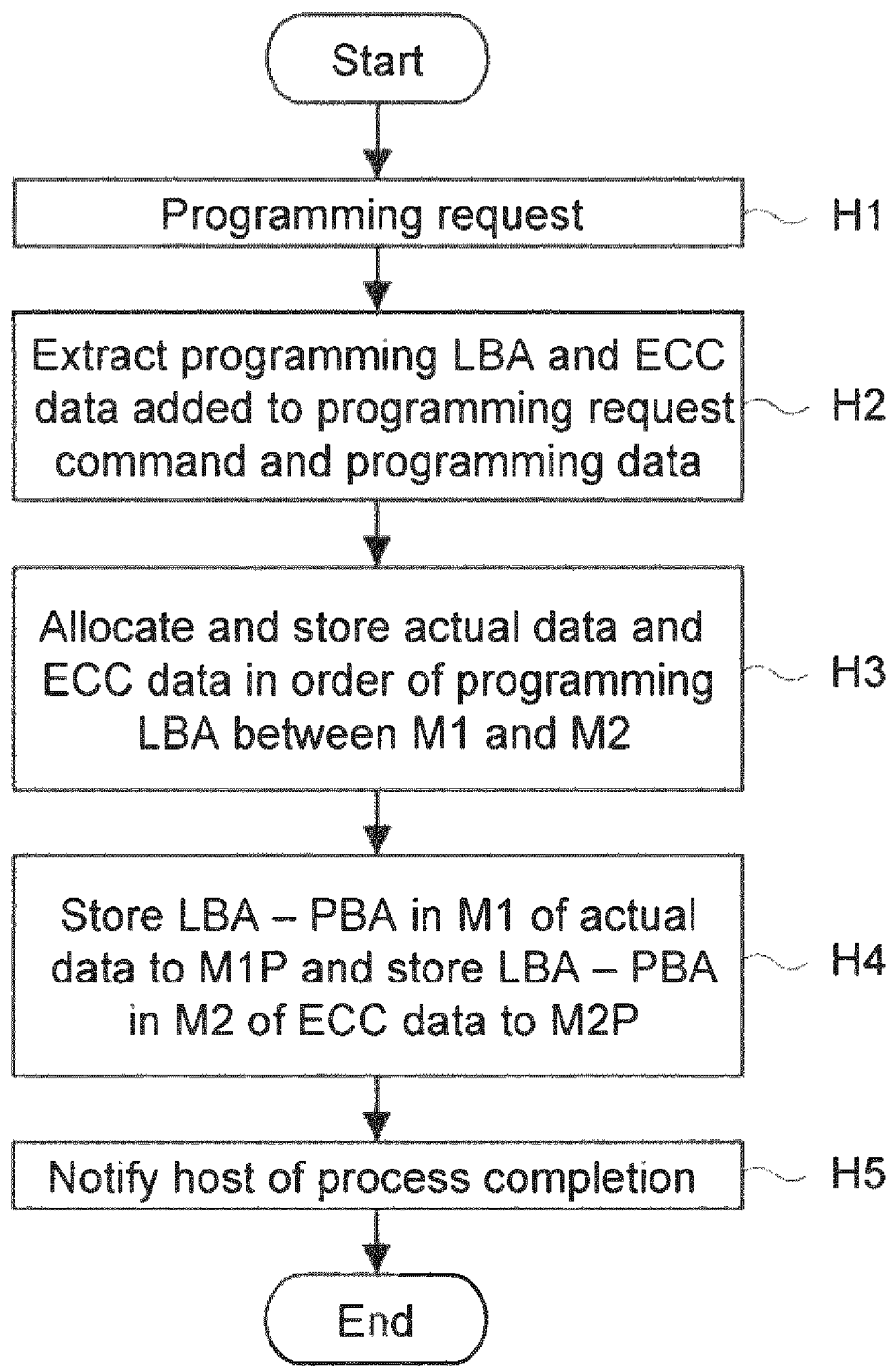
FIG. 50 is a flowchart which shows a programming process which is carried out in a controller B related to a sixth embodiment.

In addition, when a programming command and programming data are received from the controller A601 the CPU 805 performs a programming process according to a programming control program (refer to the flowchart chart shown in FIG. 50). Furthermore, when a read command is received from the controller A601 the CPU 805 performs a read process according to a read control program (refer to the flowchart chart shown in FIG. 51). In addition, when an erasure command is received from the controller A601 the CPU 805 performs an erasure process according to an erasure control program (refer to the flowchart chart shown in FIG. 52).

When a programming process is performed by the CPU 805 the data allocation section 804 performs an operation which allocates and stores the storage destinations of actual data and ECC data in the NAND flash memories M1 and M2. In addition, when a read process is performed by the CPU 805 the data allocation section 804 performs a read operation of the actual data and ECC data from the NAND flash memories M1 and M2.

The access path setting section 807 sets an access path for the host equipment 20 to directly access the NAND flash memories M1 and M2. As is shown in FIG. 48 the access path setting section 807 includes a first switch SW1 which is connected between the NAND_I/F 631 and the buffer RAM 803 and a second switch SW2 and a third switch SW3 which are connected between the data allocation section 804 and the NAND_I/F 634 and 635. The first to third switches SW1 to SW3 switch the connection relationships between the NAND_I/F 631, the buffer RAM 803, the data allocation section 804 and the NAND_I/F 634 and 635 according to a switching control signal which is input from the CPU 805. The programming data and read data bypass the buffer RAM 803, the ECC circuit 633 and the data allocation section 804 by this switching and it is possible to directly transmit commands issued by the host equipment 20 to the NAND flash memories M1 and M2.

Figure 49:
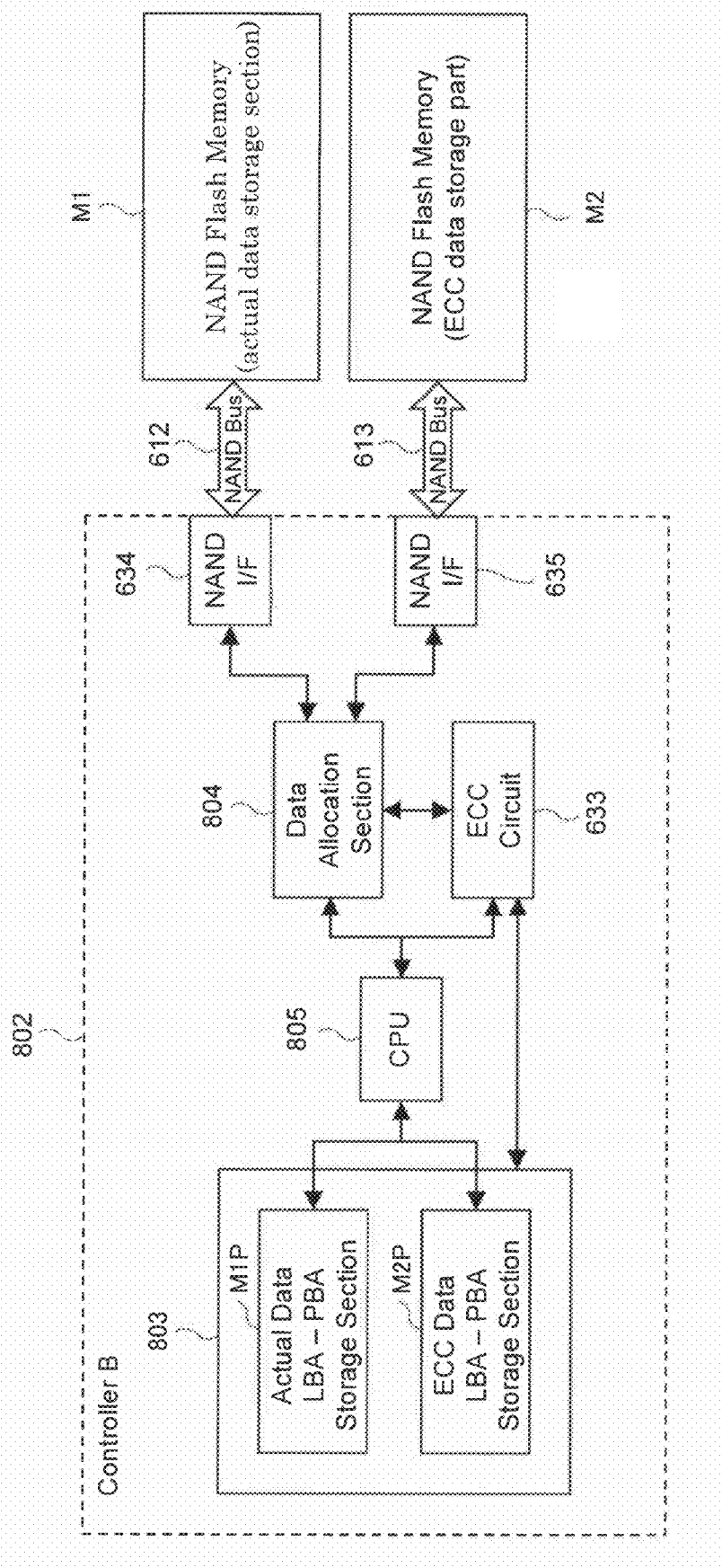
FIG. 49 is a diagram which shows a construction related to a programming process of a controller B related to a sixth embodiment.

FIG. 49 is a diagram which shows a construction related to the above stated programming process of the controller B802. Furthermore, in FIG. 49 the same structural elements as those in the controller B802 shown in FIG. 48 have the same symbols. The controller B802 shown in FIG. 49 is arranged with an actual data LBA-PBA storage section M1P and an ECC data LBA-PBA storage section M2P as a region which stores each logical block address LBA and each physical block address PBA of actual data and ECC data for which the storage destinations are divided between the NAND flash memories M1 and M2 within the buffer RAM 803. The actual data LBA-PBA storage section M1P is a region which stores logical addresses LBA and physical address PBA of the storage destinations of data (referred to as actual data in the sixth embodiment) which is separated from programming data requested to be programmed from the host equipment 20. The ECC data LBA-PBA storage section M2P is a region which stores logical addresses LBA and physical addresses PBA of the storage destinations of ECC data (additional data) which has been added to the actual data.

As is shown in FIG. 49, the NAND flash memory M1 is a storage section of actual data and the NAND flash memory M2 is a storage section of ECC data. Therefore, the logical addresses LBA and the physical addresses PBA of actual data stored in the NAND flash memory M1 are stored in the actual data LBA-PBA storage section M1P and the logical addresses LBA and the physical addresses PBA of ECC data stored in the NAND flash memory M2 are stored in the ECC data LBA-PBA storage section M2R. In addition, the actual data LBA-PBA storage section M1P corresponds and stores erasure data which shows the erasure state of actual data. The ECC data LBA-PBA storage section M2P corresponds and stores erasure data which shows the erasure state of ECC data.

Next, a programming process performed in the controller B802 is explained referring to the flowchart shown in FIG. 50.

When a programming request command and programming data are received via the controller A601 from the host equipment 20 (step H1) the CPU 805 extracts programming logical block addresses LBA which are included in the additional data attached to this programming request command and ECC data which is attached to the programming data (step H2). Actual data and ECC data are separated by this process.

Next, the CPU 805 allocates and stores actual data and ECC data which has been separated in a programming logical block address order in the NAND flash memories M1 and M2 (step H3). During this process the data allocation section 804 allocates and stores the actual data and ECC data which has been separated and input from the CPU 805 in the NAND flash memories M1 and M2 in order of the programming logical block addresses input from the CPU 805. Furthermore, before storing the actual data in the NAND flash memory M1 an error correction process is performed in the ECC circuit 633 of the data based on ECC data which is attached to the actual data.

Next, the CPU 805 stores logical block addresses LBA and physical block addresses PBA of the NAND flash memory M1 which stores actual data in the actual data LBA-PBA storage section M1P. In addition, the CPU 805 stores logical block addresses and physical block addresses PBA of the NAND flash memory M2 which stores ECC data in the ECC data LBA-PBA storage section M2P (step H4).

Next, the CPU 805 notifies the host equipment 20 that a programming process is complete (step H5). This programming process completion notice is notified to the host equipment 20 from the controller B802 via the controller A601.

Figure 51:
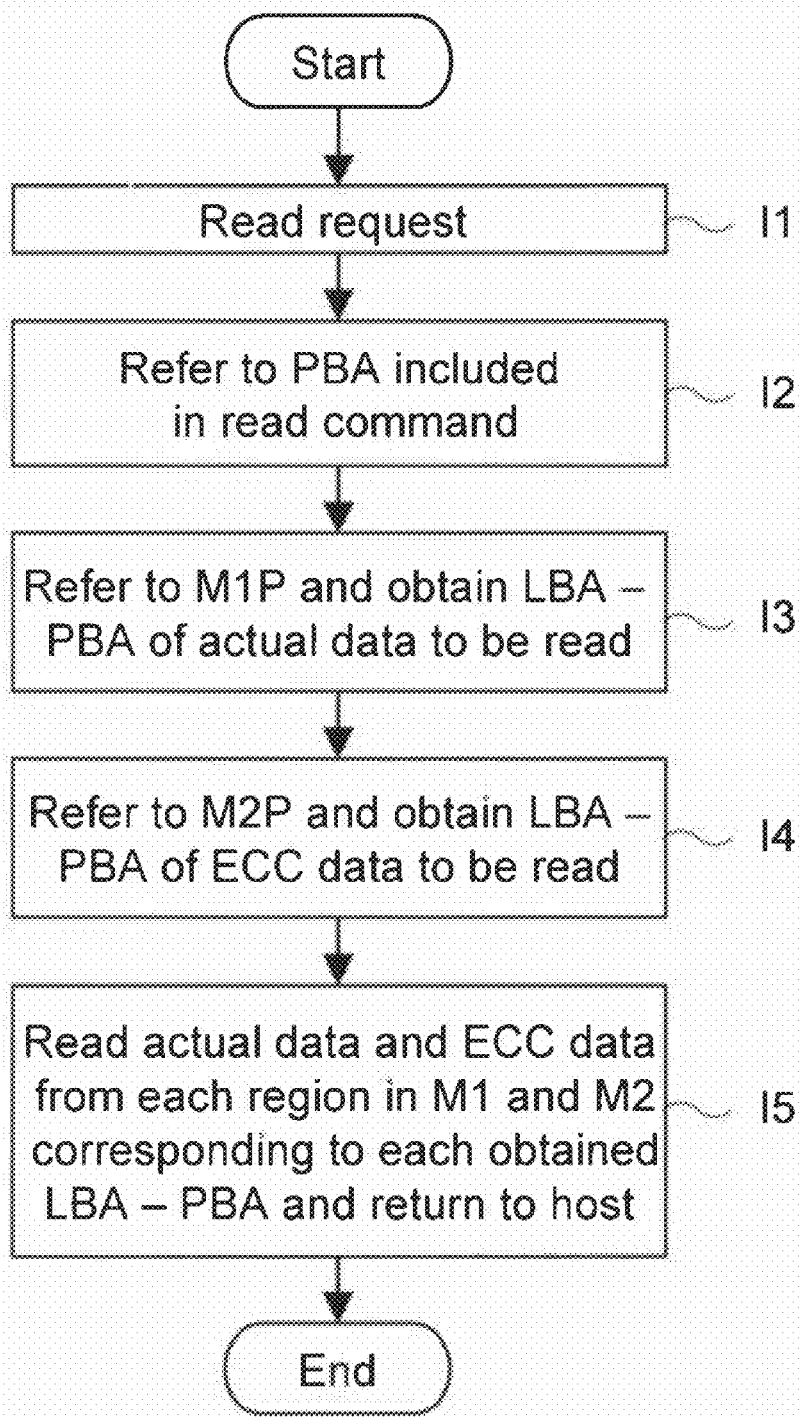
FIG. 51 is a flowchart which shows a reading process which is carried out in a controller B related to a sixth embodiment.

Next, a read process performed in the controller B802 is explained referring to the flowchart shown in FIG. 51.

When a read request command is received from the host equipment 20 side via the controller A601 (step I1) the CPU 805 refers to a physical block address PBA which is included in this command (step I2). Next, a logical block address LBA and physical block address PBA of actual data to be read is obtained by referring to the actual data LBA-PBA storage section M1P based on the physical block address PBA referred from the read request command (step I3).

Next, the CPU 805 obtains a logical block address LBA and a physical block address PBA of the ECC data to be read from the ECC data LBA-PBA storage section M2P based on a physical block address PBA referred from the read request command (step I4).

Next, the CPU 805 reads actual data from a region within the NAND flash memory M1 corresponding to the logical block address LBA and the physical block address PBA of actual data obtained in step I3, reads ECC data from a region within the NAND flash memory M2 corresponding to the logical block address LBA and the physical block address PBA of ECC data obtained in step I4 and returns these to the host equipment 20 (step I5). During this process, the data allocation section 804 reads actual data and ECC data from each region of the NAND flash memories M1 and M2 by each logical block address LBA and each physical block address PBA of the actual data and ECC data input from the CPU 805 and outputs to the ECC circuit 633. The ECC circuit 633 adds ECC data to the actual data which is input and outputs to the CPU 805. Then the data to be read is returned to the host equipment 20 via the controller A601 from the controller B802.

Figure 52:
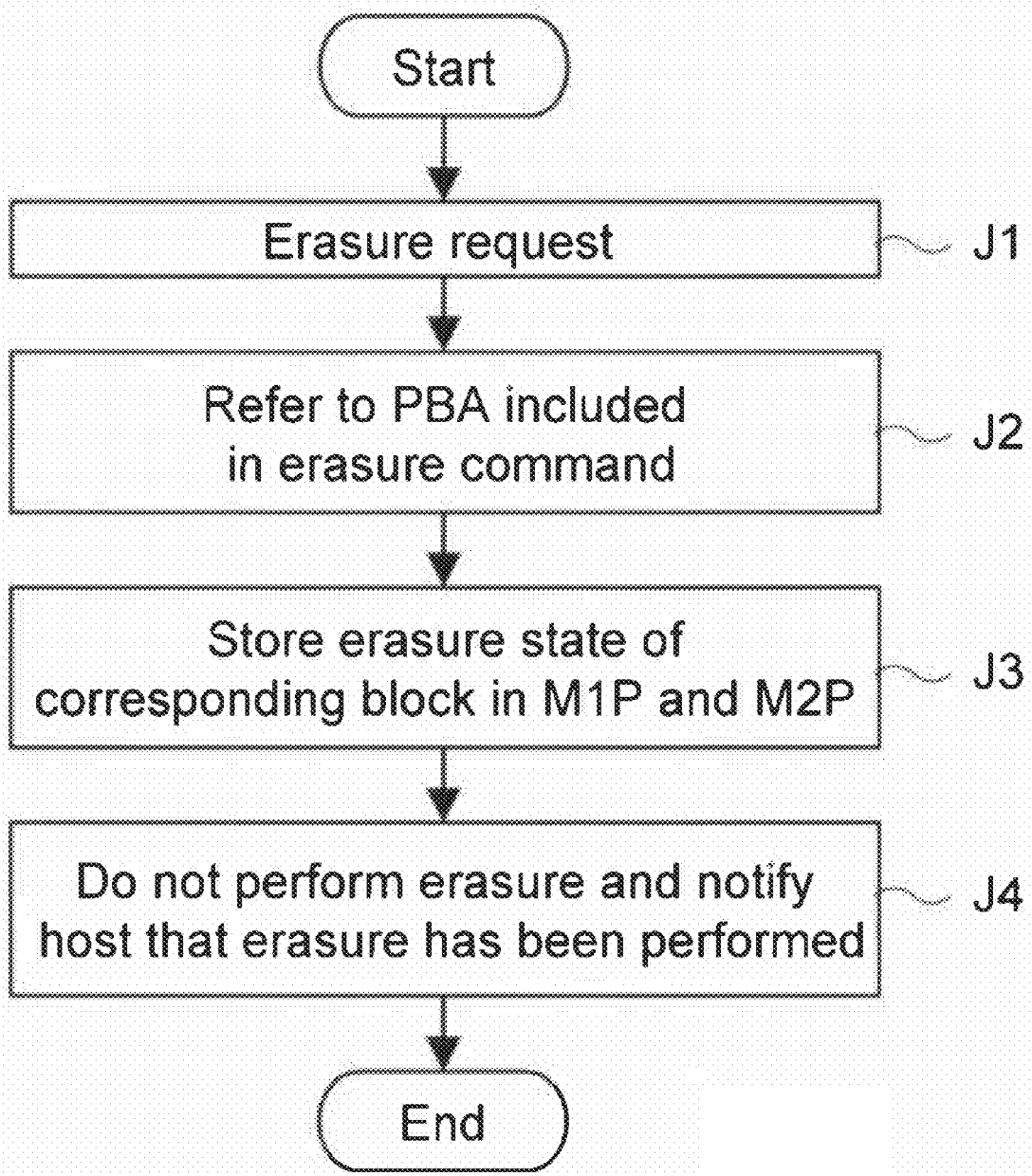
FIG. 52 is a flowchart which shows an erasure process which is carried out in a controller B related to a sixth embodiment.

Next, an erasure process performed in the controller B802 is explained referring to the flowchart in FIG. 52.

When an erasure request command is received via the controller A601 from the host equipment 20 side (step J1) the CPU 805 refers to a physical block address which is included in this command (step J2).

Next, in step J3 the CPU 805 stores erasure data which shows an erasure state in the storage region of the logical block address LBA and the physical block address PBA of corresponding actual data within the actual data LBA-PBA storage section M1P based on the physical block address PBA referred from the erasure request command. Furthermore, in step J3 the CPU 805 stores erasure data which shows an erasure state in the storage region of the logical block address LBA and the physical block address PBA of corresponding ECC data within the ECC data LBA-PBA storage section M2P based on the physical block address PBA referred from the erasure request command.

Next, the CPU 805 notifies the host equipment 20 that erasure has been performed without actually performing erasure of actual data and ECC data within the NAND flash memories M1 and M2 corresponding to the physical block address requested to be erased (step J4). This erasure notification is notified to the host equipment 20 from the controller B802 via the controller A601.

In the memory card 800 related to the sixth embodiment as stated above, the two NAND flash memories M1 and M2 which have different storage capacities are connected to the controller B802. In addition, programming data which was requested to be programmed from the host equipment 20 by the controller B802 and the data allocation section 804 is separated into actual data and ECC data and allocated and stored in the NAND flash memories M1 and M2.

Therefore, in the case where a memory card is mounted with the two NAND flash memories M1 and M2 which have different storage capacities, it is possible to separate programming data which is received from the host equipment 20 into actual data and ECC data and allocate and store this data in the NAND flash memories M1 and M2. As a result, it is possible to provide a memory card which can effectively utilize two NAND flash memories M1 and M2 which have different constructions.

In addition, the memory card 800 related to the sixth embodiment has a construction which includes the access path setting section 807 within the controller B802. As a result, as is shown in the second embodiment, during testing of the memory card 800 before shipment it is possible to electrically connect the host equipment 20 with the memory card 800 as a tester. In this case the controller B802 converts an address which has been received from the host equipment 20 and using this converted address it is possible to operate between a first mode which accesses the NAND flash memories M1 and M2 and a second mode which directly accesses the NAND flash memories M1 and M2 using the address received from the host equipment 20. In addition, the controller B802 performs a switching control which switches between a first mode and a second mode according to a switch command of an operation mode received from the host equipment 20.

Then, during testing before shipment as is shown in the second embodiment, the host equipment 20 is able to separately test the controller B802 and the NAND flash memories M1 and M2 within the memory card 800. Furthermore, because the controller B802 has a construction which controls the shift operation which shifts from the first mode to the second mode and the return operation which returns from the second mode to the first mode, according to a command received from the host 20, it is possible to realize the second mode without increasing the number of external connection pins of the memory card 800.

In addition, when the NAND unit is tested, the host equipment 20 executes a command sequence which instructs the shift operation after power is supplied to the memory card 800. The controller 802 sets an operation mode to the second mode by receiving this command sequence and maintain the second mode until a command sequence which instructs the return operation is issued from the host equipment 20. In this way, an unintended return mode operation carried out during the second mode by the controller B802 can be avoided.

Furthermore, in FIG. 48 an example was shown of the memory card 800 in which the access path setting section 807 sets an access path by a command which is sent from the host 20. However, it is not limited to this construction, for example, as in the memory card 200 shown in FIG. 35, a construction in which the access path setting section 2022 detects a power supply and automatically sets an access path may also be applied to the memory card 800. In this case, the NAND unit can be tested even if there are defects in the controller B802 by automatically setting to the second mode immediately after power is supplied.

Figure 53:
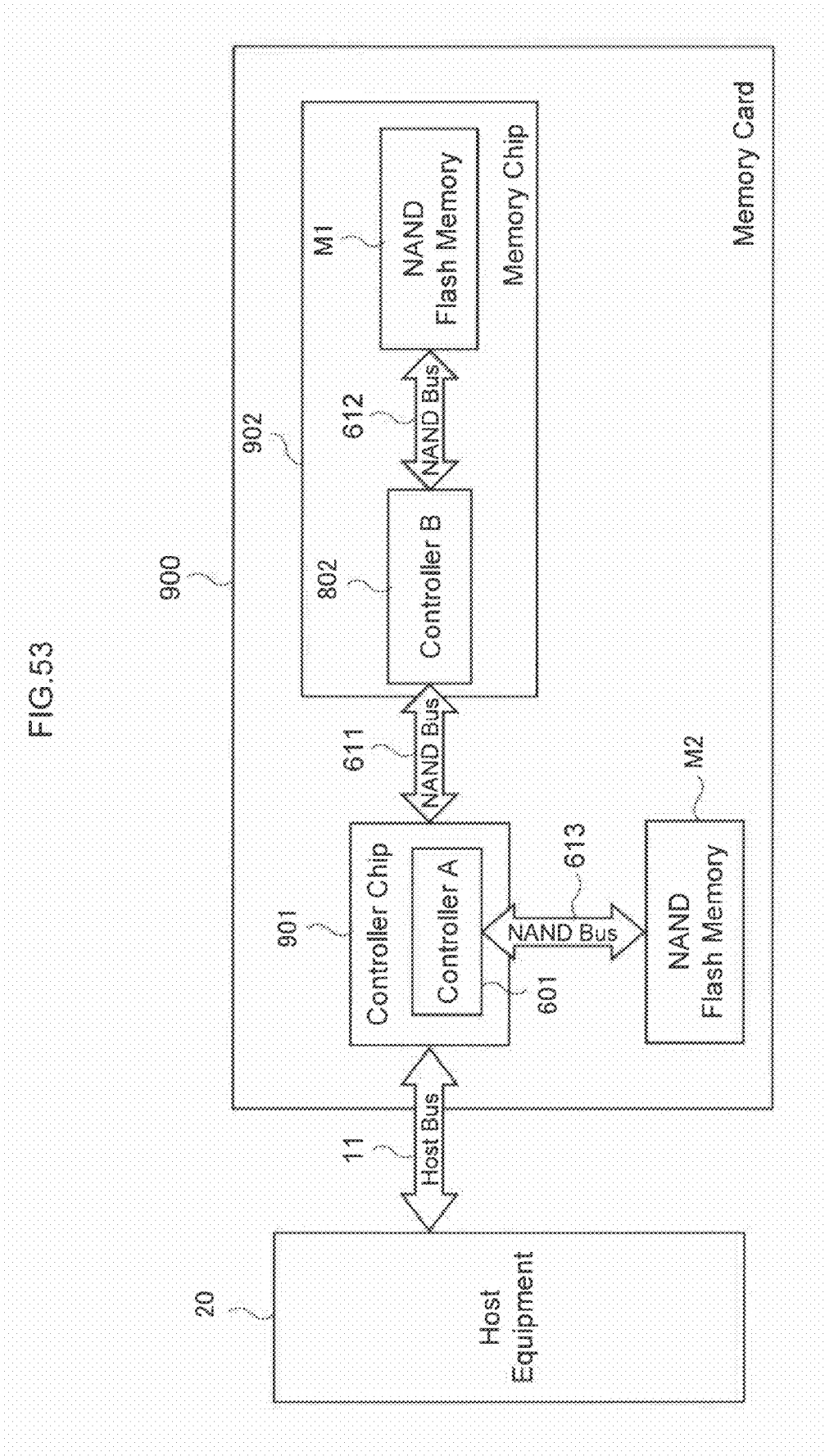
FIG. 53 is a diagram which shows an outline construction of a different memory card related to a sixth embodiment.

Furthermore, in the memory card 800 related to the sixth embodiment, an example was shown whereby NAND flash memories M1 and M2 which have different storage capacities are connected to the controller B802, however, it is not limited to this construction, for example, the construction of a memory card 900 shown in FIG. 53 may also be used. Furthermore, in the memory card 900 shown in FIG. 53, the same structural elements as in the memory card 800 shown in FIG. 48 have the same symbols.

The memory card 900 shown in FIG. 53 has a construction in which the controller A601 is included in a controller chip 901, the NAND flash memory M1 is connected externally via a NAND bus 613 to the controller A601 and a memory chip 902 which comprises the controller B802 and the NAND flash memory M2.

By adopting this construction, when the generation (design rule) of the NAND flash memory M1 changes it is possible to exchange only the memory chip 902 and enable the memory card 900 by only replacing the control program of the controller A601. In this way it is possible to renew the memory system without affecting the design of the entire memory card. In addition, when the generation (design rule) of the NAND flash memory M2 changes it is possible to exchange only the NAND flash memory M2 and enable the memory card 900 by only replacing the control program of the controller B802. In this way it is possible to renew the memory system without affecting the design of the entire memory card.

Seventh Embodiment

In the seventh embodiment, an example construction of memory card 600 shown in the fifth embodiment when packaged is shown. FIG. 54 is a cross sectional diagram of a construction of the packages memory card 600 related to the seventh embodiment. Furthermore, in FIG. 54 the same structural elements as in the memory card 600 shown in FIG. 41 in the fifth embodiment have the same symbols.

In FIG. 54, 650 is a substrate. The NAND flash memories M1 and M2 stated above are stacked by an interlayer film 651 on this substrate 650. The above stated controller A601 and controller B602 are each formed separated by the interlayer film 651 on the NAND flash memory M2. Pads 652 to 655 for connecting a bonding wire 658 are formed on the surface of the left side of each of the substrate 650, NAND flash memories M1 and M2 and the controller B602. In addition, pads 656 and 657 for connecting the bonding wire 658 are formed on the right side upper surface of the controller B602 and on the left side upper surface of the controller A601 respectively. In addition, external connection pin 659 which corresponds to the first to eighteenth pins P1 to P18 shown in FIG. 25 is formed on the left side bottom surface of the substrate 650.

FIG. 55 is a cross section diagram which shows another construction of the memory card 600 when packaged related to the seventh embodiment. Furthermore, in FIG. 55 the same structural elements as in the memory card 600 shown FIG. 41 in the fifth embodiment have the same symbols and their explanation is omitted.

In FIG. 55, the controller B602 is formed on the NAND flash memory M2 separated by the interlayer film 651. The controller A601 is formed on the controller B602 separated by the interlayer film 651. Pads 652 to 656 for connecting the bonding wire 658 are each formed on the left side surface of the substrate 650, the NAND flash memories M1 and M2 and the controller B602 and controller A601.

The cross section of each of the packages shown in FIG. 54 and FIG. 55 are examples which show the case when the controller B602 and the controller A601 are formed by stacking on the NAND flash memory M2. Each memory card 600 shown in FIG. 54 and FIG. 55 is entirely sealed except for the external connection pin 659 by a resin for example, after the controller B602 and the controller A601 are stacked on the NAND flash memory M2 and after the bonding wire 658 is connected.

As stated above, by adopting a stacked construction it is possible to form the memory card 600 with the substrate 650 of the size shown in the diagrams which can be mounted with the NAND flash memories M1 and M2. It is also is possible to reduce the size of the package of the memory card 600.

FIG. 56 is a cross sectional diagram which shows another construction of a memory card when packaged related to the seventh embodiment. Furthermore, in FIG. 56, the same structural elements as in the memory card 600 shown in FIG. 41 in the fifth embodiment have the same symbols and their explanation is thus omitted here.

In FIG. 56, the NAND flash memory M1, controller B602 and controller A601 are each formed by being stacked separated by an interlayer film 651 on the substrate 650 of the memory card 600. The NAND flash memory M2 is formed separated by the interlayer film 651 on the NAND flash memory M1. The pad 655 for connecting the bonding wire 658 is formed on the upper surface of the left side of the controller A601. In addition, pads 656 and 657 for connecting the bonding wire 658 are formed on the upper right surface of the controller A601 and on the left upper surface of the controller B602 respectively. In addition, the pads 661 and 662 for connecting the bonding wire 658 are formed on the right upper surface of the controller B602 and the left upper surface of the NAND flash memory M1 respectively. Furthermore, the pad 663 for connecting the bonding wire 658 is formed on the left upper surface of the NAND flash memory M2

The memory card 600 shown in FIG. 56 is entirely sealed except for the external connection pin 659 by a resin for example, after the controller B602, the controller A601 and the NAND flash memories M1 and M2 are formed on the substrate 650 and after the bonding wire 658 is connected.

The cross section of the package shown in FIG. 56 is an example which shows the case where the NAND flash memories M1 and M2, the controller B602 and the controller A601 are arranged on the substrate 650. By adopting this construction it is possible to easily replace the NAND flash memory M1 and the controller B602 when the generation of the NAND flash memories M1 and M2 change.

Furthermore, the construction of each package shown in FIG. 54 and FIG. 55 are applicable to the memory card 600, however, they may also be applied to devices other than memory cards, for example, a multi-chip package (MCM) or system in package (SiP).

Eighth Embodiment

In the eighth embodiment, an example construction of the package shown in the seventh embodiment is applied as a USB memory (Universal Serial Bus). FIG. 57 is a cross sectional diagram which shows a construction of a USB memory related to the eighth embodiment. Furthermore, in FIG. 57 the same structural elements as in the package of the memory card shown in FIG. 54 in the seventh embodiment have the same symbols and their explanation is omitted.

In the USB memory 1000 memory shown in FIG. 57, 1001 is a circuit substrate. Electrical parts 1002 and a control chip 1003 such as a USB controller are mounted on the upper surface of this circuit substrate 1001 and a conducing layer 1004 is also formed as a USB connector input output terminal. In addition, the memory card 600 which is packaged in FIG. 54 is mounted on the lower surface of the circuit substrate 1001. In addition, 1005 is the external casing of the USB memory 1000.

In the USB memory 1000 shown in FIG. 57, because the memory card 600 is mounted without adjustment on the circuit substrate 1001, it is possible to easily manufacture the USB memory and also expand the range of usage of the memory card 600. In addition, in the case where the generation of the NAND flash memories M1 and M2 within the USB memory 1000 change, it is possible to mount and use the memory card 600 which is manufactured according to the generation of the NAND flash memory and easily change the specifications of the USB memory.

Furthermore, in the eighth embodiment, an example of the memory card 600 shown in FIG. 54 was shown applied within a USB memory, however, it is not limited to this, the memory card 600 shown in FIG. 55 or the memory card 600 shown in FIG. 56 may also be applied.

In addition, in the fifth to eighth embodiments, examples of memory systems applied to memory cards and USB memories was shown, however, it is not limited to this. For example, these memory systems can also be applied to various electrical devices such as digital cameras, digital video cameras or personal computers which can be used by an application program by mounting a plurality of NAND flash memories.

What is claimed is:

1. A memory system comprising:
   a nonvolatile memory;
   a first controller being connectable to a host equipment, said first controller controlling the entire memory system; and
   a second controller connected to said first controller and also connected to said nonvolatile memory, said second controller controlling an access process to said nonvolatile memory, said second controller receives a command via said first controller and carries out said access process to said nonvolatile memory according to said command, said command being input from said host equipment.

2. The memory system according to claim 1, wherein said second controller includes a first memory interface connected to said first controller, and a second memory interface connected to said nonvolatile memory, and said first memory interface and said second memory interface send and receive the same said command between said first controller and said nonvolatile memory.

3. The memory system according to claim 2, wherein said second controller includes an access path setting section which sets an access path which directly connects said first memory interface with said second memory interface, and said second controller and said nonvolatile memory are sealed within the same semiconductor package.

4. The memory system according to claim 3, wherein said access path setting section includes a first switch which switches between a first mode which connects said first memory interface with said second controller, and a second mode which connects said first memory interface with said access path, and also includes a second switch which switches between said first mode which connects said second memory interface and said second controller, and said second mode which connects said second memory interface and said access path.

5. The memory system according to claim 4, wherein said second controller includes a control section which outputs a control signal to said first switch and said second switch, said control signal controlling a switch between said first mode and said second mode according to a command sequence which instructs a shift operation to said second mode from said first mode which is received from said host equipment or instructs a return operation from said second mode to said first mode which is received from said host equipment.

6. The memory system according to claim 4, wherein said access path setting section detects a power supply input from said host equipment and sets said first switch and said second switch to said second mode.

7. The memory system according to claim 1, wherein said first controller and said second controller are constructed from separate semiconductor elements.

8. The memory system according to claim 1, wherein said memory system is constructed of a memory chip which includes said second controller and said nonvolatile memory.

9. The memory system according to claim 8, wherein said memory system includes a circuit substrate which forms a USB terminal which becomes a USB connector input/output terminal on one end of said circuit substrate, and said memory system is mounted with a semiconductor package which seals said second controller and said nonvolatile memory on said circuit substrate.

10. The memory system according to claim 1, wherein said nonvolatile memory is a NAND type flash memory.

11. The memory system according to claim 1, wherein said host equipment is an external equipment, said first controller is able to communicate with said host equipment, and said second controller is able to communicate with said host equipment via said first controller.

12. A memory system comprising:
a plurality of nonvolatile memories;
a first controller being connectable to a host equipment, said first controller controlling the entire memory system; and
a second controller connected to said first controller and also connected to said plurality of nonvolatile memories, said second controller controlling an access process to said plurality of nonvolatile memories, said second controller receives a command via said first controller and carries out said access process to said plurality of nonvolatile memories according to said command, said command being input from said host equipment.

13. The memory system according to claim 12, wherein said second controller includes a counter which counts a number of times programming data which is input from said host equipment is reprogrammed, and changes a storage destination of said programming data among said plurality of nonvolatile memories based on the number of times said programming data is reprogrammed which is counted by said counter.

14. The memory system according to claim 13, wherein said plurality of nonvolatile memories includes a first nonvolatile memory and a second nonvolatile memory, each of which having a different storage capacity, and said counter counts the number of times said programming data is reprogrammed for each address within said first nonvolatile memory and each address within said second nonvolatile memory, and said second controller includes a storage section which stores the number of times said programming data is reprogrammed for each address within said first nonvolatile memory and each address within said second nonvolatile memory, and said second controller also includes a control section which changes a storage destination of said programming data to said second nonvolatile memory from said first nonvolatile memory or changes a storage destination of said programming data to said first nonvolatile memory from said second nonvolatile memory based on the number of times said programming data is reprogrammed for each address within said first nonvolatile memory stored in said storage section and based on the number of times said programming data is reprogrammed for each address within said second nonvolatile memory stored in said storage section.

15. The memory system according to claim 14, wherein said first nonvolatile memory has a storage capacity greater than said second nonvolatile memory and said second nonvolatile memory has a storage capacity smaller than said first nonvolatile memory, and said second controller includes a data distribution section which separates main data and additional data which are included in said programming data input from said host equipment, and distributes said main data to said first nonvolatile memory and stores said main data and distributes said additional data to said second nonvolatile memory and stores said additional data.

16. The memory system according to claim 12, wherein said second controller includes a first memory interface connected to said first controller, a second memory interface connected to said first nonvolatile memory, and a third interface memory connected to said second nonvolatile memory, and said first memory interface and said second memory interface send and receive the same said command between said first controller and said first nonvolatile memory, and said first memory interface and said third memory interface send and receive the same said command between said first controller and said second nonvolatile memory.

17. The memory system according to claim 16, wherein said second controller includes an access path setting section which sets an access path which directly connects said first memory interface, said second memory interface and said third memory interface.

18. The memory system according to claim 17, wherein said access path setting section includes a first switch which switches between a first mode which connects said first memory interface with said second controller, and a second mode which connects said first memory interface with said access path, and also includes a second switch which switches between said first mode which connects said second memory interface and said second controller, and said second mode which connects said second memory interface and said access path, and also includes a third switch which switches between said first mode which connects said third memory interface and said second controller and said second mode which connects said third memory interface with said access path.

19. The memory system according to claim 18, wherein said second controller includes a control section which outputs a control signal to said first switch, said second switch and said third switch, said control signal controlling a switch between said first mode and said second mode according to a command sequence which instructs a shift operation to said second mode from said first mode which is received from said host equipment or instructs a return operation from said second mode to said first mode which is received from said host equipment.

20. The memory system according to claim 12, wherein said memory system includes a circuit substrate which forms a USB terminal which becomes a USB connector input/output terminal on one end of said circuit substrate, and said memory system is mounted with a semiconductor package which seals said second controller and said plurality of nonvolatile memories on said circuit substrate.

21. The memory system according to claim 12, wherein said plurality of nonvolatile memories are NAND type flash memories.

22. The memory system according to claim 12, wherein said host equipment is an external equipment, said first controller is able to communicate with said host equipment, and said second controller is able to communicate with said host equipment via said first controller.

* * * * *